(12) United States Patent
Schneiderman

(10) Patent No.: US 7,194,114 B2
(45) Date of Patent: Mar. 20, 2007

(54) OBJECT FINDER FOR TWO-DIMENSIONAL IMAGES, AND SYSTEM FOR DETERMINING A SET OF SUB-CLASSIFIERS COMPOSING AN OBJECT FINDER

(75) Inventor: Henry Schneiderman, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 794 days.

(21) Appl. No.: 10/266,139

(22) Filed: Oct. 7, 2002

(65) Prior Publication Data

US 2004/0066966 A1    Apr. 8, 2004

(51) Int. Cl.
*G06K 9/00* (2006.01)
(52) U.S. Cl. ..................... 382/118; 382/190
(58) Field of Classification Search ............... 382/118, 382/190
See application file for complete search history.

(56) References Cited

U.S. PATENT DOCUMENTS

| | | |
|---|---|---|
| 5,533,177 A | 7/1996 | Wirtz et al. |
| 5,642,431 A | 6/1997 | Poggio et al. |
| 5,710,833 A | 1/1998 | Moghaddam et al. |
| 5,757,287 A | 5/1998 | Kitamura et al. |
| 6,025,879 A | 2/2000 | Yoneyama et al. |
| 6,026,189 A | 2/2000 | Greenspan |
| 6,028,956 A * | 2/2000 | Shustorovich et al. ...... 382/156 |
| 6,038,337 A | 3/2000 | Lawrence et al. |
| 6,072,893 A | 6/2000 | Luo et al. |
| 6,081,612 A * | 6/2000 | Gutkowicz-Krusin et al. ............ 382/128 |
| 6,128,397 A | 10/2000 | Baluja et al. |
| 6,134,339 A | 10/2000 | Luo |
| 6,154,253 A | 11/2000 | Kiri et al. |
| 6,256,411 B1 | 7/2001 | Iida |
| 6,285,393 B1 | 9/2001 | Shimoura et al. |
| 6,421,463 B1 | 7/2002 | Poggio et al. |
| 6,456,728 B1 | 9/2002 | Doi et al. |
| 2001/0028729 A1 | 10/2001 | Nishigaki et al. |
| 2002/0051578 A1 | 5/2002 | Imagawa et al. |

(Continued)

OTHER PUBLICATIONS

U.S. Appl. No. 09/795,208, filed Feb. 28, 2001.

(Continued)

*Primary Examiner*—Jingge Wu
*Assistant Examiner*—Aaron Carter
(74) *Attorney, Agent, or Firm*—Kirkpatrick & Lockhart Preston Gates Ellis LLP

(57) ABSTRACT

Systems and methods for determining a set of sub-classifiers for a detector of an object detection program are presented. According to one embodiment, the system may include a candidate coefficient-subset creation module, a training module in communication with the candidate coefficient-subset creation module, and a sub-classifier selection module in communication with the training module. The candidate coefficient-subset creation module may create a plurality of candidate subsets of coefficients. The coefficients are the result of a transform operation performed on a two-dimensional (2D) digitized image, and represent corresponding visual information from the 2D image that is localized in space, frequency, and orientation. The training module may train a sub-classifier for each of the plurality of candidate subsets of coefficients. The sub-classifier selection module may select certain of the plurality of sub-classifiers. The selected sub-classifiers may comprise the components of the detector. Also presented are systems and methods for detecting instances of an object in a 2D (two-dimensional) image.

47 Claims, 31 Drawing Sheets

U.S. PATENT DOCUMENTS

2002/0102024 A1    8/2002   Jones et al.
2006/0062451 A1*   3/2006   Li et al. .................... 382/159

OTHER PUBLICATIONS

Schneiderman et al., "A Statistical Method for 3D Object Detection Applied to Faces and Cars," *IEEE Conference on Computer Vision and Pattern Recognition*, IEEE, Jun. 2000.

Schneiderman et al., "A Histogram-Based Method for Detection of Faces and Cars," *Proc. Of 2000 International Conference on Image Processing (ICIP 2000)*, vol. 3, Sep. 2000.

Schneiderman et al., "Object Detection Using the Statistics of Parts," *International Journal of Computer Vision*, 2002.

Amit et al., Discussion of the Paper "Arcing Classifiers" by Leo Breiman, *The Annals of Statistics*, vol. 26, No. 3, 1998, pp. 833-837.

Breiman, L., "Arcing Classifiers," *The Annals of Statistics*, vol. 26, No. 3, 1998, pp. 801-823.

Burel et al., "Detection and Localization of Faces on Digital Images," *Pattern Recognition Letters* 15, 1994, pp. 963-967.

Burl et al., "Recognition of Planar Object Classes," *CVPR* 1996, pp. 223-230.

Colmenarez et al., "Face Detection with Information-Based Maximum Discrimination," *CVPR* 1997, pp. 782-787.

Cosman et al., "Vector Quantization of Image Subbands: A Survey," *IEEE Trans. on Image Processing*, vol. 5, No. 2, Feb. 1996, pp. 202-225.

Dietterich, T.G., "Discussion of the Paper "Arcing Classifiers" by Leo Breiman," *The Annals of Statistics*, vol. 26, No. 3, 1998, pp. 838-841.

Domingos et al., "On the Optimality of the Simple Bayesian Classifier under Zero-One Loss," *Machine Learning*, 29, 1997, pp. 103-130.

Freund et al., "A Decision-theoretic Generalization of On-Line Learning and an Application to Boosting," *Journal of Computer and System Sciences*, vol. 55, No. 1, 1997, pp. 119-139.

Freund et al., "Discussion of the Paper "Arcing Classifiers" by Leo Breiman," *The Annals of Statistics*, vol. 26, No. 3, 1998, pp. 824-832.

Moghaddam et al., "Probabilistic Visual Learning for Object Representation," *IEEE Trans. on Pattern Analysis and Machine Intelligence*, vol. 19, No. 7, Jul. 1997, pp. 696-710.

Roth et al., "A SNoW-Based Face Detector," *Neural Information Processing Systems*, 1999, pp. 862-868.

Rowley et al., "Neural Network-Based Face Detection," *IEEE Trans. on Pattern Analysis and Machine Intelligence*, vol. 20, No. 1, Jan. 1998, pp. 23-38.

Schapire et al.,"Improved Boosting Algorithms Using Confidence-rated Predictions," *Machine Learning*, 37(3), 1999, pp. 297-336.

Schneiderman et al., "Probabilistic Modeling of Local Appearance and Spatial Relationships for Object Recognition," *CVPR* 1998, pp. 45-51.

Strang et al., "Wavelets and Filter Banks," Wellesley-Cambridge Press, 1997, pp. 1-35, 103-142, 216-218.

Sung et al., "Example-based Learning for View-based Human Face Detection," M.I.T. AI Memo No. 1521, 1994, pp. 1-20.

Sung, K., "Learning and Example Selection for Object and Pattern Detection," M.I.T. AI Lab. Tech Report No. 1572, 1996, pp. 1-195.

Osuna et al., Training Support Vector Machines: An Application to Face Detection, CVPR 1997, pp. 130-136.

Yang et al., "Human Face Detection in a Complex Background," *Pattern Recognition*, 27(1), 1994, pp. 53-63.

Schneiderman, "A Statistical Approach to 3D Object Dection Applied to Faces and Cars," CMU-RI-TR-00-06, Robotics Instutiute, Carnegie Mellon Univ., May 10, 2000.

* cited by examiner

Challenges in Object Detection
- Intra-class variation
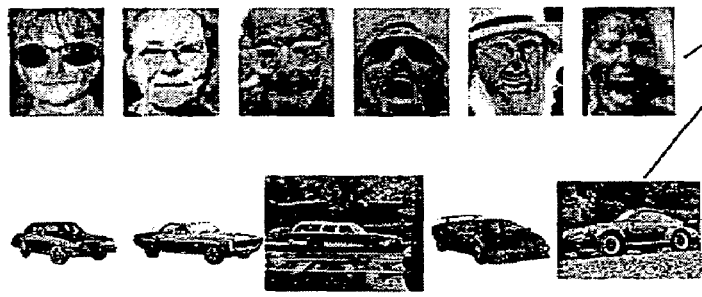
FIG. 1A
(Prior Art)
- Lighting variation
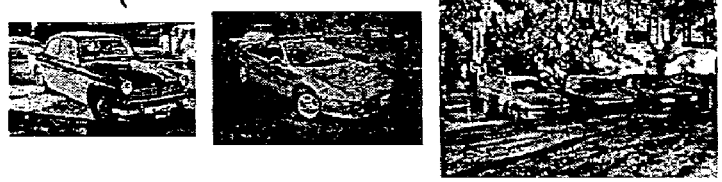
FIG. 1B
(Prior Art)
- Geometric variation
FIG. 1C
(Prior Art)

- 2 classifiers trained for faces
Fig. 7
- 8 classifiers trained for cars.
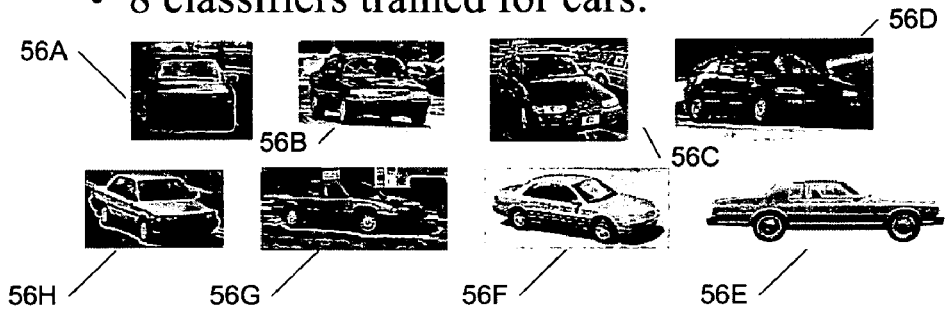
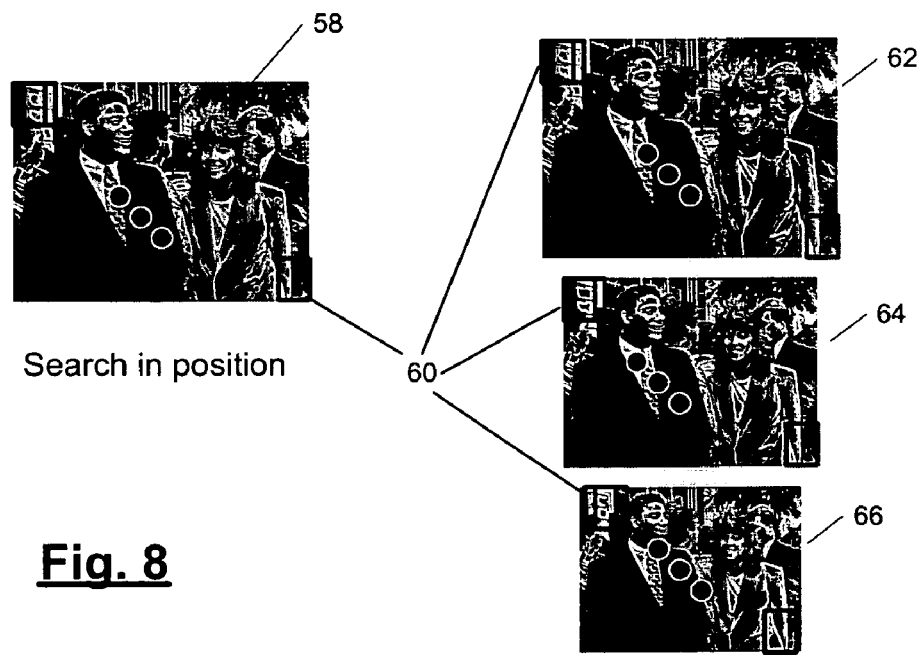
Search in position
Fig. 8
Search in scale

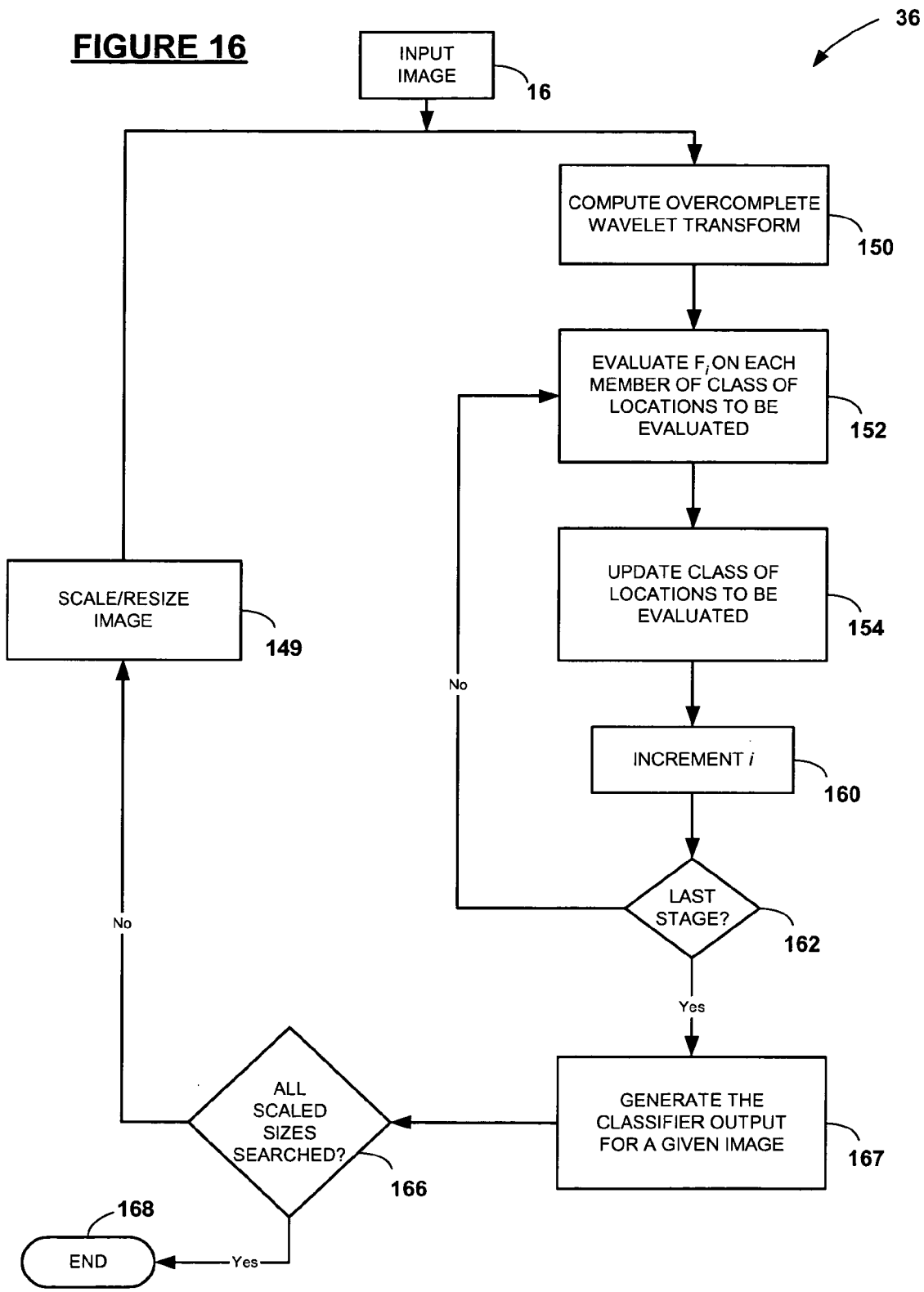

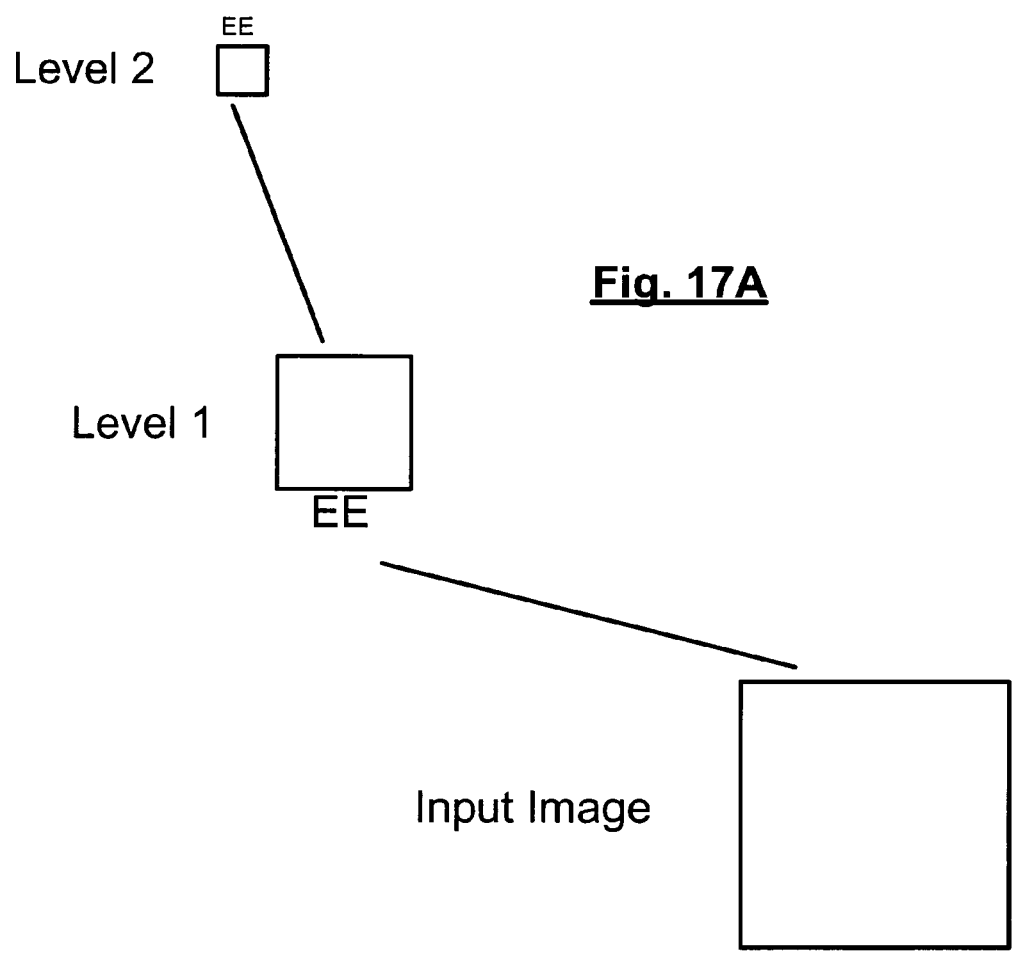

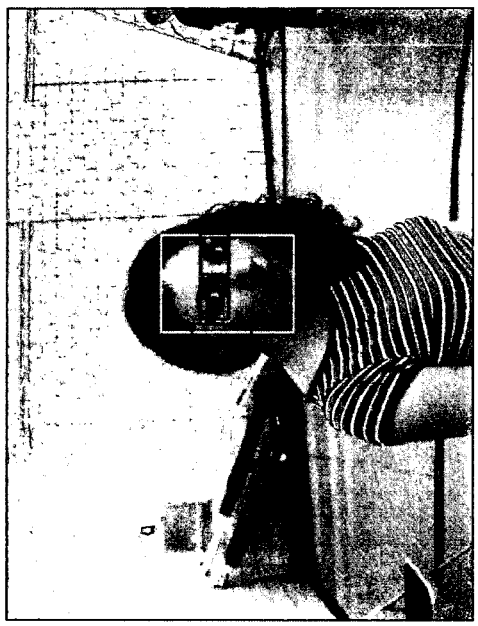
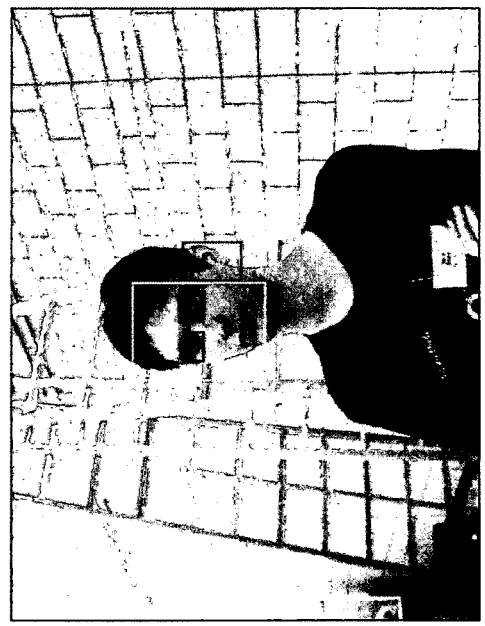
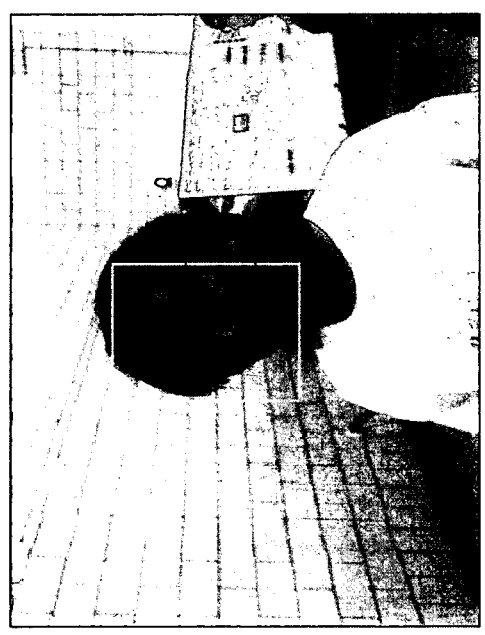
Fig. 25

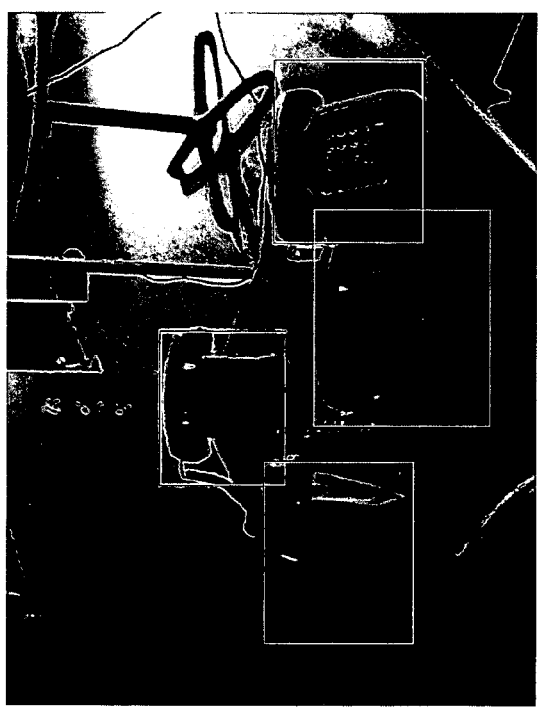
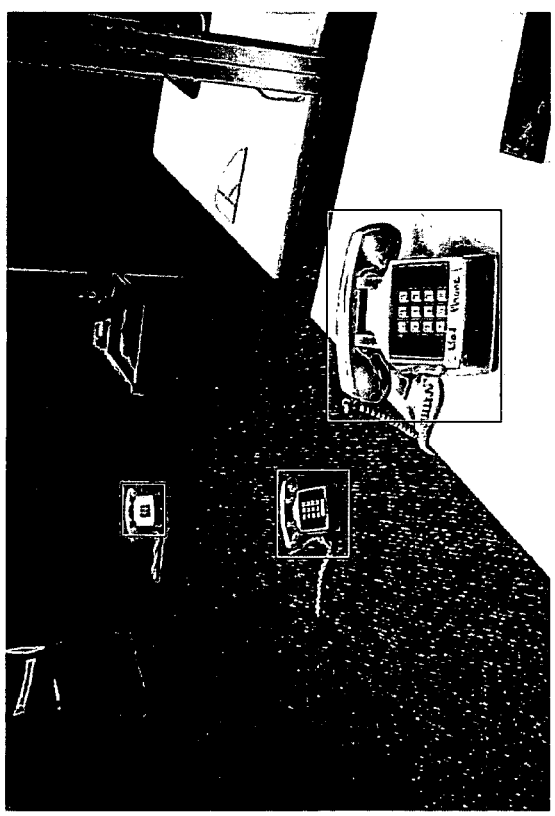
Fig. 26

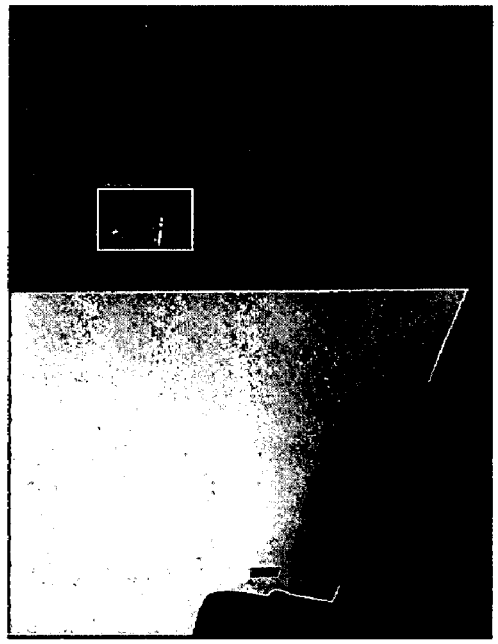
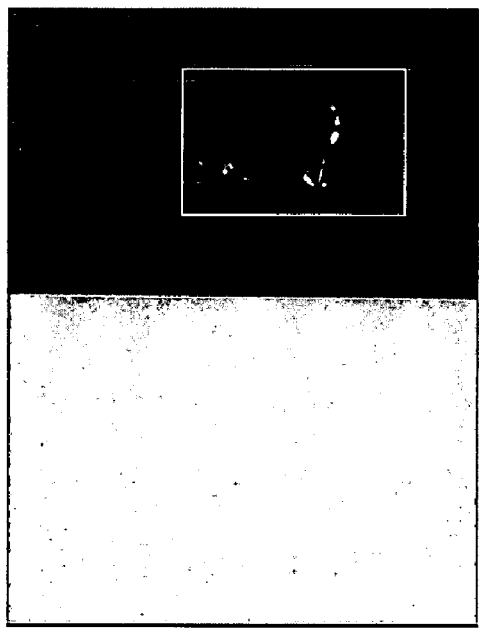
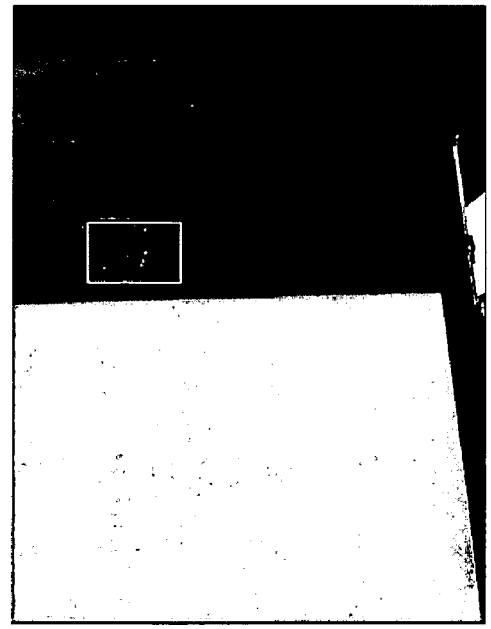
Fig. 27

OBJECT FINDER FOR TWO-DIMENSIONAL IMAGES, AND SYSTEM FOR DETERMINING A SET OF SUB-CLASSIFIERS COMPOSING AN OBJECT FINDER

STATEMENT REGARDING FEDERALLY SPONSORED RESEARCH OR DEVELOPMENT

The present invention has been supported by the United States Department of Defense through grant MDA904-00-C-2109. The United States government may have certain rights in this invention.

BACKGROUND OF THE INVENTION

Object recognition is the technique of using computers to automatically locate objects in images, where an object can be any type of three dimensional physical entity such as a human face, automobile, airplane, etc. Object detection involves locating any object that belongs to a category such as the class of human faces, automobiles, etc. For example, a face detector would attempt to find all human faces in a photograph, but would not make finer distinctions such as identifying each face.

The challenge in object detection is coping with all the variations in appearance that can exist within a class of objects. FIG. 1A illustrates a picture slide 10 showing some variations for human faces and cars. For example, cars vary in shape, size, coloring, and in small details such as the headlights, grill, and tires. Similarly, the class of human faces may contain human faces for males and females, young and old, bespectacled with plain eyeglasses or with sunglasses, etc. A person's race, age, gender, ethnicity, etc., may play a dominant role in defining the person's facial features. Also, the visual expression of a face may be different from human to human. One face may appear jovial whereas the other one may appear sad and gloomy. Visual appearance also depends on the surrounding environment and lighting conditions as illustrated by the picture slide 12 in FIG. 1B. Light sources will vary in their intensity, color, and location with respect to the object. Nearby objects may cast shadows on the object or reflect additional light on the object. Furthermore, the appearance of the object also depends on its pose; that is, its position and orientation with respect to the camera. In particular, a side view of a human face will look much different than a frontal view. FIG. 1C shows a picture slide 14 illustrating geometric variation among human faces.

Therefore, a computer-based object detector must accommodate all this variation and still distinguish the object from any other pattern that may occur in the visual world. For example, a human face detector must be able to find faces regardless of facial expression, variation from person to person, or variation in lighting and shadowing. Most methods for object detection use statistical modeling to represent this variability. Statistics is a natural way to describe a quantity that is not fixed or deterministic such as a human face. The statistical approach is also versatile. The same statistical modeling techniques can potentially be used to build object detectors for different objects without re-programming.

Techniques for object detection in two-dimensional images differ primarily in the statistical model they use. One known method represents object appearance by several prototypes consisting of a mean and a covariance about the mean. Another known technique consists of a quadratic classifier. Such a classifier is mathematically equivalent to the representation of each class by its mean and covariance. These and other known techniques emphasize statistical relationships over the full extent of the object. As a consequence, they compromise the ability to represent small areas in a rich and detailed way. Other known techniques address this limitation by decomposing the model in terms of smaller regions. These methods can represent appearance in terms of a series of inner products with portions of the image. Finally, another known technique decomposes appearance further into a sum of independent models for each pixel.

The known techniques discussed above are limited, however, in that they represent the geometry of the object as a fixed rigid structure. This limits their ability to accommodate differences in the relative distances between various features of a human face such as the eyes, nose, and mouth. Not only can these distances vary from person to person, but also their projections into the image can vary with the viewing angle of the face. For this reason, these methods tend to fail for faces that are not in a fully frontal posture. This limitation is addressed by some known techniques, which allow for small amounts of variation among small groups of handpicked features such as the eyes, nose, and mouth. However, by using a small set of handpicked features these techniques have limited power. Another known technique allows for geometric flexibility with a more powerful representation by using richer features (each takes on a large set of values) sampled at regular positions across the full extent of the object. Each feature measurement is treated as statistically independent of all others. The disadvantage of this approach is that any relationship not explicitly represented by one of the features is not represented. Therefore, performance depends critically on the quality of the feature choices.

Additionally, all of the above techniques are structured such that the entire statistical model must be evaluated against the input image to determine if the object is present. This can be time consuming and inefficient. In particular, since the object can appear at any position and any size within the image, a detection decision must be made for every combination of possible object position and size within an image. It is therefore desirable to detect a 3D object in a 2D image over a wide range of variation in object location, orientation, and appearance.

It is also known that object detection may be implemented by applying a local operator or a set of local operators to a digital image, or a transform of a digital image. Such a scheme, however, may require that a human programmer choose the local operator or set of local operators that are applied to the image. As a result, the overall accuracy of the detection program can be dependent on the skill and intuition of the human programmer. It is therefore desirable to determine the local operators or set of local operators in a manner that is not dependant on humans.

Finally, even with very high speed computers, known object detection techniques can require an exorbitant amount of time to operate. It is therefore also desirable to perform the object detection in a computationally advantageous manner so as to conserve time and computing resources.

SUMMARY OF THE INVENTION

In one general respect, the present invention is directed to a system for determining a classifier (or detector) used by an object detection program where the classifier is decomposed into a set of sub-classifiers. According to one embodiment, the system includes (a) a candidate coefficient-subset creation module, (b) a training module in communication with the candidate coefficient-subset creation module, and (c) a sub-classifier selection module in communication with the training module. The candidate coefficient-subset creation module may create a plurality of candidate subsets of coefficients. The coefficients are the result of a transform operation performed on a two-dimensional (2D) digitized image. The training module may train a sub-classifier for each of the plurality of candidate subsets of coefficients. In one embodiment, the training module may train the set of sub-classifiers based on non-object training examples that combine examples selected by bootstrapping and examples selected randomly. Also the sub-classifier selection module may select certain of the plurality of sub-classifiers. The selected sub-classifiers may comprise the components of the classifier. Consequently, the present invention may automatically select the sub-classifiers, thereby eliminating the need for a human operator to select the sub-classifiers, which as described previously, is highly dependent upon the skill and intuition of the human operator.

In another general respect, the present invention is directed to a method of generating a sub-classifier for a detector of an object detection program. According to one embodiment, the method includes transforming pixel values to wavelet coefficients and then linearly projecting the wavelet coefficients to create projection coefficients. The method further includes quantizing the projection coefficients and generating a table of log-likelihood values based on the quantizing. In addition, the method may further include providing lighting correction adjustments to the wavelet coefficients prior to linearly projecting the wavelet coefficients.

In another general respect, the present invention is directed to a method for determining a set of sub-classifiers for a detector of an object detection program. According to one embodiment, the method includes creating a plurality of candidate subsets of coefficients and training a sub-classifier for each of the plurality of candidate subsets of coefficients. The method further includes selecting certain of the plurality of sub-classifiers.

In another general respect, the present invention is directed to a system and a method for detecting instances of an object in a 2D (two-dimensional) image. According to one embodiment, the method may include, for each of a plurality of view-based classifiers, computing a transform of a digitized version of the 2D image containing a representation of an object, wherein the transform is a representation of the spatial frequency content of the image as a function of position in the image. Computing the transform generates a plurality of transform coefficients, wherein each transform coefficient represents corresponding visual information from the 2D image that is localized in space, frequency, and orientation. The method may also include applying the plurality of view-based classifiers to the plurality of transform coefficients, wherein each view-based classifier is configured to detect a specific orientation of an instance of the object in the 2D image based on visual information received from corresponding transform coefficients. Each of the plurality of view-based classifiers includes a plurality of cascaded sub-classifiers. The cascaded stages may be arranged in ascending order of complexity and computation time. Finally, the method includes combining results of the application of the plurality view-based classifiers, and determining a pose (i.e., position and orientation) of the instance of the object from the combination of results of the application of the plurality view-based classifiers. In one embodiment, a visual marker may be placed on the 2D image where the instance of the object is estimated. In another embodiment, the pose of the instance of the object may be stored for further processing, such as for red-eye removal, as but one example.

BRIEF DESCRIPTION OF THE DRAWINGS

Embodiments of the present invention will be described herein in conjunction with the following drawings, in which:

FIGS. 1A–1C illustrate different challenges in object detection;

FIG. 7 shows an example of different orientations for human faces and cars that the object finder program may be configured to model;

FIG. 8 depicts the general object detection approach used by the object finder program according to one embodiment of the present invention;

FIG. 16 is a flow chart illustrating operations performed by a view-based classifier during detection of an object at a specific orientation according to one embodiment of the present invention;

FIG. 17A illustrates a wavelet decomposition.

FIGS. 23A and 24 further illustrate the details of the image scaling process and corresponding wavelet transform computation according to one embodiment of the present invention;

FIG. 25 depicts various images of humans with the object markers placed on the human faces, human eyes, and human ears as detected by the object finder according to one embodiment of the present invention;

FIG. 26 illustrates various images of telephones with the object markers placed on the telephones detected by the object finder according to one embodiment of the present invention;

FIG. 27 illustrates various images of door handles with the object markers placed on the door handles detected by the object finder according to one embodiment of the present invention;

DETAILED DESCRIPTION

Figure 2:
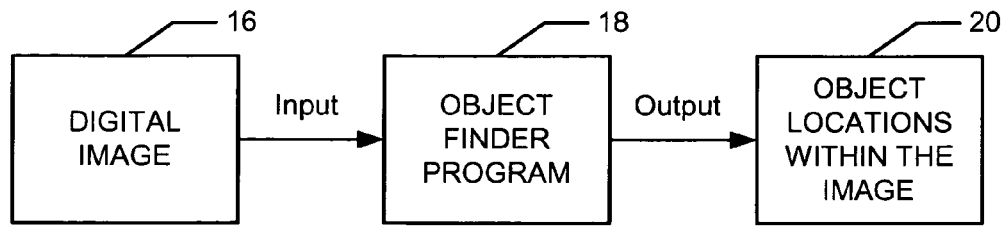
FIG. 2 illustrates a generalized operational flow for the object finder program according to an embodiment of the present invention.

FIG. 2 illustrates an embodiment of a generalized operational flow for the object finder program according to an embodiment of the present invention. The object finder program (simply, the "object finder") is represented by the block 18. A digital image 16 is a typical input to the object finder 18, which operates on the image 16 and generates a list of object locations and orientations for the 3D objects represented in the 2D image 16. It is noted that the terms "image" and "digital image" are used interchangeably hereinbelow. However, both of these terms are used to refer to a 2D image (e.g., a photograph) containing two-dimensional representations of one or more 3D objects (e.g., human faces, cars, etc.). In one embodiment, as discussed hereinbelow in more detail, the object finder 18 may place object markers 52 (FIG. 6) on each object detected in the input image 16 by the object finder 18. The input image may be an image file digitized in one of many possible formats including, for example, a BMP (bitmap) file format, a PGM (Portable Grayscale bitMap graphics) file format, a JPG (Joint Photographic Experts Group) file format, or any other suitable graphic file format. In a digitized image, each pixel is represented as a set of one or more bytes corresponding to a numerical representation (e.g., a floating point number) of the light intensity measured by a camera at the sensing site. The input image may be gray-scale, i.e., measuring light intensity over one range of wavelength, or color, making multiple measurements of light intensity over separate ranges of wavelength.

Figure 3:
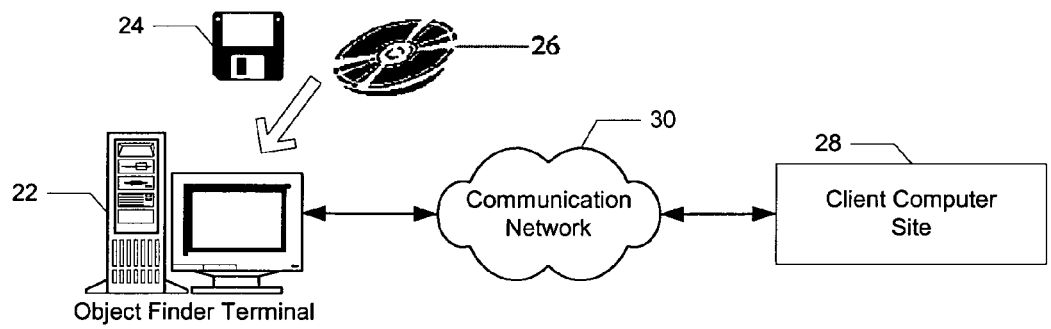
FIG. 3 depicts an exemplary setup to utilize the object finder program according to an embodiment of the present invention.

FIG. 3 depicts an exemplary setup to utilize the object finder program 18 according to an embodiment of the present invention. An object finder terminal or computer 22 may execute or "run" the object finder program application 18 when instructed by a user. The digitized image 16 may first be displayed on the computer terminal or monitor display screen and, after application of the object finder program, a marked-up version of the input image (e.g., picture slide 50 in FIG. 6) may be displayed on the display screen of the object finder terminal 22. The program code for the object finder program application 18 may be stored on a portable data storage medium, e.g., a floppy diskette 24, a compact disc 26, a data cartridge tape (not shown) or any other magnetic or optical data storage medium. The object finder terminal 22 may include appropriate disk drives to receive the portable data storage medium and to read the program code stored thereon, thereby facilitating execution of the object finder software. The object finder software 18, upon execution by a processor of the computer 22, may cause the computer 22 to perform a variety of data processing and display tasks including, for example, analysis and processing of the input image 16, display of a marked-up version of the input image 16 identifying locations and orientations of one or more 3D objects in the input image 16 detected by the object finder 18, transmission of the marked-up version of the input image 16 to a remote computer site 28 (discussed in more detail hereinbelow), transmission of a list of object identities, locations and, orientations for the 3D objects represented in the 2D image to a remote computer site 28 (discussed in more detail hereinbelow), etc.

As illustrated in FIG. 3, in one embodiment, the object finder terminal 22 may be remotely accessible from a client computer site 28 via a communication network 30. In one embodiment, the communication network 30 may be an Ethernet LAN (local area network) connecting all the computers within a facility, e.g., a university research laboratory or a corporate data processing center. In that case, the object finder terminal 22 and the client computer 28 may be physically located at the same site, e.g., a university research laboratory or a photo processing facility. In alternative embodiments, the communication network 30 may include, independently or in combination, any of the present or future wireline or wireless data communication networks, e.g., the Internet, the PSTN (public switched telephone network), a cellular telephone network, a WAN (wide area network), a satellite-based communication link, a MAN (metropolitan area network) etc.

The object finder terminal 22 may be, e.g., a personal computer (PC), a laptop computer, a workstation, a minicomputer, a mainframe, a handheld computer, a small computer device, a graphics workstation, or a computer chip embedded as part of a machine or mechanism (e.g., a computer chip embedded in a digital camera, in a traffic control device, etc.). Similarly, the computer (not shown) at the remote client site 28 may also be capable of viewing and manipulating digital image files and digital lists of object identities, locations and, orientations for the 3D objects represented in the 2D image transmitted by the object finder terminal 22. In one embodiment, as noted hereinbefore, the client computer site 28 may also include the object finder terminal 22, which can function as a server computer and can be accessed by other computers at the client site 28 via a LAN. Each computer—the object finder terminal 22 and the remote computer (not shown) at the client site 28—may include requisite data storage capability in the form of one or more volatile and non-volatile memory modules. The memory modules may include RAM (random access memory), ROM (read only memory) and HDD (hard disk drive) storage. Memory storage is desirable in view of sophisticated image processing and statistical analysis performed by the object finder terminal 22 as part of the object detection process.

Before discussing how the object finder software 18 performs the object detection process, it is noted that the arrangement depicted in FIG. 3 may be used to provide a commercial, network-based object detection service that may perform customer-requested object detection in real time or near real time. For example, the object finder program 18 at the computer 22 may be configured to detect human faces and then human eyes in photographs or pictures remotely submitted to it over the communication network 30 (e.g., the Internet) by an operator at the client site 28. The client site 28 may be a photo processing facility specializing in removal of "red eyes" from photographs or in color balancing of color photographs. In that case, the object finder terminal 22 may first automatically detect all human faces and then all human eyes in the photographs submitted and send the detection results to the client computer site 28, which can then automatically remove the red spots on the faces pointed out by the object finder program 18. Thus, the whole process can be automated. As another example, the object finder terminal 22 may be a web server running the object finder software application 18. The client site 28 may be in the business of providing commercial image databases. The client site 28 may automatically search and index images on the World Wide Web as requested by its customers. The computer at the client site 28 may "surf" the web and automatically send a set of images or photographs to the object finder terminal 22 for further processing. The object finder terminal 22, in turn, may process the received images or photographs and automatically generate a description of the content of each received image or photograph. The depth of image content analysis may depend on the capacity of the object finder software 18, i.e., the types of 3D objects (e.g., human faces, cars, trees, etc.) the object finder 18 is capable of detecting. The results of image analysis may then be transmitted back to the sender computer at the client site 28.

It is noted that the owner or operator of the object finder terminal 22 may commercially offer a network-based object finding service, as illustrated by the arrangement in FIG. 3, to various individuals, corporations, or other facilities on a fixed-fee basis, on a per-operation basis or on any other payment plan mutually convenient to the service provider and the service recipient.

I. Object Finding using a Classifier

Figure 4A:
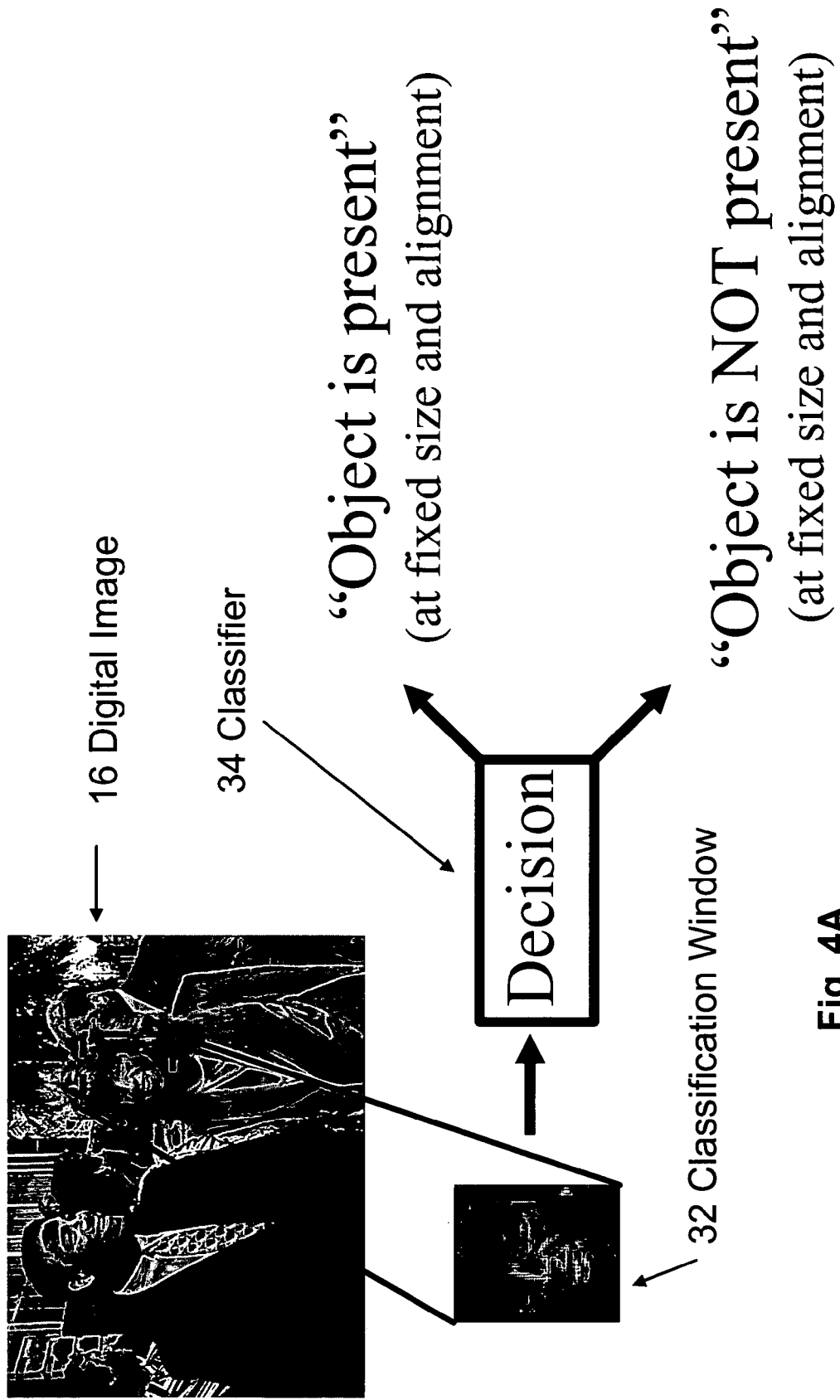
FIGS. 4A and 4B illustrate the decision-making involving a fixed object size, orientation, and alignment according to an embodiment of the present invention.

A primary component of the object finder is a classifier. FIG. 4A illustrates a classifier 34 according to one embodiment of the present invention. The input to the classifier 32 is fixed-size window sampled from an input image 16. The classifier operates on the fixed size image input 32 and makes a decision whether the object is present in the input window 32. The decision is a binary one in the sense that the output of the classifier 34 represents only two values—either the object is present or the object is not present. In one embodiment the classifier only identifies the object's presence when it occurs at a pre-specified size and alignment within the window. As described in more detail hereinafter, according-to one embodiment a classifier may comprise a plurality of cascaded sub-classifiers. As described herein, the cascaded stages may be arranged in ascending order of complexity and computation time.

FIG. 8 depicts the general object detection approach used by the object finder program 18 according to one embodiment of the present invention. The object finder must apply the classifier 34 repeatedly to original image 58 for all possible (and, maybe overlapping) positions of this rectangular image window 32 as shown in FIG. 8. The process makes it possible for the object finder to detect instances of the object at any position within an image. Then, to be able to detect the object at any size, the object finder program 18 may iteratively resize the input image and re-apply the classifier in the same fashion to each resized image 62, 64, and 66, as illustrated in FIG. 8. The illustrations in FIG. 8 show an exhaustive left-to-right, row-by-row scanning of the input image (and three of its scaled versions) using the rectangular window 32. It is noted that the size of the rectangular image window 32 may remain fixed throughout the whole detection process. The size of the image window 32 may be empirically selected based on a number of factors including, for example, object shape, desired accuracy or resolution, resulting computational complexity, efficiency of program execution, etc. In one embodiment, the size of the rectangular window is 32×24 pixels.

A classifier may be specialized not only in object size and alignment, but also object orientation. In one embodiment shown in FIG. 5, the object finder 18 uses a view-based approach with multiple classifiers that are each specialized to a specific orientation of the object as described and illustrated with respect to FIG. 6. Thus, a predetermined number of view-based classifiers may be applied in parallel to the input image 16 to find corresponding object orientations. In the embodiment illustrated in FIG. 5, there are "m" view-based classifiers. Each of the view-based classifiers is designed to detect one orientation of a particular object (e.g., a human face). Blocks 36, 38, and 40 represent view-based classifiers designed to detect object orientations 1, 2, . . . , m. The results of the application of the view-based classifiers are then combined at block 42. The combined output indicates specific 3D objects (e.g., human faces) present in the input 2D image.

It is noted that although the following discussion illustrates application of the object finder program 18 to detect human faces and cars in photographs or other images, that discussion is for illustrative purpose only. It can be easily evident to one of ordinary skill in the art that the object finder program 18 of the present invention may be trained or modified to detect different other objects (e.g., shopping carts, faces of cats, helicopters, etc.) as well.

Figure 5:
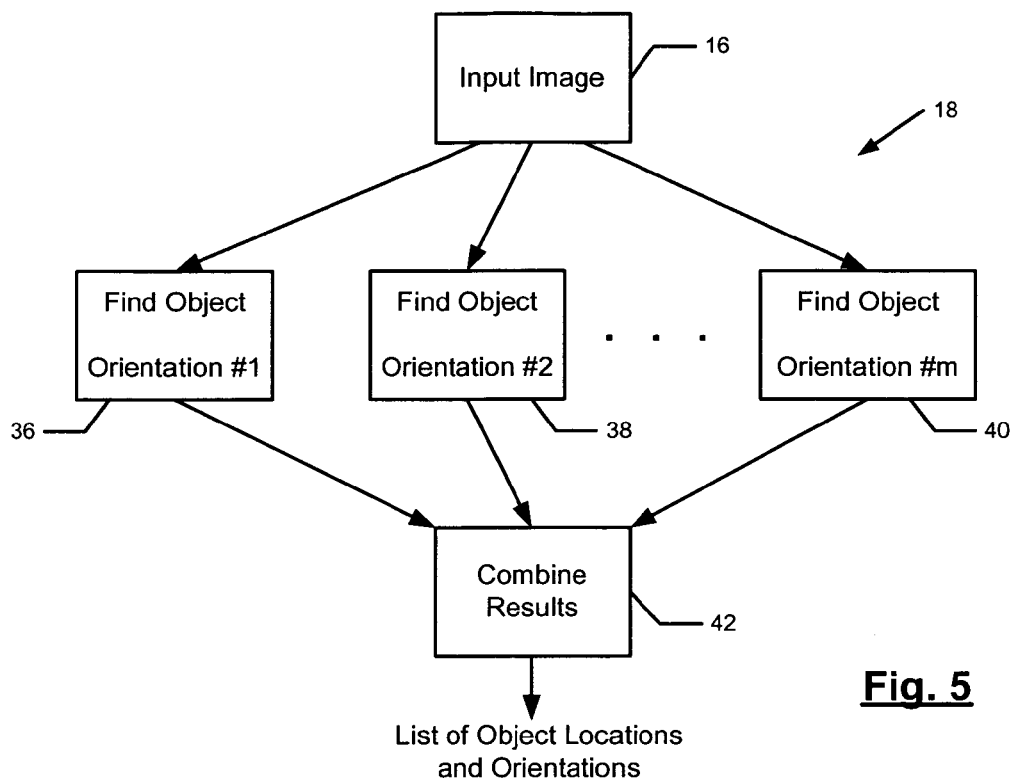
FIG. 5 shows the view-based classification approach utilized by the object finder program to detect object locations and orientations according to an embodiment of the present invention.
Figure 6:
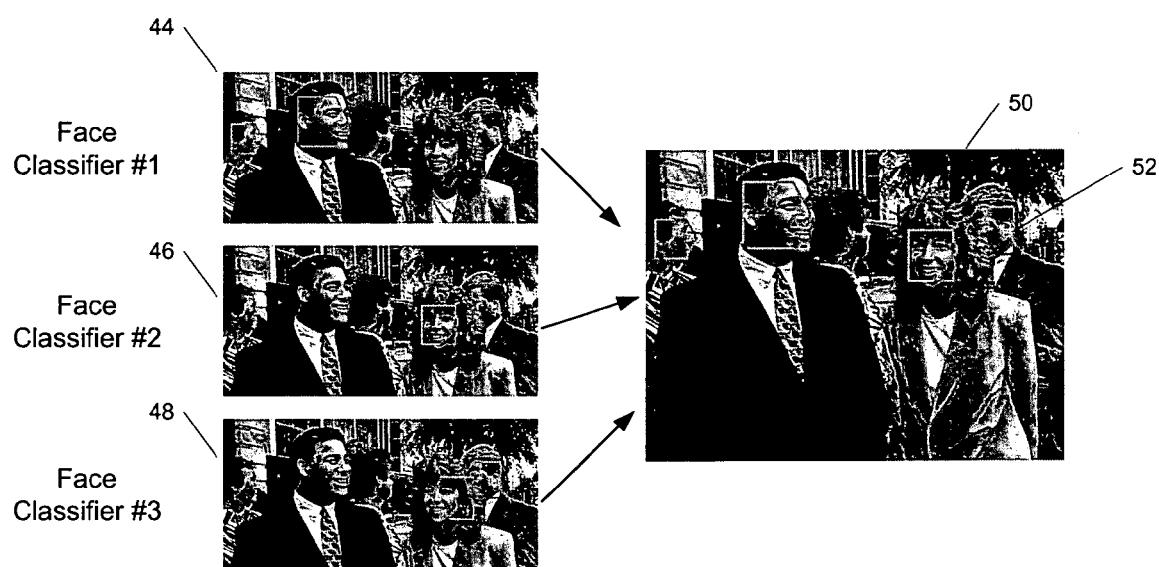
FIG. 6 is a real-life illustration of the object classification approach outlined in FIG. 5.

FIG. 6 is a real-life illustration of the object classification approach outlined in FIG. 5. As noted hereinbefore, each view-based classifier is specialized to detect a specific orientation of a given object—i.e., the object (e.g., a human face, or a car) that the view-based classifier is trained to detect. As illustrated in FIG. 6, for example, one classifier may be specialized to detect right profile views of faces as shown by the object marker 52 (generated by the classifier upon detecting the corresponding object orientation) in the picture slide 44. The picture slide 44 may thus represent the result obtained at block 36 in FIG. 5. Similarly, a different view-based classifier may be specialized to detect frontal views as illustrated by the marked-up version of the picture slide 46 in FIG. 6 (corresponding, for example, to block 38 in FIG. 5). Finally, another classifier may be configured to detect left profile views of human faces as illustrated by the marked-up version of the picture slide 48 in FIG. 6 (corresponding, for example, to block 40 in FIG. 5). Each picture slide shows object markers 52 placed at appropriate orientations of human faces detected by corresponding classifiers. These view-based classifiers are applied to the input image 16 independently and their results are then combined as shown by the final picture slide 50 in FIG. 6 (corresponding, for example, to the block 42 in FIG. 5). If there are multiple detections at the same or adjacent locations, the object finder 18 may choose the strongest detection. For example, in FIG. 6, picture slides 46 and 48 represent multiple detections (frontal face detection and left-hand side view detection) for the female face illustrated therein. In that event, the final combined output may represent the strongest detection—i.e., the frontal face detection in slide 46. The object finder 18 may thus find orientations and locations of multiple objects (e.g., several human faces) in an image.

FIG. 7 shows an example of different orientations for human faces and cars that the object finder program 18 may be configured to model. The number of orientations to model for each object (e.g., a human face or a car) may be empirically determined. In the embodiment illustrated in FIG. 7, two view-based classifiers—frontal (54A) and right profile (54B)—are used to detect front and right profiles of human faces. To detect left-profile faces (as, for example, illustrated in the picture slide 48 in FIG. 6), the right profile classifier 54B may be applied to a mirror-reversed input image. For cars, eight classifiers—one frontal classifier 56A and seven right-side classifiers 56B–56H—may be used as shown in FIG. 7. Again, the left side views (of cars) may be detected by running the seven right-side classifiers (56B–56H) on mirror-reversed images. It is noted that the numerals 54A–54B and 56A–56H are used hereinbelow to represent corresponding view-based classifiers for ease of description.

II. Classifier Description and Generation

As noted hereinbefore, a challenge in object detection is the amount of variation in visual appearance, e.g., faces vary from person to person, with facial expression, lighting, etc. Each view-based classifier (e.g., classifiers 54A–54B or 56A–56H in FIG. 7) uses statistical modeling to account for this variation within the category of object it is trained to detect.

In one embodiment two statistical distributions are modeled for each view-based classifier—the statistics of the appearance of the given object in the image window 32, P(image-window|$\omega_1$) where $\omega_1$=object, and the statistics of the visual appearance of the rest of the visual world, which are identified by the "non-object" class, P(image-window|$\omega_2$), where $\omega_2$=non-object. The classifier combines these in a likelihood ratio test. Thus, the classifier 34 may compute the classification decision by retrieving the probabilities associated with the given input image window 32, P(image-window|$\omega_1$) and P(image-window|$\omega_2$), and using the log likelihood ratio test given in equation (3) below:

$$H(image-window) = \log\frac{P(\text{image\_window} | \omega_1)}{P(\text{image\_window} | \omega_2)} > \lambda \quad (3)$$

$$\left(\lambda = \log\frac{P(\omega_2)}{P(\omega_1)}\right)$$

If the log likelihood ratio (the left side in equation (3)) is greater than the right side, the classifier 34 decides that the object is present. Here, "$\lambda$" represents the logarithm of the ratio of prior probabilities (determined off-line as discussed later hereinbelow). Often, prior probabilities are difficult to determine, therefore, by writing the decision rule this way (i.e., as the equation (3)), all information concerning the prior is combined into one term "$\lambda$".

The term "$\lambda$" can be viewed as a threshold controlling the sensitivity of a view-based classifier. There are two types of errors a classifier can make. It can miss the object (a false negative) or it can mistake something else for the object (a false positive)(such as a cloud pattern for a human face). These two types of errors are not mutually exclusive. The "$\lambda$" controls the trade-off between these forms of error. Setting "$\lambda$" to a low value makes the classifier more sensitive and reduces the number of false negatives, but increases the number of false positives. Conversely, increasing the value of "$\lambda$" reduces the number of false positives, but increases the number of false negatives. Therefore, depending on the needs of a given application, a designer can choose "$\lambda$" empirically to achieve a desirable compromise between the rates of false positives and false negatives.

It is noted that the log likelihood ratio test given in equation (3) is equivalent to Bayes decision rule (i.e., the maximum a posteriori (MAP) decision rule) and will be optimal if the representations for P(image-window|object) and P(image-window|non-object) are accurate. The functional forms chosen to approximate these distributions are discussed hereinbelow.

A. Classifier as a Sum of Sub-Classifiers

It is not computationally possible to represent the full joint distributions, P(image-window|object) and P(image-window|non-object). The image window 32 may encompass several hundred or even thousands pixel variables. It is not computationally feasible to represent the joint distribution of such a large number of variables without strong assumptions about their statistical structure. Therefore, these distributions must be approximated by making assumptions about their statistical characteristics. The chosen functional form for these distributions represents these assumptions about statistical characteristics. One such assumption is to use the naïve Bayes classifier formulation that models all variables as statistically independent. However, such an assumption may be too severe for many problems. It may be desirable to represent statistical dependency in a limited fashion. One such formulation is to model the joint statistics of selected subsets of variables and then treat the subsets as statistically independent. Under this assumption, the classifier, H(image_window) representing equation (3) takes the following form:

$$H(x_l, \ldots, x_r) = \log\frac{P(S_1 | \omega_1) P(S_2 | \omega_1) \ldots P(S_n | \omega_1)}{P(S_{n+1} | \omega_2) P(S_{n+2} | \omega_2) \ldots P(S_{n+m} | \omega_2)} > \lambda \quad (4)$$

$$S_1, \ldots, S_{n+m} \subset \{x_1, \ldots, x_r\}$$

Where the image_window 32 consists of the variables (consisting of pixels or coefficients generated by a transformation on the pixels) $\{x_1 \ldots x_r\}$ and where each $S_k$ is a subset of these variables and the subsets, $S_k$, are not necessarily mutually exclusive.

Alternatively, the classifier can be represented in a slightly more specific form where the subsets are the same for both classes in equation (8A).

$$H(x_l, \ldots, x_r) = \log\frac{P(S_1 | \omega_1)}{P(S_1 | \omega_2)} + \quad (8A)$$

$$\log\frac{P(S_2 | \omega_1)}{P(S_2 | \omega_2)} + \ldots + \log\frac{P(S_n | \omega_1)}{P(S_n | \omega_2)} > \lambda$$

In equation (8A), each of the individual terms of the equation will henceforth be referred to as a "sub-classifier" within the classifier. The probability distributions forming each sub-classifier can take many functional forms. For example, they could be Gaussian models, mixture models, kernel-based non-parametric representation, etc. Moreover, the classifier can be expressed as a sum of sub-classifiers:

$$H(x_1, \ldots x_r) = h_1(S_1) + h_2(S_2) + \ldots + h_n(S_n) > \lambda \quad (8B)$$

Note that each such sub-classifier, $h_k(S_k)$, does not necessarily have to take the form of a ratio of two probability distributions. Discriminant functions of various forms (e.g. logistic linear discriminant function, multilayer perceptron neural networks, etc.) are also admissible. Nor does each sub-classifier have to be the same functional form. However, as described in more detail hereinafter, in one embodiment each probability distribution in each sub-classifier in equation (8A) is represented by a table.

In forming the decomposition of the classifier into sub-classifiers, equation (8) implicitly assumed that the subsets, $S_k$, are statistically independent for both the object and the non-object. However, it can be shown that this assumption can be relaxed if the goal is accurate classification not accurate probabilistic modeling as discussed in P. Domingos and M. Pazzani, "On the Optimality of the Simple Bayesian Classifier under Zero-One Loss", Machine Learning, 29, pp. 103–130, 1997. Indeed, they show that violating statistical independence for a naïve Bayes classifier does not always degrade performance. They show that the naïve Bayes classifier gives good empirical performance, comparable to other classifiers, on a number of problems in which statistical independence does not exist among the input variables. They also prove that it is theoretically optimal for a few cases in which statistical independence does not hold, such as conjunctions and disjunctions. However, for most cases, the complex behavior when statistical independence assumptions are violated makes analysis difficult.

In one embodiment, the selection of the subsets of input variables, $S_k$, supplying each sub-classifier of the classifier of equation (8A) may be achieved by the statistical methods as described hereinbelow.

B. Sub-Classifier Description and Generation

Figure 28:
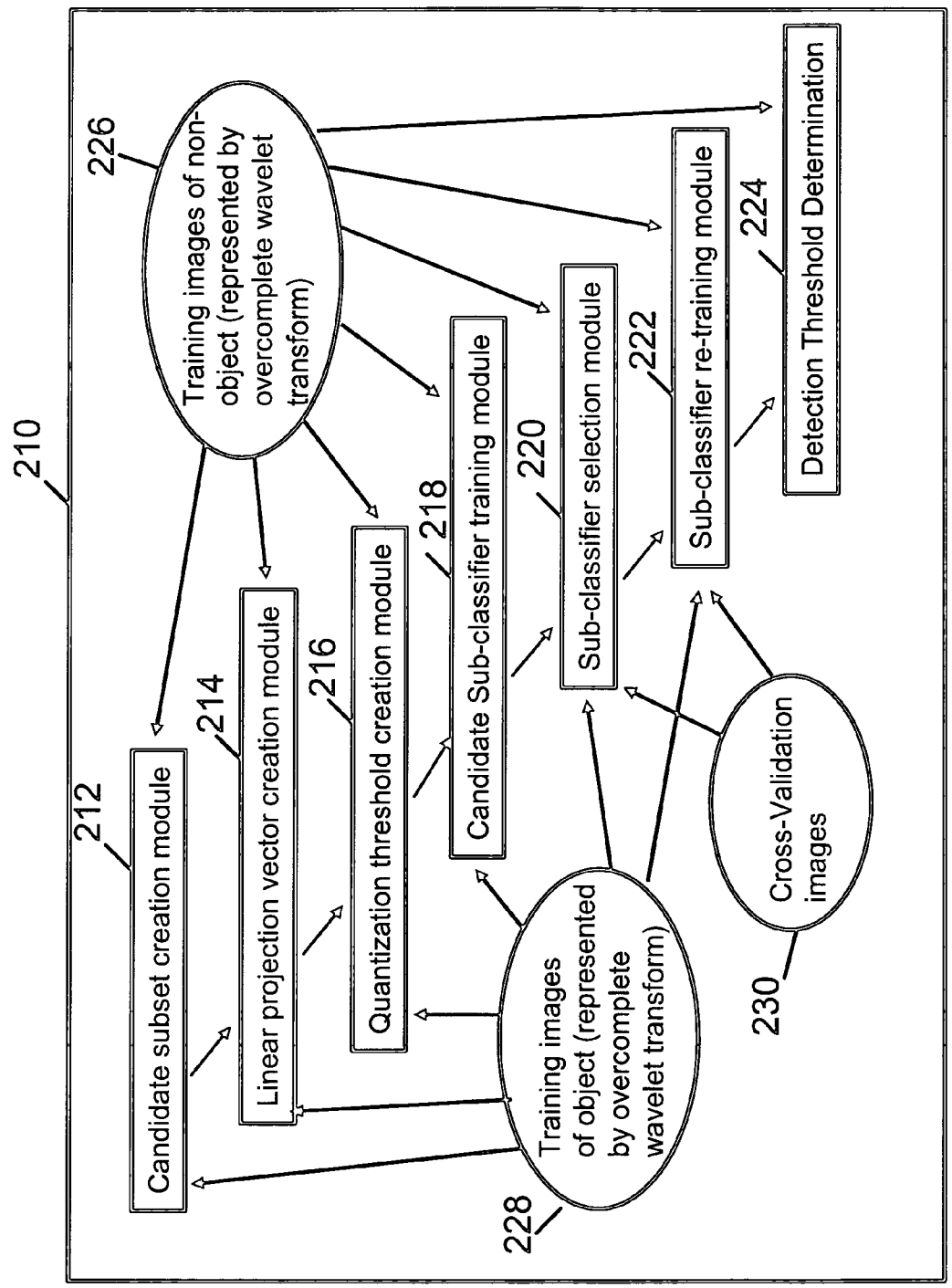
FIG. 28 is a diagram of a system for automatically choosing a set of sub-classifiers according to one embodiment of the present invention.

FIG. 28 is a block diagram of a system 210 for automatically creating sub-classifiers according to one embodiment of the present invention. The system 210 can use statistical methods to choose the sub-classifiers composing each classifier of the object finder program. The system 210 may be implemented using a computing device such as, for example, a personal computer, a laptop computer, a workstation, a minicomputer, a mainframe, a handheld computer, a small computer device, or a supercomputer, depending upon the application requirements.

As illustrated in FIG. 28, the system 210 may include training images for the object class 228, training images for the non-object class 226, and cross-validation images (testing images in which the locations of the object are labeled) 230. In addition, the system 210 may include a candidate subset creation module 212, a linear projection vector creation module 214, a quantization threshold creation module 216, a candidate sub-classifier training module 218, a sub-classifier selection module 220, a sub-classifier retraining module 222, and a detection threshold determination module 224. The system modules 212, 214, 216, 218, 220, 222, 224 may be implemented as software code to be executed by a processor (not shown) of the system 210 using any suitable computer language such as, for example, Java, Ada, C or C++ using, for example, conventional or object-oriented techniques. The software code may be stored as a series of instructions or commands on a computer-readable medium, such as a random access memory (RAM), a read only memory (ROM), a magnetic medium such as a hard-drive or a floppy disk, or an optical medium such as a CD-ROM.

The object training images 228 are representative example images of the object. (e.g., human faces or cars). In one embodiment, for each face viewpoint, about 2,000 original images are used; and for each car viewpoint, between 300 and 500 original images are used. Each of these training images can be sized, aligned, and rotated to give the best correspondence with a prototype representing the image class (e.g., frontal faces). The size of each such training image may be identical to the size of the classification window 32. For each original image, approximately 400 synthetic variations can also be generated by altering background scenery and making small changes in aspect ratio, orientation, frequency content, and position. It is noted that increasing the number of original images and synthetic variations will increase the computational time required for the modules in 210 but may also increase the accuracy of the classifier. The number of original training images and the number of synthetic variation each original image may be determined by the desired accuracy of detection, the availability of suitable training images, and limitations on the amount of time and computer resources that can be devoted to the computations among the modules in 210.

Non-object examples 226 are taken from images that do not contain the object. In one embodiment, approximately 600,000 examples are used. The selection of non-object examples is described in more detail hereinafter.

The cross-validation images 230 are images of realistic scenes that often contain the object. The locations of the object are known (usually entered by hand) and used to measure and compare the accuracy of various components of the algorithm as described hereinbelow.

1. Creating a Set of Candidate Subsets

Figure 29:
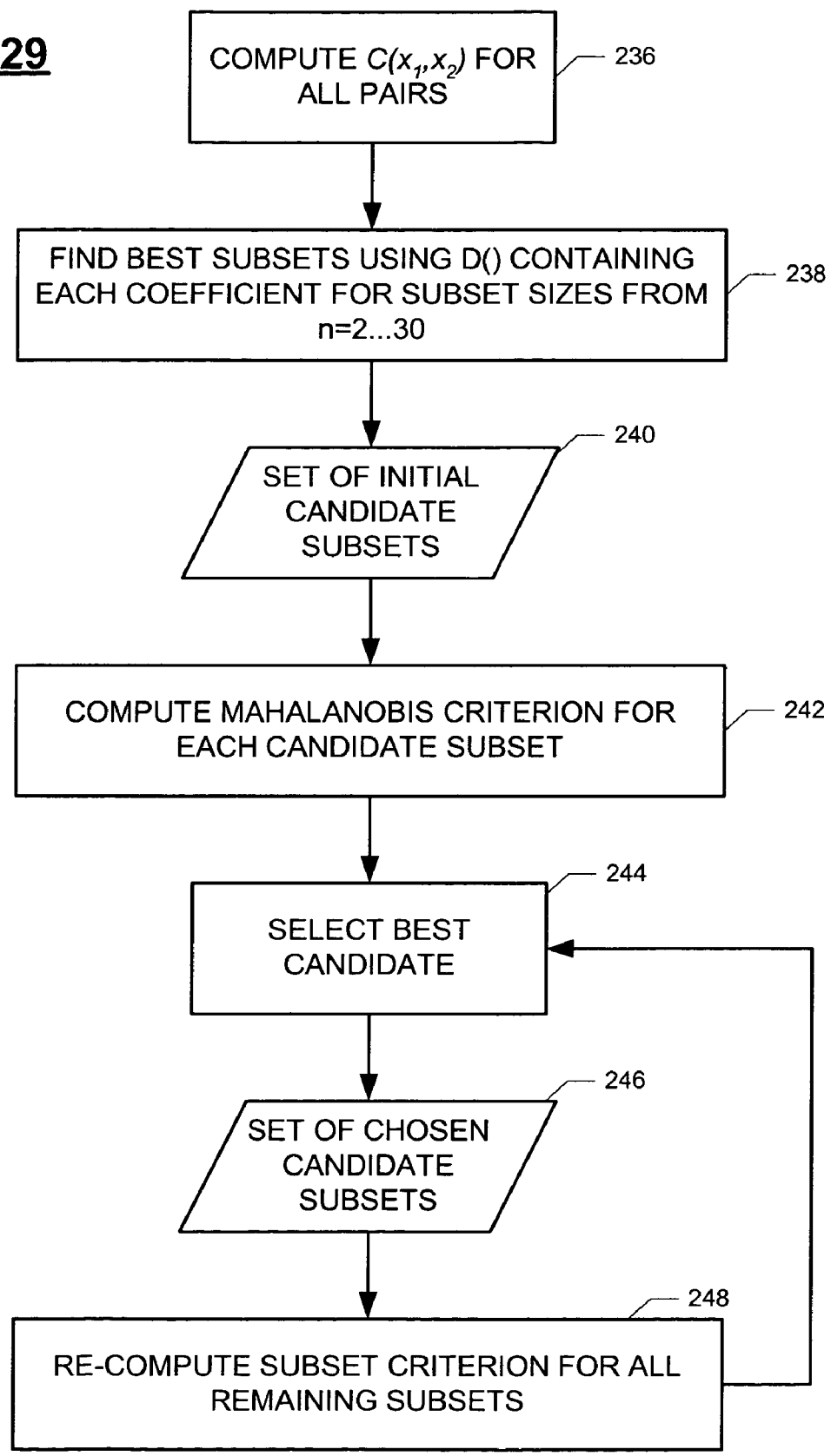
FIG. 29 is a flowchart illustrating the process flow through the candidate coefficient-subset creation module according to one embodiment of the present invention.

According to one embodiment, the candidate subset creation module 212 may create a set of candidate subsets of input variables. Each subset, $S_k$, provides the input to one sub-classifier. FIG. 29 is a flow chart illustrating the process flow for the candidate coefficient-subset creation module 212 according to one embodiment of the invention. The steps of FIG. 29 are described in more detail hereinbelow.

The input variables may be pixels or variables derived from a transformation of the input pixels. In one embodiment, the input variables are wavelet coefficients, generated by applying, for example, 5/3 or 4/4 symmetric filter banks to the input pixels. In one embodiment the coefficients of a symmetric 4/4 filter bank are (1.0, 3.0, 3.0, 1.0) for the low-pass filter and (−1.0, −3.0, 3.0, 1,0) for the high pass filter. In another embodiment the coefficients of the 5/3 filter bank are (−1.0, 2.0, 6.0, 2.0, −1.0) for the low pass filter and (2.0, −4.0, 2.0) for the high-pass filter. Filter-bank implementation for any filter-pair is discussed in G. Strang and T. Nguyen, "Wavelets and Filter Banks", Wellesley-Cambridge Press, 1997, the disclosure of which is incorporated herein by reference.

Figure 10:
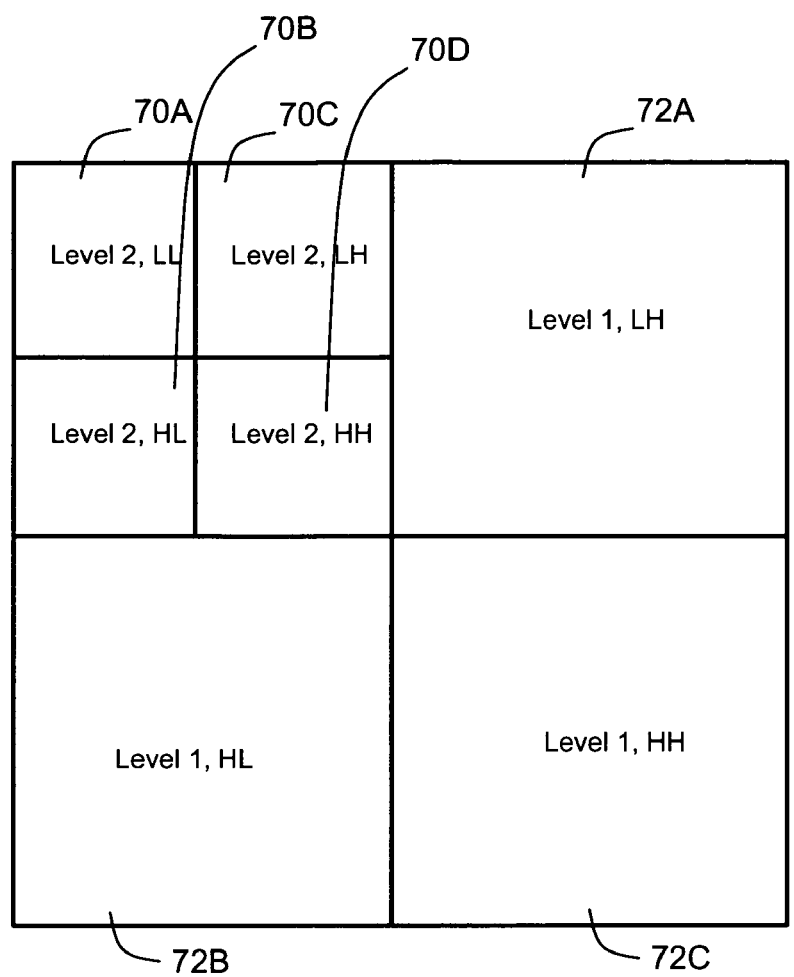
FIG. 10 shows a set of subbands produced by a wavelet transform based on a two-level decomposition of an input image using a filter-bank according to one embodiment of the present invention.

FIG. 10 shows an exemplary set of subbands produced by a wavelet transform using a 2 (two) level decomposition of an input image. The wavelet transform organizes the input image into subbands that are localized in orientation and frequency. For the embodiment illustrated in FIG. 10, the filter-bank produces 7 (seven) subbands—four subbands 70A–70D at level-2 and three subbands 72A–72C at level-1. Within each subband, each wavelet transform coefficient 80 (FIG. 11) is spatially localized.

Figure 11B:
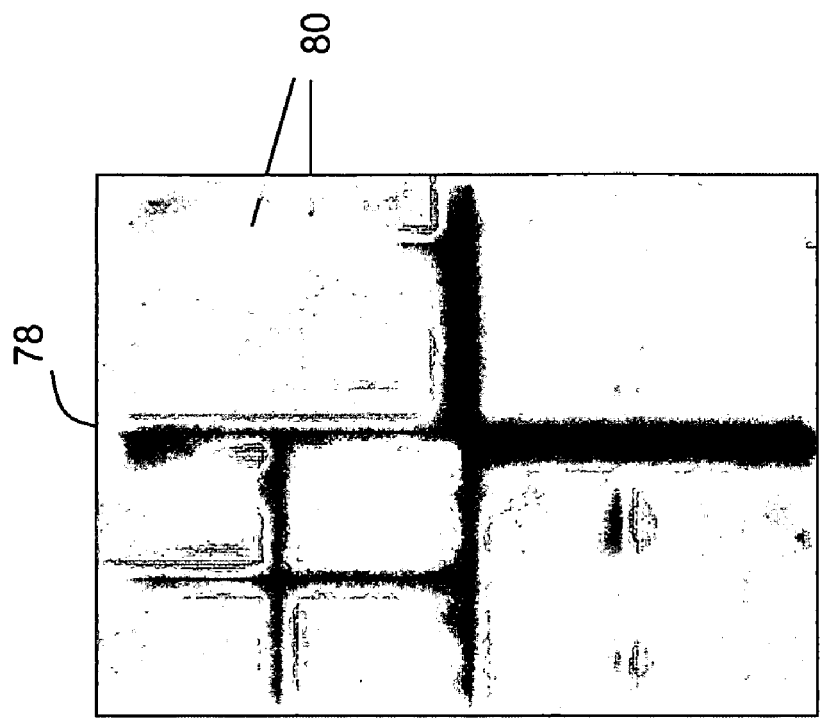
FIGS. 11A and 11B depict an input image and its wavelet transform representation using a symmetric 4/4 filter bank according to one embodiment of the present invention.
Figure 11A:
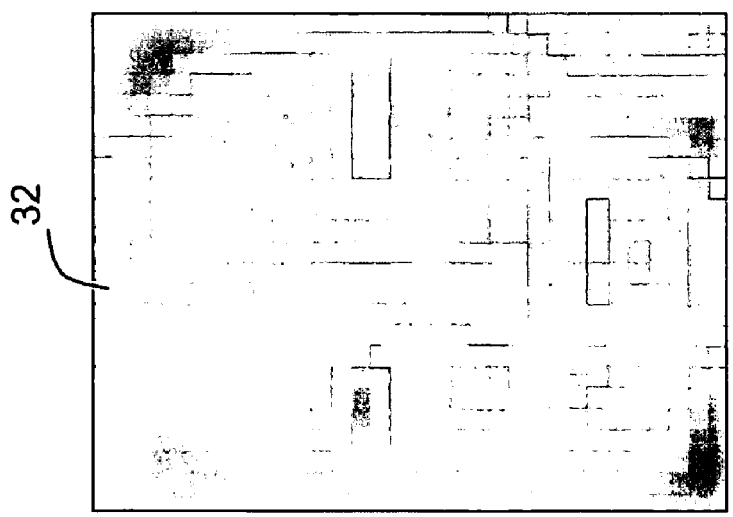

FIG. 11A depicts an input window 32 and FIG. 11B depicts its two level wavelet transform representation 78 generated by a symmetric 4/4 filter bank. Seven subbands are visible on the wavelet decomposition 78. The wavelet transform coefficients 80 are also shown in FIG. 11B. The coefficients 80, as discussed above, are spatially localized within appropriate subbands. It is noted that each level in a wavelet transform represents a lower octave of frequencies. Thus, a coefficient in level-2 (i.e., subbands 70A–70D) describes 4 (four) times the area of a coefficient in level-1 (i.e., subbands 72A–72C). In other words, the wavelet representation 78 shows a gradation of details (of the input image) with level-2 coefficients representing coarse details and level-1 coefficients representing finer details.

In one embodiment an overcomplete wavelet transform is generated by a polyphase filter bank or other suitable computational method (e.g. lifting) applied to the input window 32 as described in Strang and Nguyen.

In one embodiment, each wavelet transform may consist of two (2) or more levels (see, for example, FIG. 10 for a two level example). It is generated by the process shown in FIG. 17A. In this process, an input is transformed to a level 1 transform. The LL band of level 1 is then expanded to generate level 2. If a third level or more levels are desired, each level is generated from the LL subband of the level that preceded it.

Figure 17B:
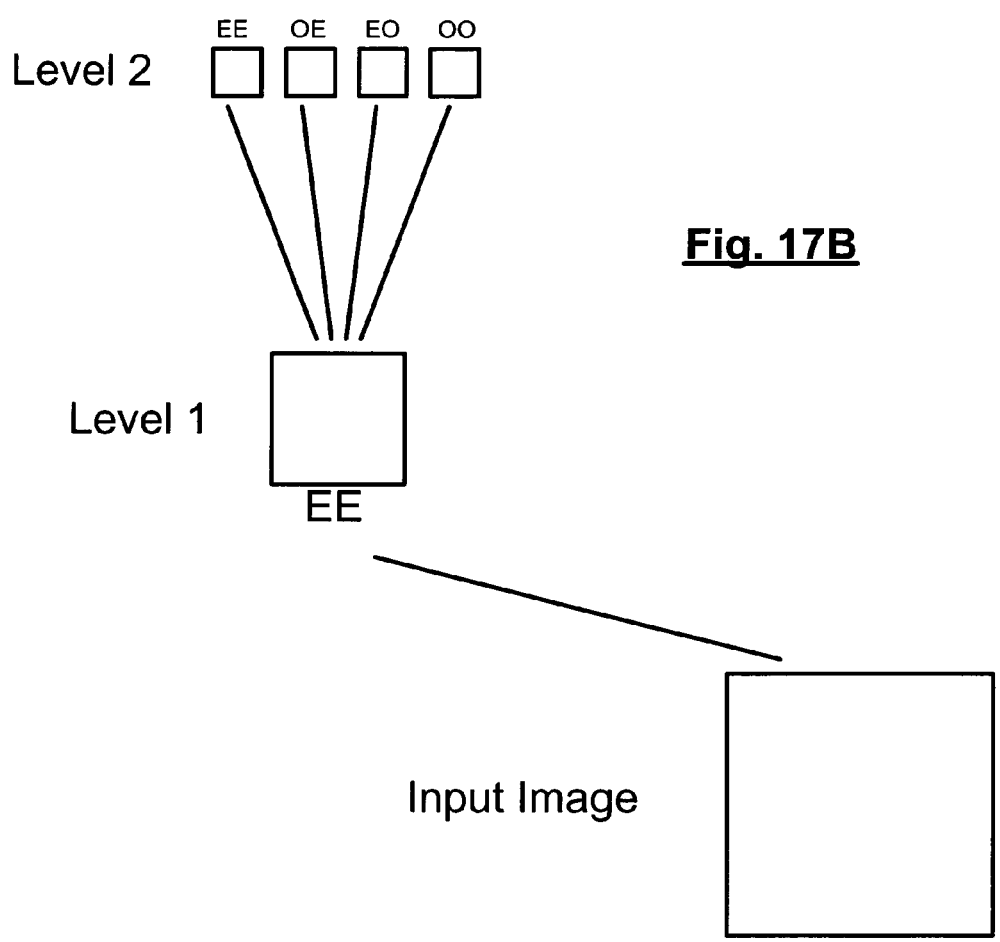
FIG. 17B illustrates a partially overcomplete wavelet decomposition, and fully
Figure 17C:
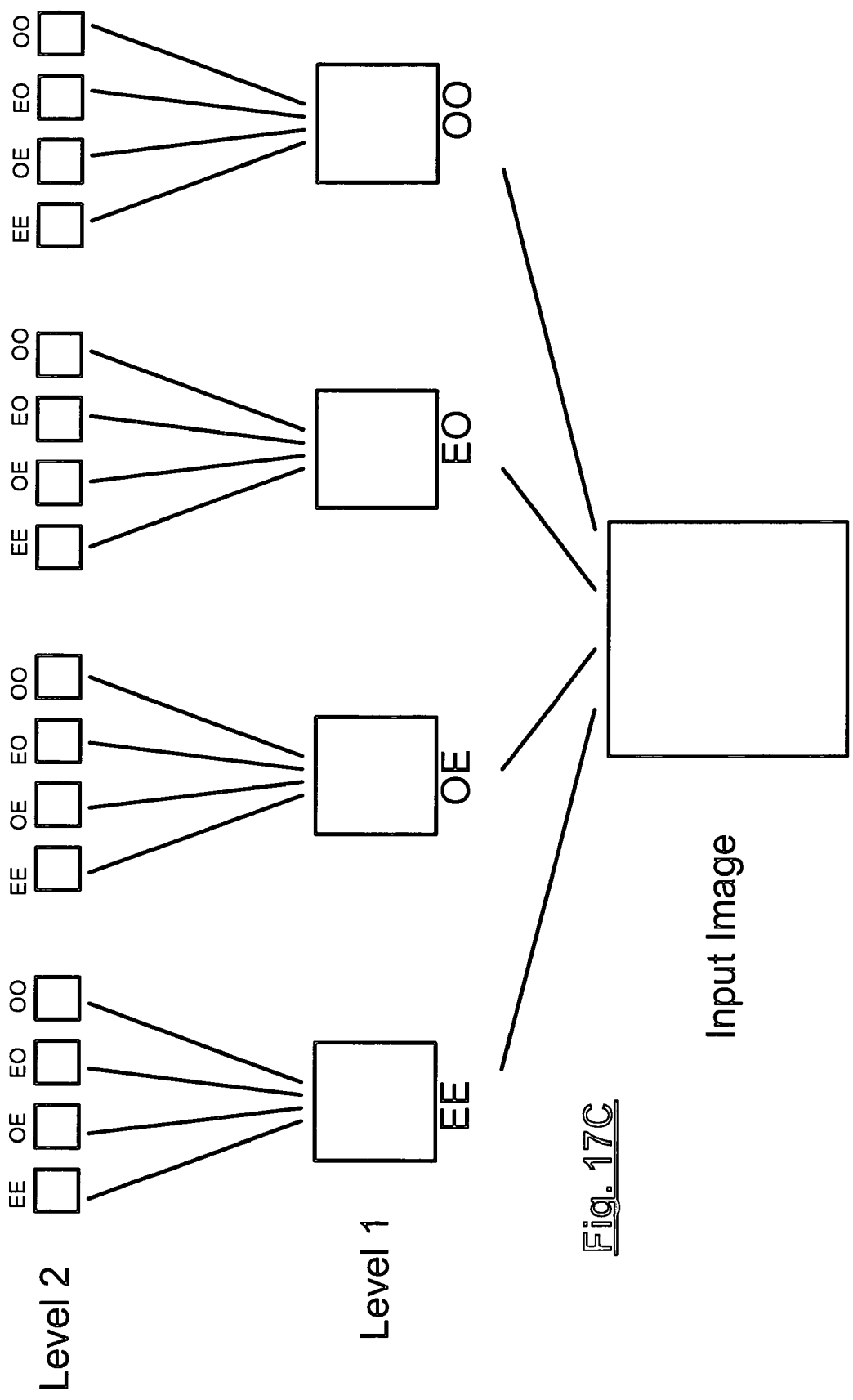
FIG. 17C illustrates a fully overcomplete wavelet decomposition for a two level transform.

The fully overcomplete wavelet transform at each stage in this process is a redundant version of the ordinary wavelet transform. In the overcomplete wavelet transform, four (4) redundant "phases" are generated at each stage in this process as shown in FIG. 17C (as compared with one phase in the critically sampled case of FIG. 18A). Each phase, the even-even (EE) phase, the even-odd (EO) phase, the odd-even (OE) phase, and the odd-odd (OO) phase correspond to a positional shift of the input. For example, the odd-odd phase of level 1 corresponds to the wavelet transform of the input image shifted by one in both the horizontal and vertical directions. If this transform is thought of as a tree, any branch (or path) starting at the input image and terminating in level 2 could be thought of as a redundant wavelet transform. For example the combination of level 1 OO and the level 2 OO (generated from level 1 OO) would be one redundant wavelet transform corresponding to the critically sampled wavelet transform of the input shifted by 3 in both directions. In this representation there are 16 such redundant transforms.

In one embodiment, on each training example, the fully overcomplete transform is computed. This process effectively gives sixteen (16) synthetic variations of the originally training example where the variations correspond to positional shifts of the input as described hereinabove. Each of these sixteen (16) variants will each be henceforth be separate training examples and the wavelet coefficients forming each are the variables, which are decomposed into subsets.

These wavelet variables may be decomposed into subsets using the following process. Let C be a measure given by the absolute difference between the "true" log-likelihood ratio, when a subset of variables is modeled by its full joint distribution, and the log-likelihood ratio when the subset of variables is modeled with partial or complete statistical independence. Referring to FIG. 29, C can be calculated for every combination of two variables at block 236 using equation (9) below:

$$C = \int\int \text{abs}\left(\log\frac{P(x_1, x_2 \mid \omega_1)}{P(x_1, x_2 \mid \omega_2)} - \right.$$ (9)

-continued
$$\left.\log\frac{P(x_1 \mid \omega_1)}{P(x_1 \mid \omega_2)}\frac{P(x_2 \mid \omega_1)}{P(x_2 \mid \omega_2)}\right)P(x_1, x_2)dx_1dx_2$$

In one embodiment, C is computed by quantizing each variable and estimating the probability distributions by using histograms collected from the training examples from each class, $\omega_1$ (object training examples) and $\omega_2$ (non-object training examples). In one embodiment, each variable is quantized to five levels, where the quantization levels are chosen as a function of the mean ($\mu$) and standard deviation ($\sigma$) of the variable with respect to the $\omega_1$ class with thresholds at $\mu-0.7\sigma$, $\mu-0.15\sigma$, $\mu+0.15\sigma$, $\mu+0.7\sigma$. Each joint distribution is represented by a histogram with twenty-five (25) bins and each distribution of one variable is represented by a histogram of five (5) bins. A discussion of histograms follows hereinbelow.

A subset of variables can be evaluated by taking the sum of the values of C for all pairs of variables within the subset. The sum of the values of C evaluated for all pairs of variables in the subset, S, can be called $D_S$, and can be given by equation (10) below:

$$D_s = \frac{1}{N(N-1)} \sum_{\substack{x_j, x_k \in S \\ x_j \neq x_k}} C(x_j, x_k) \quad N = |S| \quad (10)$$

where N represents the number of elements in the subset. A high value of $D_S$ corresponds to a high degree of dependence among the variables in the subset.

In one embodiment, D can be used to select a set of subsets with high degrees of dependence at block 238 in FIG. 29. Due to the sheer number of possible combinations, it can be impractical to evaluate equation (10) for all possible subsets of variables, so an alternative method can be used. For each particular variable, the best subsets containing that particular variable, and up to N total variables can be selected by heuristic search in step 238. In this heuristic search the heuristic evaluation function is simply D, given by equation (10). The result of step 238 may guarantee that each variable will occur in at least N initial candidate subsets. N is the range of subset sizes that, in one embodiment, can be between two and thirty, for example. The set of best subsets resulting from step 238 can comprise the set of initial candidate subsets 240.

The set of initial candidate subsets 240 may be broken down further into groups of subsets containing the same number of variables. A criterion can be assigned to each subset within such a group of subsets. In one embodiment, the criterion can initially be a Mahalanobis distance (M), calculated in step 242. M for a specific subset is computed by dividing the Euclidean distance between its value of D and the mean of the value of D ($\overline{D}$) of all members of the group of subsets, by the variance ($\overline{D}_\sigma$) of the same. The Mahalanobis distance is given by equation (11) below:

$$M = \frac{D_1 - \overline{D}}{\overline{D}_\sigma} \quad (11)$$

The subset with the greatest Mahalanobis distance can, in one embodiment, become the first member of the set of chosen candidate subsets 246 in step 244. Then, the subset criteria for all remaining candidate subsets may be recalculated in step 248. Recalculating the subset criteria can avoid the selection of a group of subsets containing largely the same variables. For example, a group of subsets chosen by Mahalanobis distance only, without recalculation, may be no more than supersets or subsets of each other.

In one embodiment, the criterion can be recalculated by penalizing each remaining candidate subset based on its commonality with those subsets that have already been selected. The remaining candidate subsets can be penalized, for example, for: (1) the number of times a given variable has occurred in any selected set, (2) the largest union with any selected set, (3) the number of times a subset of that size has already been selected, band/or (4) the number of times that particular combination of subbands has occurred among selected subsets. In one embodiment, the subsets are scored by the following criterion: mahalanobis_distance*size_factor*description_factor* max_overlap*total_overlap. Each of the factors multiplying the Mahalanobis distance reduces the value of criterion as a function of the subset's overlap with previously selected subsets. The size factor penalizes for the number of subsets of the current size N. For example, if the there are current $n_i$ subsets of size $N=N_i$, and there are a total of $n_t$ selected subsets, then the size factor is $(n_t-n_i)/n_t$. The description factor penalizes for the number of times a particular combination of subbands has been used in the previously selected subsets. For example, for a 2 level transform there are seven (7) subbands: level 1—HL, level 1—LH, level 1—HH, level 2—LL, level 2—HL, level 2—LH, level 2—HH and hence there are $2^7$ possible combinations of these subbands. Each subset will be one of these combinations. For a given subset that has combination k, the description factor is given by $(n_t-n_k)/n_t$ where $n_k$ is the number of times combination k has occurred among the selected subsets. The max overlap factor penalizes for the most elements the current subset has in common with any individual chosen subset. For example if subset i has $n_m$ elements in common with subset k (which has been previously selected) which has $n_k$ elements, the max overlap factor is $(max (n_i, n_k)-n_m)/max(n_i, n_k)$. The total overlap factor penalizes for all coefficients in the current subset has in common with coefficients from all the chosen subsets. The total overlap factor is given by $(n_i-n_o+1)/n_i$, where $n_i$ is the total number of coefficients in subset i and $n_o$ is the number of these coefficient that occur in any of the chosen subsets.

After the criterion for all remaining candidate subsets have been recalculated, the best candidate subset can again be chosen in step 244 to become a member of the set of chosen candidate subsets in step 246. The criterion for all remaining subsets can again be recalculated in step 248. In one embodiment, this process can be repeated until there are, for example, 400 subsets in the set of chosen candidate subsets.

2. Creating Linear Projection Vectors

In one embodiment, each subset of variables can be represented by a linear projection to a smaller number of coefficients. For example, if twelve wavelet coefficients, $w_1, \ldots, w_{12}$, form a given subset, they may be projected down to five coefficients, $p_1, \ldots, p_5$, where each $p_k$ is given by:

$$p_k = v_k^T w$$

$$w = (w_1, \ldots, w_{12})^T$$

In one embodiment the linear projection vectors, $v_k$, are determined by several methods: principal components vectors computed from the object training set, principal components computed over the non-object set, principal components computed over the combined object and non-object training sets, (one skilled in the art of statistics and linear algebra is familiar with the process of principal component analysis) or the Foley-Sammon discriminant vectors (multidimensional extension of Fisher Linear discriminant) between both classes (Foley, D. H. and Sammon, J. W. (1975). An Optimal Set of Discriminant Vectors. IEEE Transactions Computers. Vol. C-24, pp. 281–289.). In one embodiment, the various subbands may be multiplied by scalar constants prior to this computation and correspondingly prior to projection on these linear vectors. In one embodiment all 5/3 filter bank coefficients in all level 1 subbands are multiplied by 0.25 and all coefficients in all level 2 subbands are multiplied by 0.0625. In another embodiment, all 4/4 filter bank coefficients in level 1 are multiplied by 0.0156 and all coefficients in level 2 are multiplied by 0.00024414.

3. Selecting Quantization Thresholds

In one embodiment each subset of projection coefficients can be represented by one discrete value that takes on a finite range of values called the ("quantized feature value") represented by the variable, f. This transformation may be achieved by quantization of the projection coefficients. Several methods of quantization may be used and their quantization thresholds may be determined by the following procedure:

In one method, (referred to herein for the sake of convenience as "scalar quantization 1") each variable is first separately quantized. The quantization boundaries may be set in terms of the mean ($\mu$) and standard deviation ($\sigma$) of the variable computed over the object training images. For example, a variable could be quantized to five (5) values with the following quantization boundaries:

$$d < \mu - \sigma$$

$$\mu - \sigma \leq d < \mu - 0.5\sigma$$

$$\mu - 0.5\sigma \leq d < \mu + 0.5\sigma$$

$$\mu + 0.5\sigma \leq d < \mu + \sigma$$

$$\mu + \sigma \leq d$$

The quantized feature value, f can then be uniquely computed from this conglomerate of the quantized projection coefficient values. For example if there are three quantized projection values, $e_1$, $e_2$, and $e_3$, that each take on 5 possible values from 0 to 4, then f takes a value from 0 to 124 given by:

$$f = e_1 + 5e_2 + 5^2 e_3$$

In another method, (referred to herein as "vector quantization #1"), the projection coefficients can be quantized by a form of vector quantization. The final quantized feature value, f, is computed from a truncated ordering of the coefficients magnitudes. For example, in one embodiment with 5 projection coefficients, the 3 largest coefficients are placed in order of their magnitude. There are 60 (=5!/2!) possible orderings of these 3 largest values. Each of these projection coefficients may have a positive or negative sign. The f combines the ordering of the coefficients with their signs (positive or negative) giving a total 480 (=60*$2^3$) possible values for f.

Another method (referred to as "vector quantization #2") may modify vector quantization #1 by considering up to three (3) values whose magnitude exceeds some pre-specified threshold. In one embodiment this threshold is chosen as twice the mean of the coefficients corresponding to the top three (3) projection vectors (in the case of projection vectors derived from principal components analysis) computed from the object training images. f takes on five hundred seventy-one (571) values given by four hundred eighty (480) values (if three coefficients exceed the threshold) plus eighty (80) values (if two coefficients exceed the threshold) plus ten (10) values (if one value exceeds the threshold) plus one (1) value (if no values exceed the threshold).

Another method (referred to as "vector quantization #3) is a modification of "vector quantization #2. It quantizes the coefficient due to the first principal component separately. In one embodiment it quantizes this coefficient into 5 levels where the thresholds for these levels are given by:

$$d < \mu - \sigma$$

$$\mu - \sigma \leq d < \mu - 0.5\sigma$$

$$\mu - 0.5\sigma \leq d < \mu + 0.5\sigma$$

$$\mu + 0.5\sigma \leq d < \mu + \sigma$$

$$\mu + \sigma \leq d$$

This method then applies the vector quantization scheme #2 by ordering the top three (3) of the four (4) remaining coefficients. There are two hundred forty-nine (249) possible values for this value. f overall then has 1245 possible values corresponding to the product of these 249 possible values with five (5) possible values for the quantized first coefficient.

Another method (referred to as "vector quantization #4) is also a modification of vector quantization #2. This method applies vector quantization #2. Then it applies a second threshold to the ordered coefficients. In one embodiment this threshold is the four times the mean of the coefficients corresponding to the top three (3) projection vectors (in the case of projection vectors derived from principal components analysis) computed from the object training images. This method then counts the number of coefficient that exceed this threshold. This number can range from zero (0) to three (3). Therefore, f has four times as many possible values as it does for vector quantization #2.

Often it is useful to use an additional measurement (referred to as "energy orthogonal to the projection") given by the energy orthogonal to projection vectors. This energy equals:

$$g = \sum_{i=1}^{N} w_i^2 - \sum_{j=1}^{Q} d_j^2$$

where N is the number of wavelet coefficients in the subset and Q is the number of projection vectors. In one embodiment, this value can be quantized to four (4) levels. The quantization thresholds may be 0.5 $g_{ave}$, $g_{ave}$, 2.0 $g_{ave}$ where $g_{ave}$ is the average value of g computed over the object training image set. Combining this measurement with any other quantized measurement increases the total number of quantization bins by a factor of four (4).

Often it is useful to use an additional measurement (referred to as "energy of the projection") given by the energy of the projection. This energy equals:

$$h = \sum_{j=1}^{Q} d_j^2$$

where Q is the number of projection vectors. In one embodiment, this variable is quantized to four (4) levels. The quantization thresholds may be 0.5 $h_{ave}$, 2.0 $h_{ave}$, 4.0 $h_{ave}$ where $h_{ave}$ is the average value of h computed over the object training image set. Combining this measurement with any other quantized measurement increases the total number of quantization bins by a factor of four (4).

Another quantization method (referred to as "scalar quantization 1-A") combines scalar quantization #1 with the energy of the projection vectors measurement.

Another quantization method (referred to as "vector quantization 1-A") combines vector quantization #1 with the energy of the projection vectors measurement.

Another quantization method (referred to as "vector quantization 2-A") combines vector quantization #2 with the energy of the projection vectors measurement.

Another quantization method (referred to as "vector quantization 3-A") combines vector quantization #3 with the energy of the projection vectors measurement.

Another quantization method (referred to as "vector quantization 4-A") combines vector quantization #4 with the energy orthogonal of the projection vectors measurement.

Another quantization method (referred to as "scalar quantization 1-B") combines scalar quantization #1 with the energy orthogonal to the projection vectors measurement.

Another quantization method (referred to as "vector quantization 1-B") combines vector quantization #1 with the energy orthogonal to the projection vectors measurement.

Another quantization method (referred to as "vector quantization 2-B") combines vector quantization #2 with the energy orthogonal to the projection vectors measurement.

Another quantization method (referred to as "vector quantization 3-B") combines vector quantization #3 with the energy orthogonal to the projection vectors measurement.

Another quantization method (referred to as "vector quantization 4-B") combines vector quantization #4 with the energy orthogonal to the projection vectors measurement.

Hereinafter discusses an embodiment that uses various combinations of these quantization methods.

4. Training Each Candidate Sub-Classifier

As mentioned earlier, each sub-classifier can take many functional forms (e.g. neural network, linear discriminant function, kernel-density function, etc.) computed over the input classification window 32. In one embodiment described in more detail hereinbelow, a table of log-likelihood values represents the functional form of each sub-classifier where each entry in the table corresponds to a different value of f, the quantized feature value described hereinabove.

Figure 31:
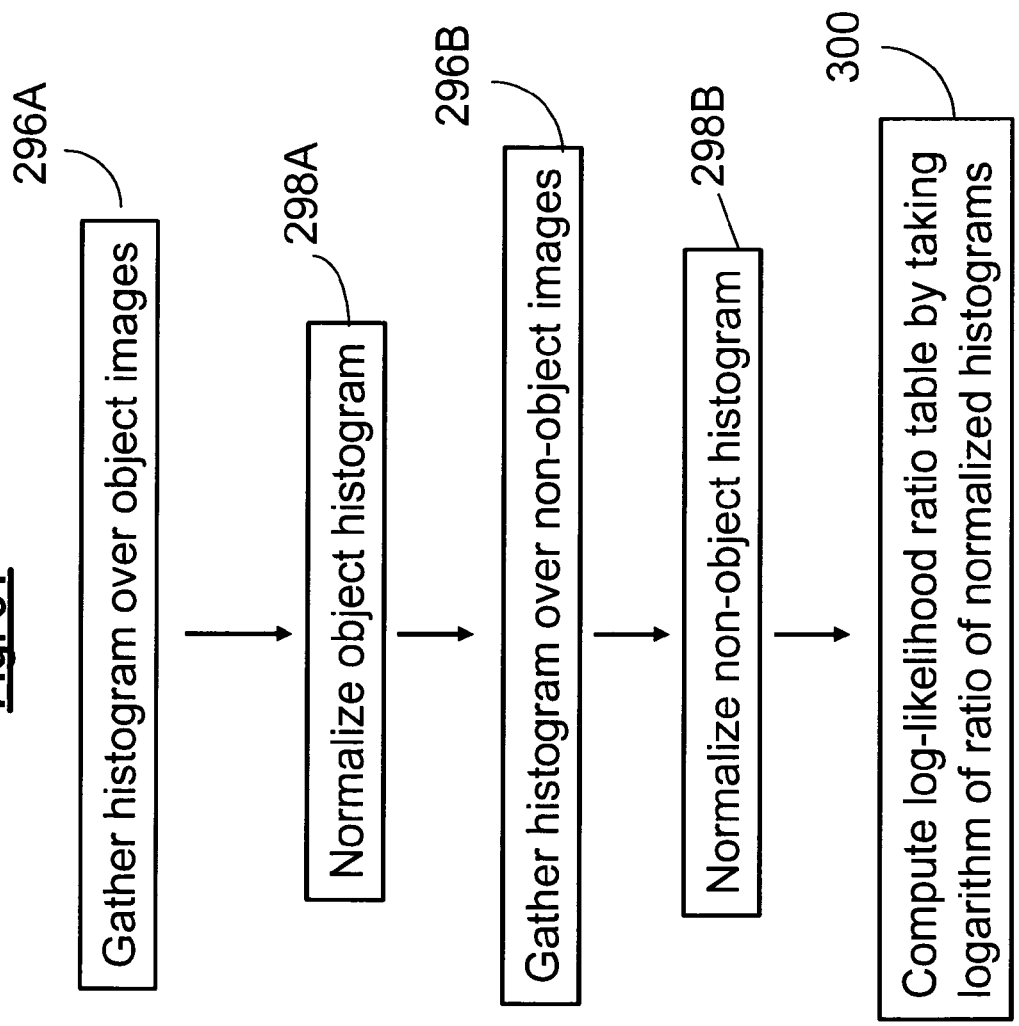
FIG. 31 is a flowchart illustrating the process flow through the sub-classifier training module according to one embodiment of the present invention.

In one embodiment the log-likelihood values in the table are determined from the training data. As illustrated in FIG. 31, this training process may include, gathering histograms over object and non-object training images (steps 296 A, B), normalizing the histograms to compute $P(S_n|\omega_1)$ and $P(S_n|\omega_2)$ (steps 298 A, B), and combining these distributions to get a table of log-likelihood values (step 300).

Figure 9:
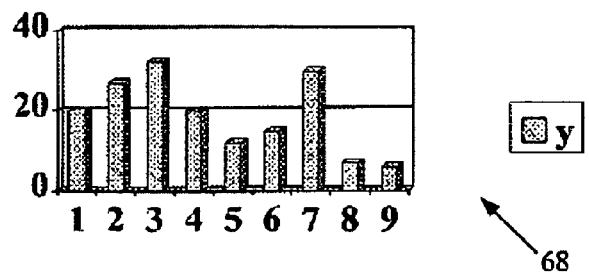
FIG. 9 illustrates an exemplary histogram.

FIG. 9 illustrates an exemplary histogram 68. The histogram 68 shown in FIG. 9 is for illustrative purposes only. In actual operation, the set of histograms for the classifier may contain many more histograms with many different values. A histogram counts the frequency of occurrence of values of a given function. Each column in a histogram is called a "bin." The bin is a count of the number of times a specific value of the given function has occurred. Thus, for example, the bin for y=6 in FIG. 9 shows that the value y=6 has occurred 15 (fifteen) times.

Figure 12:
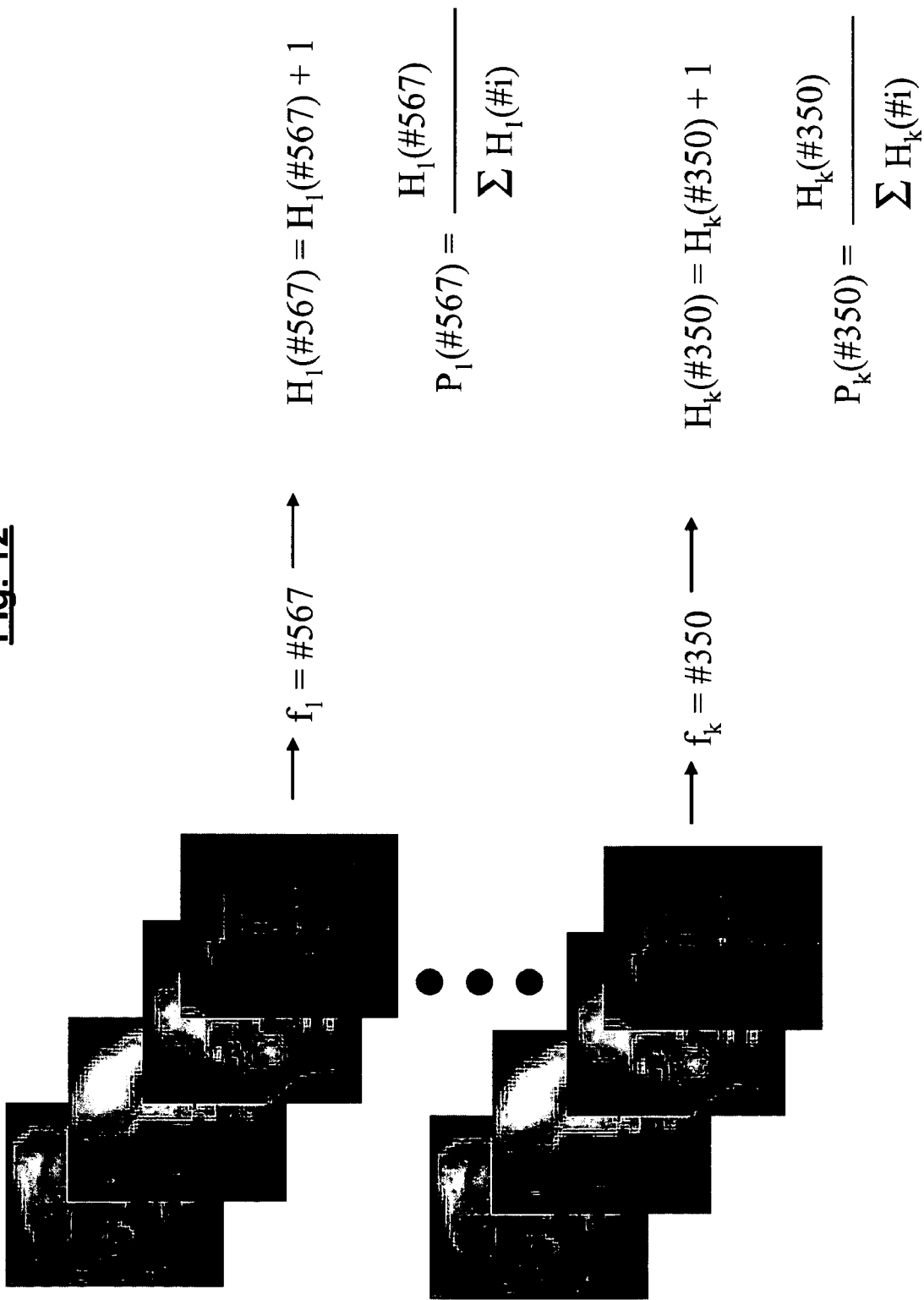
FIG. 12 illustrates an example of how statistics for classifiers are collected off-line using a set of training images according to one embodiment of the present invention.

In one embodiment, statistics for the object training images may be gathered in step 296A (FIG. 31). As shown in FIG. 12, a discrete value, f, (the quantized feature value based on quantization of the linear projection and the subset of variables) is computed for each training image. It is noted that, because of quantization, there may be more than one combination of values producing the same discrete value. In the example of FIG. 12 the quantizer for sub-classifier $f_1$ takes the value "567", whereas the quantizer for sub-classifier $f_k$ takes the value "350".

Histograms can be collected by counting the number of occurrences of each quantized value across the set of training images. Then, a table of probabilities can be generated for each sub-classifier from the histogram of that sub-classifier as shown in FIG. 12. Each probability value in the table corresponds to a bin in the respective histogram. For example, for sub-classifier '$f_1$', to compute the probability of pattern value "567" the bin count $H_1$(#567) is divided by the count of all bins for histogram $H_1$ (i.e., $\Sigma H_1$ (#i)). Other probabilities may be similarly calculated. This process represents the normalization steps in blocks 298A and 298B in FIG. 31. It is noted that although FIG. 12 shows human faces constituting the set of training images 118, the method outlined in FIG. 12 and FIG. 14 can also be used to collect histograms corresponding to a sub-classifier for training images of any object including, for example, cars, telephones, shopping carts, etc. and for the "non-object" class.

Figure 14:
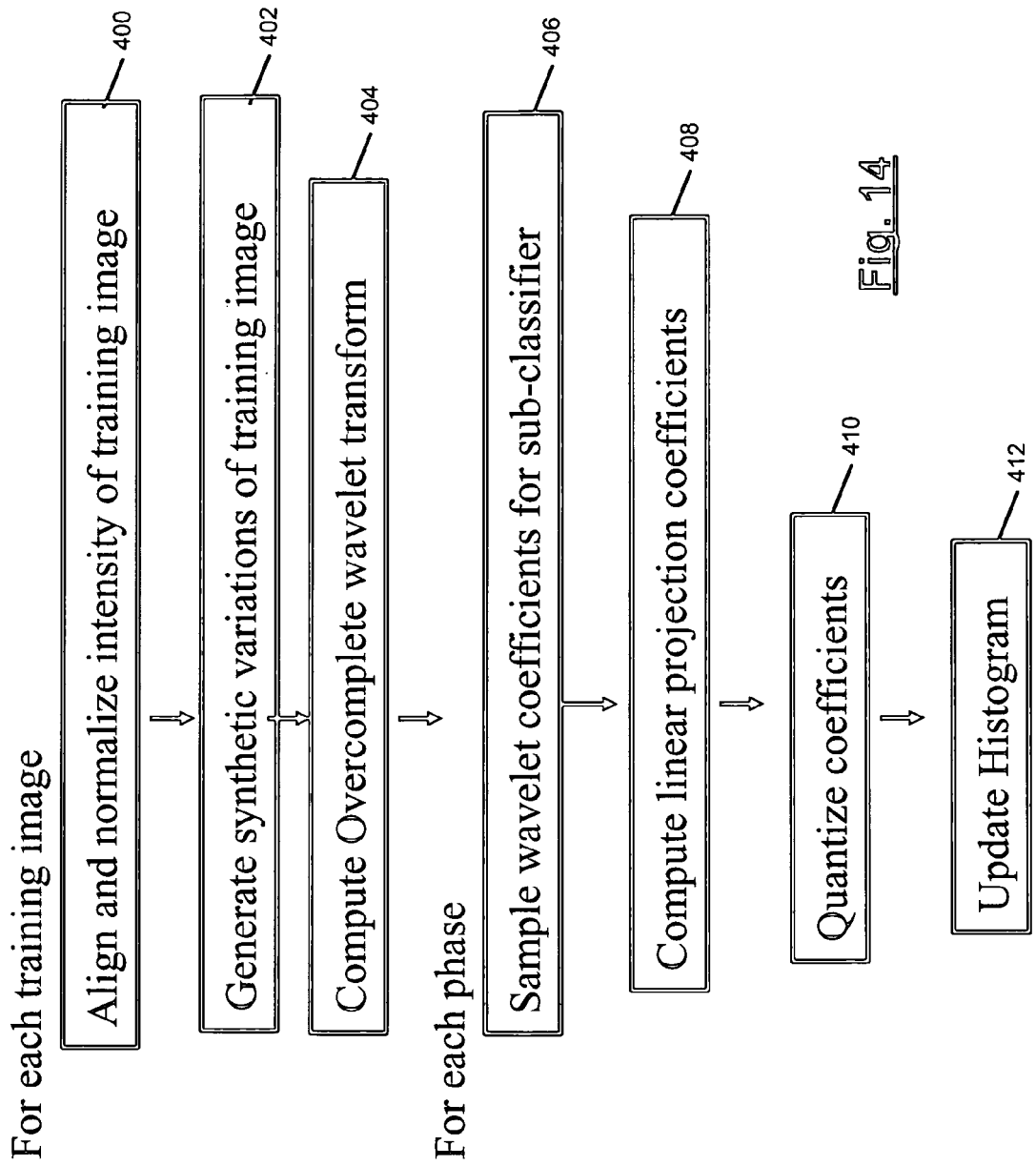
FIG. 14 outlines steps in training a sub-classifier.

FIG. 14 outlines steps in training a sub-classifier according to one embodiment. As illustrated in FIG. 14, each training image may be aligned and its intensity normalized at step 400. At step 402, synthetic variations of the training image may be generated. Then, the overcomplete wavelet transform may be computed at step 404. For each phase, at step 406, wavelet coefficients for the sub-classifier may be sampled. At step 408, linear projection coefficients may be computed. At step 410, the coefficients may be quantized. Next, at step 412, the histogram may be updated.

Figure 15:
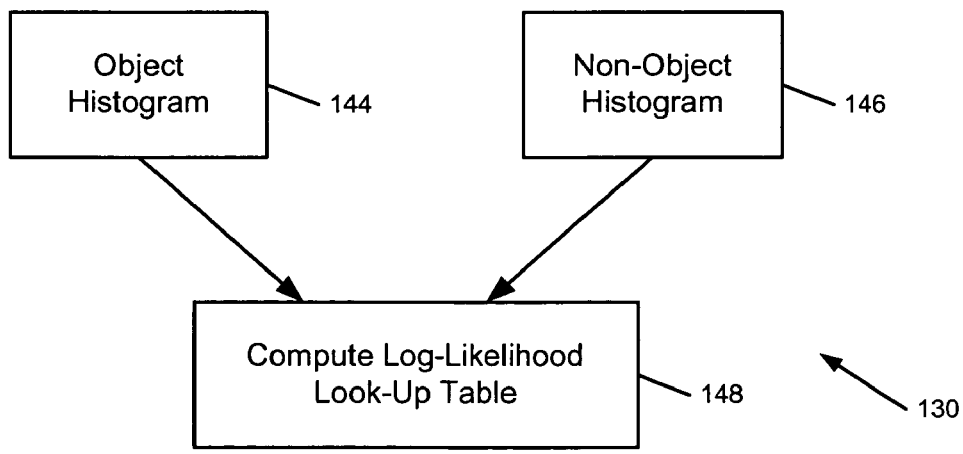
FIG. 15 illustrates the combining of histograms to form a log-likelihood look-up table.

In one embodiment, as illustrated in FIG. 15, a log-likelihood table (LLT) can be computed to correspond to each pair of histograms (object and non-object) corresponding to each sub-classifier as noted hereinbefore. To compute this log-likelihood table, corresponding entries in each probability table are retrieved. For example, in each probability distribution, there may be entries for quantized feature value "567". Then the logarithm of the ratio of the object probability divided by the non-object probability becomes the entry in the log-likelihood table for this quantized feature value.

5. Choosing Combinations of Sub-Classifiers

Figure 30:
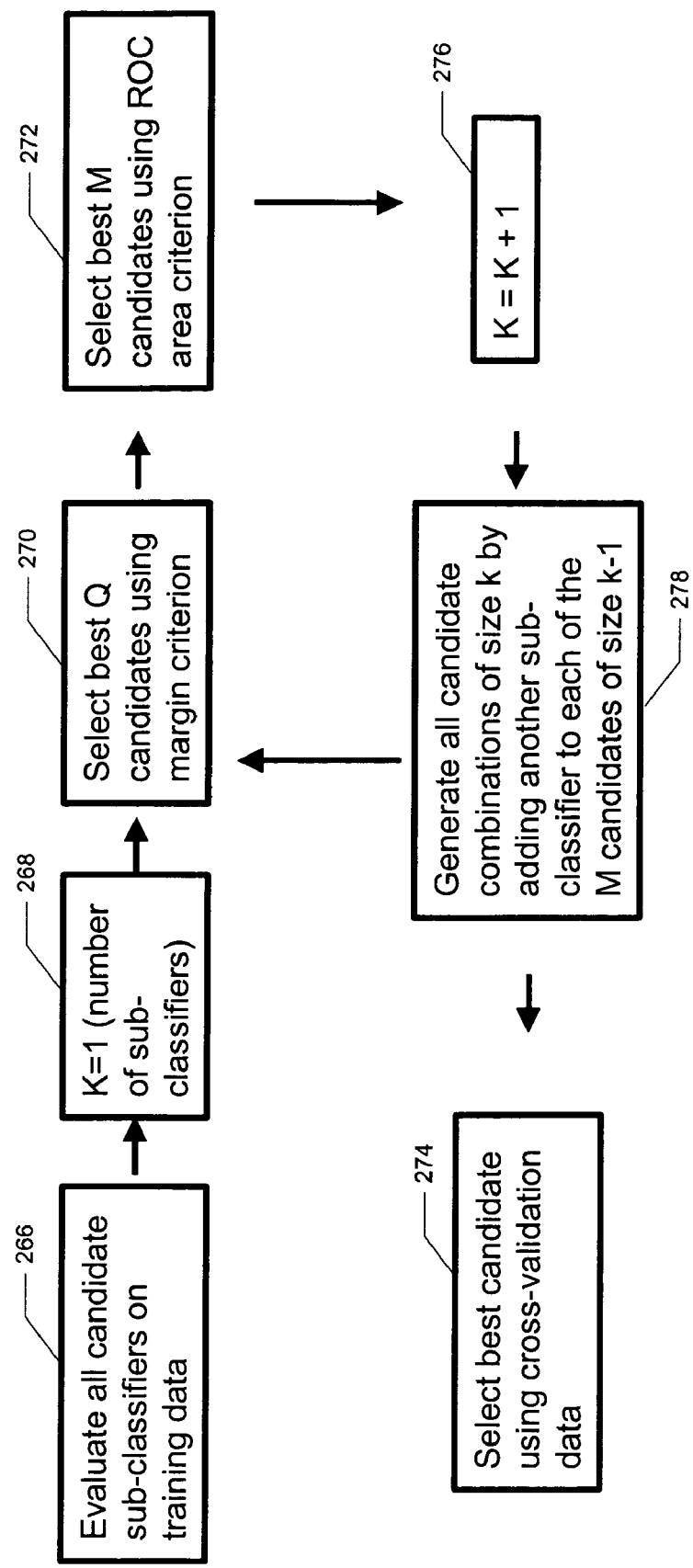
FIG. 30 is a flowchart illustrating the process flow through the sub-classifier selection module according to one embodiment of the present invention.

The sub-classifier selection module 220 in FIG. 28, according to one embodiment, may choose the best sets of sub-classifiers for implementation according to the process illustrated in FIG. 30. In one embodiment of the present invention, the sets of sub-classifiers may be chosen according to a series of criteria evaluated by tests. The first test may be computationally simple. Later tests may be progressively more computationally complex and also more accurate.

A number of criteria can be used to evaluate sub-classifiers, including, but not limited to, the "Margin", given by equation (15) below, and the area under a Receiver Operator Curve (hereinafter "ROC curve"). A ROC curve is a plot of the number of objects classified correctly versus number of false positives for a given classifier evaluated on a given set of test images. Each point on the plot represents evaluation for a different value of λ. The area under the ROC curve is related to the performance of the classifier. Greater area indicates better performance of the algorithm; that is, for example, in face detection, a high area means that a high number of faces classified correctly can be achieved with a low number of false positives.

One embodiment for choosing a combination of sub-classifiers is disclosed in FIG. 30. In step 266, a margin of each set of candidate sub-classifiers can be calculated on training data. The margin, C, is calculated using equation (15) below:

$$C = \sum_k w_k \quad w_k = 0 \text{ if } v_k > 0, \text{ else } w_k = v_k \qquad (15)$$

$$v_k(x_{k,l}, \ldots, x_{k,r}; y_k) = H(x_{k,l}, \ldots, x_{k,r})y_k - \beta \quad y_k \in \{-1, 1\}$$

where $x_{k,1} \ldots x_{k,y}$ represent the $k^{th}$ input to the classifier, $H(x_{k,1} \ldots x_{k,y})$ represents the output predicted by the classifier, $y_k$ represents the actual value of the output corresponding to this input, and β is a small value, which in one embodiment is set equal to 0.1. In one embodiment, the variable K tracks the number of sub-classifiers per chosen set. The value of the variable K can initially be set to one in step 268. The best Q sets of sub-classifiers containing K sub-classifiers can then be chosen in step 270 using the Margin criterion evaluated over the training images of the object (block 228 in FIG. 28) and the training images of the non-object (block 226 in FIG. 28).

In one embodiment, $H(x_{k,1} \ldots x_{k,y})$ is computed in the following fashion. This method independently evaluates each candidate sub-classifier on each of the training example (blocks 226 and 228 in FIG. 28) and stores these results. This method then computes $H(x_{k,1} \ldots x_{k,y})$ for a given combination of sub-classifiers by summing the pre-computed results for each these individual sub-classifiers for the given example, k.

In one embodiment, the area under the ROC curve is calculated for each of the Q sets of sub-classifiers selected in step 270. The best M candidate sets of k sub-classifiers can then be chosen in step 272 based on the ROC area criterion. In step 276, the value of K can be incremented by one. Then, at step 278 candidate combinations of size K can be created by adding another sub-classifier to each of the Mcandidates of size K-1. The process can begin again at step 270 for sets of sub-classifiers of size K. The process can be completed when K reaches a value of 20, for example. In one embodiment, the ROC curve of these final M candidate sub-classifiers can be evaluated in step 274 on the cross-validation data (block 230 in FIG. 28). The best set of K sub-classifiers can then be chosen according to this criterion 6. Retraining Chosen Sub-Classifiers using Adaboost In one embodiment the set of sub-classifiers chosen by the method described above may have their log-likelihood tables recomputed by using a method called AdaBoost with Confidence Weighted Predictions algorithm discussed in R. E. Shapire, Y. Singer, "Improving Boosting Algorithms Using Confidence-rated Predictions", Machine Learning, 37:3, pp. 297–336, December, 1999 (hereafter, "Shapire & Singer"), the disclosure of which is incorporated herein by reference in its entirety.

The AdaBoost algorithm is a general method for training pattern classifiers. Its chief advantage is that it minimizes the classification error on the training set and maximizes the margin between the two classes on the training set as discussed in Shapire & Singer. AdaBoost is a general method that can be applied to any type of classification algorithm. Given any classifier, AdaBoost works by sequentially re-training multiple instances of the classifier, where, for example, each instance corresponds to a different set of values for the look-up tables comprising the terms in equation (8A). To perform classification, AdaBoost applies all of such instances of the classifier in combination and computes the weighted sum of their output to make a classification decision. A disadvantage of this approach is the increased computational cost of applying all the classifiers in the combination. The following describes a process for overcoming this disadvantage by computing a single look-up table for a single sub-classifier using AdaBoost.

Figure 13:
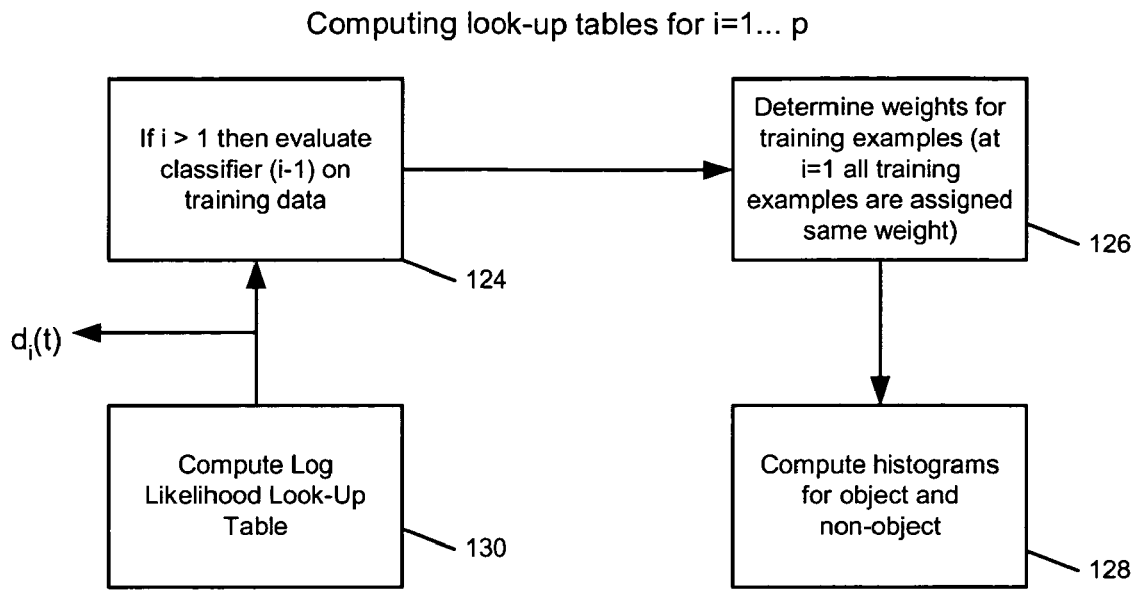
FIG. 13 illustrate how classifiers are estimated using the AdaBoost algorithm according to one embodiment of the present invention.

As shown in FIG. 13, the AdaBoost algorithm works in an iterative fashion. First, a classifier is trained by assigning the same weight to all training examples (e.g., blocks 226 and 228 in FIG. 28) at the instance i=1 for that classifier. (Note: the training for i=1 is identical to that in step 218 in FIG. 28). For each i>1, the $(i-1)^{th}$ instance is evaluated on the training data (block 124). Then, the classifier is iteratively retrained where more weight is given to training examples that were incorrectly classified by the classifier trained in the previous iteration (block 126). This process repeats for p iterations, and where "p" represents a predetermined number of instances of the classifier being trained. Currently, there are no rigorous theoretical guidelines on how to choose "p." Experimentally, a value of as little as "5" can lead to improvement and values as large as "100" can lead to further improvement. In the preferred embodiment, the values for "p" are in the range of 15 to 20. It is shown in Shapire & Singer that through this iteration process the classification error can be decreased.

To re-train an instance of the classifier at each iteration, the AdaBoost algorithm re-computes the histograms for each sub-classifier over the object and non-object training samples (block 128) using the weights determined at block 126. Histograms can be collected by counting the number of occurrences of each quantized value across the set of training images. However, instead of incrementing each histogram bin by 1 for each training example, we increment by the weight assigned to the training example. We scale and round the training example weights to integers for this purpose.

Block 130 computes a log-likelihood look-up table for each set of histograms corresponding to each sub-classifier.

Normally, under AdaBoost, to perform classification, for each input X, one would have compute the output generated by X for all instances of the classifier, $H_i(y)$, for i=1 ... p, and then compute the weighted sum of these values, where the weights are given by $a_i$:

$$\sum_{i=1}^{p} H_i(X) \qquad (12)$$

However, in one embodiment of the present invention, each $H_i(X)$ is represented by equation (8A) or (8B). By substituting for equation (8B), the classifier can be expressed as:

$$\sum_{i=1}^{p} \sum_{j=1}^{n} a_i h_{ij}(X)$$

This equation can be re-written in a mathematically equivalent form as:

$$\sum_{j=1}^{n} g_j(X) \qquad (13)$$

where each $g_j(X)$ represents a single log-likelihood table pre-computed by the sum:

$$g_j(X) = \sum_{i=1}^{p} a_i h_{ij}(X) \qquad (14)$$

The resulting classifier in equation (13) has the same computational cost as the original classifiers in equations (8), (8A), and (8B).

In one embodiment, p adaboost iterations are computed. For each iteration number, 1 ... p, performance of the classifier is measured on the cross-validation test set (block 230 in FIG. 28). The number of iterations that gives, the best performance, say k, is chosen and the sum in equation (14) is pre-computed up to k rather than p.

In one embodiment, block 224 in FIG. 28 determines the threshold λ in equation (8) to achieve a desired performance by measuring accuracy for different settings of λ on the cross-validation images block 230.

III. Lighting Correction

Figure 4B:
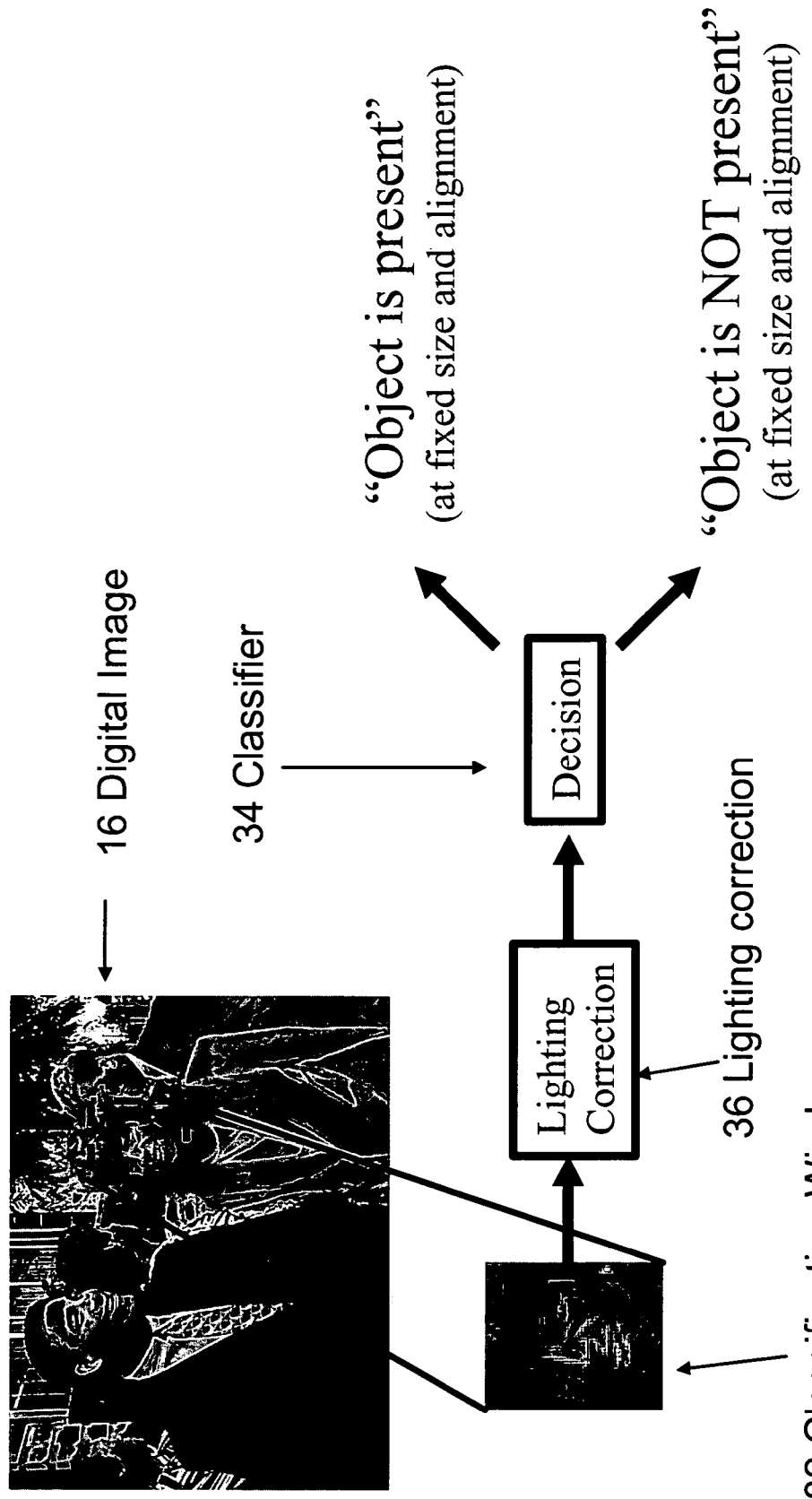

Lighting correction is sometimes necessary to compensate for differences in lighting. In one embodiment, a lighting correction module 36 may provide lighting correction prior to evaluation of the classifier 34 as illustrated in FIG. 4B. Similarly, in training, lighting correction may be performed on each training example immediately after evaluation of the overcomplete wavelet transform. The lighting correction module 36 may be implemented as software code to be executed by a processor (not shown) of the object finder terminal 22 (FIG. 3) when providing lighting correction prior to evaluation by the classifier 34, or executed by a processor of the system 210 (FIG. 28) when used for training of sub-classifiers. The software code of the module 36 may use any suitable computer language such as, for example, Java, Ada, C or C++ using, for example, conventional or object-oriented techniques. The software code may be stored as a series of instructions or commands on a computer-readable medium, such as a random access memory (RAM), a read only memory (ROM), a magnetic medium such as a hard-drive or a floppy disk, or an optical medium such as a CD-ROM.

Unfortunately, no lighting correction method is dependable in all situations. Therefore, in one embodiment, the lighting correction module 36 may apply multiple methods of compensation, where each method provides its input to a different group of sub-classifiers. Such an approach will be less susceptible to the failures of an individual method of correction.

A parameter, referred to as "Localized lighting correction," maybe used to adjust the value of each wavelet coefficient as a function of its neighboring coefficients from within its subband and from other subbands. In one embodiment, each coefficient in each band is normalized as follows. Each LL coefficient may be normalized by its 3×3 neighborhood in the LL band. The normalization process computes the average absolute value of the neighborhood. If this average is less than a pre-specified threshold (described hereinbelow), the coefficient is assigned value 1.0. Otherwise the normalized LL coefficient is computed as the ratio of the original coefficient divided by this neighborhood average. Each coefficient in the LH and HL bands is normalized by the combined average of its 3×3 neighborhoods in the LH and HL bands. If this average is less than a threshold, the normalization process assigns value 0.0 to the normalized coefficient. If the average is greater than the threshold, the normalized coefficient is given by the ratio of the original coefficient divided by this average. Each coefficient in the HH band is normalized by the average of its 3×3 neighborhood in the HH band. If this average is less than a threshold, the normalization process assigns value 0.0 to the normalized coefficient. If the average is greater than the threshold, the normalization process divides the original coefficient by the average to give the normalized coefficient. In one embodiment, these thresholds are 1.0 for all LL bands, 2.5 for LH and HL subbands, and 1.25 for HH subbands.

Another parameter, referred to as "Variance normalization," may be used to linearly scale all the wavelet coefficients in the candidate region or some selected portion of it (described hereinbelow), such that the intensities in the region or a selected portion of it respectively, have a pre-specified variance value.

Yet another parameter, referred to as "Brightest point normalization," may be used to scale all wavelet coefficients such that the brightest spot in the candidate region or some selected portion (described hereinbelow) of it has a fixed value.

The classifier computes "variance normalization" and "brightest point normalization" over various pre-specified, extents of the object. The extent of some object does not necessarily occupy the full extent of the classification window 32. For example, the face training examples shown in FIG. 12 do not occupy the complete area of the window. In one embodiment the average extent of the object is entered by hand and used for normalization. In one embodiment, this extent is split into two horizontal halves that are normalized separately.

IV. Classifier Design Considerations for Detection

As mentioned hereinbefore, the detector has to exhaustively scan this classifier across the image in position and scale in order to find instances of an object. This process applied directly, however, can consume a great amount of computational time. In one embodiment, several computational techniques and heuristic strategies, described hereinbelow, are employed to reduce the amount of computation.

FIG. 16 is a block diagram of the process implemented by the object finder program 18 whereby a classifier is scanned in position in position and in scale to find instances of the object. The process illustrated in FIG. 16 applies to view-based classifiers (e.g., any of the classifiers 54A–54B or 56A–56H in FIG. 7).

To find instances of the object at different sizes the original image is searched at re-scaled versions as illustrated hereinbefore in FIG. 8. In this search across scale, in FIG. 16, at block 166, it is determined whether all of the scaled sizes of an image have been searched. If they have, then the process ends at block 168. If all of the scaled sizes of an image have not been searched, then the classifier scales or resizes the image at block 149, as illustrated through some exemplary scales in FIG. 8, re-computes the partially overcomplete wavelet transform of the scaled image at block 150, and continues exhaustive object search at all positions within that new resized image at blocks 152–166. The scaling or resizing of the input image 16 may be desirable to detect certain object sizes that may not have fit within the image window 32 when original image was searched. Scaling or shrinking of the image may allow a larger object to fit within the image window 32, and hence, to obtain a better detection. It is noted that the size and shape of the image window 32 itself does not change throughout different levels of scaling/resizing (as illustrated with the fixed-size image window 32 in FIG. 8).

In one embodiment, the input image 16 is reduced in size (block 149) by a factor "f" given by:

$$f = 2^{\left(\frac{i}{4}\right)}, \text{ where } i = 0, 1, 2, 3 \ldots \quad (17)$$

Thus, for example, for i=2, f=1.41. Hence, the image is reduced by factor "f". In other words, the new scaled image (for i=2) is 0.71 (1/f) in size as compared to the original image (for i=0). Thus, the size (along any dimension, e.g., horizontal) of the image to be evaluated can be expressed by N=(1/f)*S, where N is the size of the input image currently evaluated by the corresponding classifier, and S is the original size of the input image. Extensive object search (as given by blocks 150, 152, 153, 154, and 160 in FIG. 16) is continued for each scale until the scaled input image is smaller than the size of the image window 32.

Block 150 of FIG. 16 computes a partially overcomplete wavelet transform of the scaled input image. In particular, this step computes the level 1 EE phase (critically sampled and not overcomplete generation of level 1) and then generates an overcomplete representation of level 2 from level 1 EE producing level 2 EE, level 2 EO, level 2 OE, level 2 OO as shown in FIG. 17B.

Figure 23:
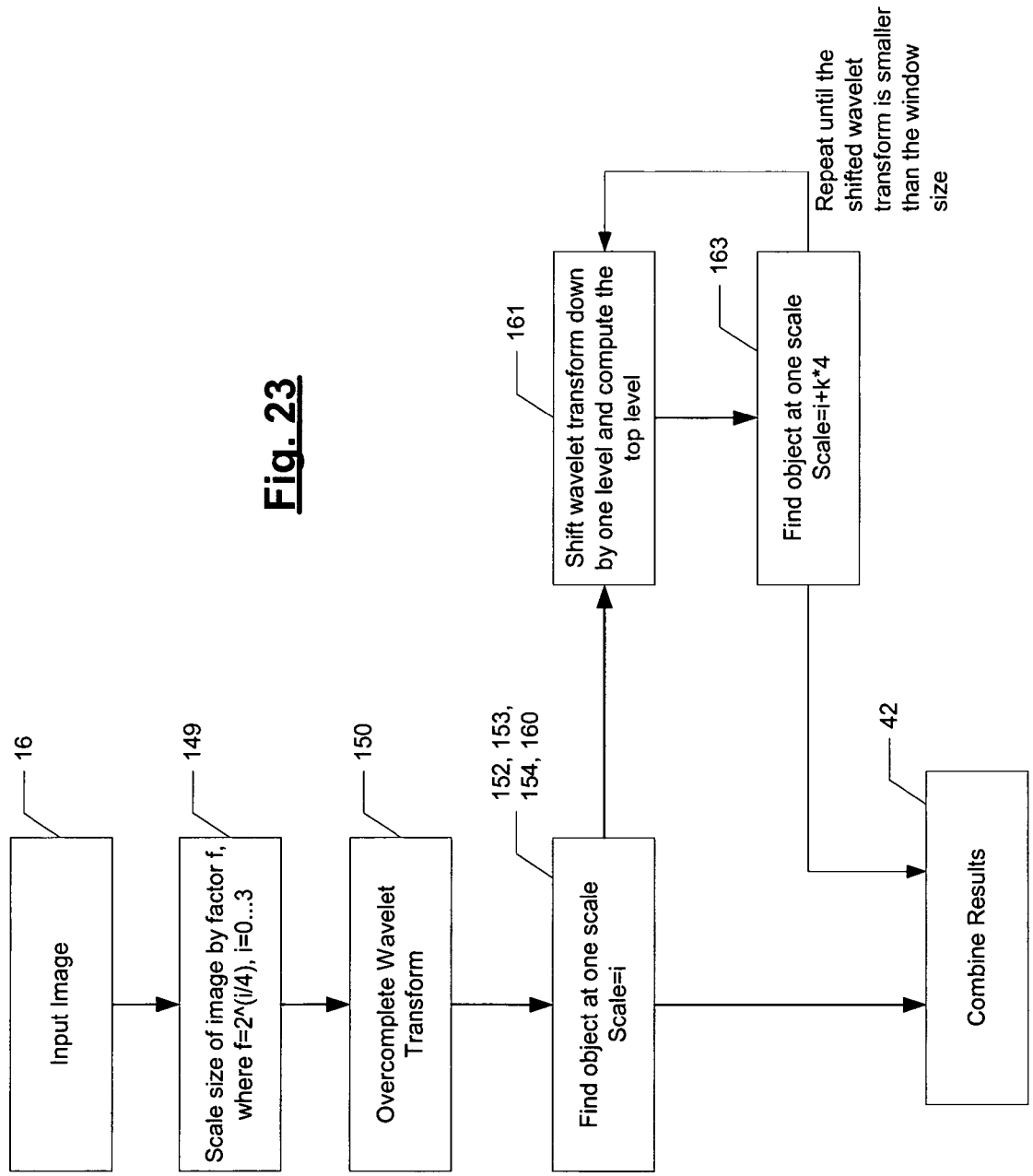
FIG. 23 illustrates the image scaling process as part of the overall object detection process shown in FIG. 16 according to one embodiment of the present invention.
Figure 24:
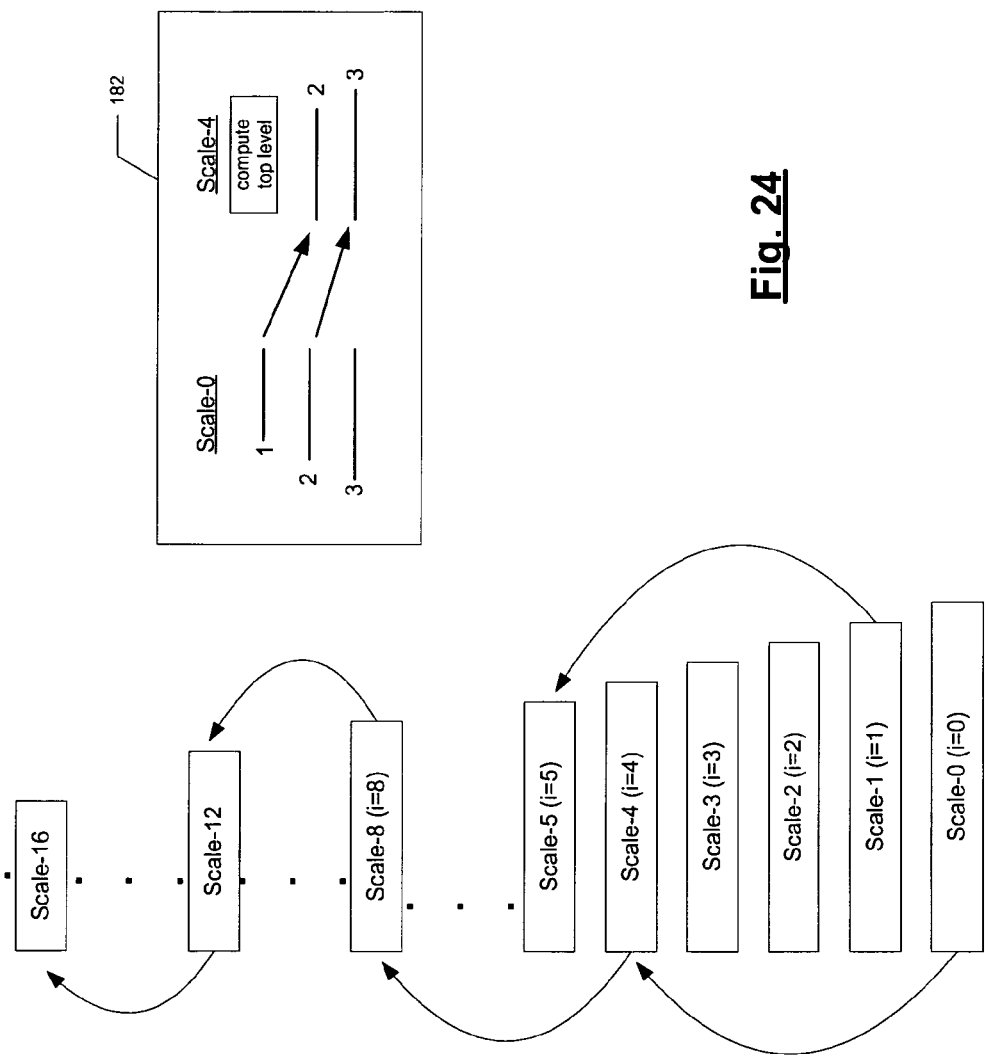

It is noted that the input image is scaled to many values of "i" (e.g., for i=0 . . . 19), the entire partially overcomplete wavelet transform does not always need to be computed in its entirety for each successive scale. In one embodiment, the object finder 18 "re-uses" parts of the transform in the search across scale. FIG. 23 and FIG. 24 illustrate this process:

As shown in FIG. 24, the two levels of the transform need to be computed in their entirety for the first four scales (scales 0 through 3) of the input image (corresponding to i=0 . . . 3). Thus, for the first octave of search in scale (corresponding to the first four scales given by equation 12), each level of the transform is recomputed in its entirety at each scaling. However, after these first four scalings, the object finder 18 can "reuse" parts of the transform computed at previous scalings as illustrated in FIG. 24. This is done by selecting the transform corresponding to the scaling that differs by one octave (f=2, i.e., four (4) scalings) from the current scaling. Thus, for example, to compute the transform for scale-i (where i≧4 in equation-12), the transform for scale (i–4) may be utilized because the transform for scale-i (i≧4) is related to the transform at scale (i–4) by a shift in levels. For example, the wavelet transform at scale-4 is related to that at scale-0, and the transform at scale-5 is related to that at scale-1, and so on as illustrated in FIG. 24.

To obtain the transform at scale-i (i≧4), the object finder 18 shifts the transform for scale (i–4) by one level. That is, level-2 at scale (i–4) becomes level-1 at scale-i (for i≧4) as shown in FIG. 24 with reference to scales 0 and 4. Therefore, the object finder 18 needs to compute only the top level (i.e., level-2) for each scale-i (i≧4), rather than computing the entire transform (i.e., levels 1 through 2) for the new scale-i. Blocks 161 and 163 in FIG. 23 illustrate the scaling and partial re-use of the transform discussed hereinabove. FIG. 23A provides more detail regarding the process of step 161 in FIG. 23. As shown by the feed-back arrow at block 163 in FIG. 23, the transform re-use and extensive object search (as given by blocks 150, 152, 153, 154, and 160 in FIG. 16) is continued for each scale until the scaled input image is smaller than the size of the image window 32. For example, for i=0 . . . 3, the object finder 18 may search the object at scales (i+k*4, where k≧1). For example, for scales 0 through 3, the corresponding scales that may be searched by the object finder 18 include scales 4 through 7 (for k=1 at block 163), 8 through 11 (for k=2 at block 163), 12 through 15 (for k=3 at block 163), 16 through 19 (for k=4 at block 163), and so on until the scaled input image for a given scale is smaller than the image window size. Such an extensive scanning for each image size and image window location improves accuracy of detection by making it possible to find instances of the object over this range in position and size.

The key to efficiency is to do as little computation as possible each time the detector evaluates a classifier at a candidate window position. In particular, a partial evaluation of the classifier may be sufficient to accurately decide that a candidate belongs to the non-object class. According to one embodiment of the present invention, for each scaled version of the input image, (for example, 62, 64, and 66 in FIG. 8), the detector may be applied in a cascade of sequential stages of partial evaluation, where each stage performs a partial evaluation of the classifier, i.e., a subset of sub-classifiers. That is, each classifier is decomposed into a series of stages where each stage contains one or more sub-classifiers. Each stage, $F_j$, can consist of a sub-classifier or a series of sub-classifiers, which can be chosen individually according to the manner described previously. Together, all of the sub-classifiers in all of the stages of a classifier may constitute the classifier as given in equations (8) and (8A).

Turning again to FIG. 16, in one embodiment, the set of image window 32 locations to be evaluated by each stage may be determined at block 154. The set of image window 32 locations to be evaluated can initially be a set of all possible image window 32 locations. The criterion for updating the set of image window 32 locations to be evaluated may be the current total log-likelihood ratio corresponding to each location. Locations with a current total-log-likelihood ratio below a predetermined threshold may be dropped from the set of image window 32 locations to be evaluated. Thus the number of candidate locations to be evaluated may be reduced at each successive iteration of the process illustrated in FIG. 16.

It is noted that this cascade evaluation strategy can be a many step process, where a partial evaluation of equation 8 (or 8A) can be done multiple times. After evaluating each sub-classifier (e.g., sub-classifier $f_1$) or a group of sub-classifiers (e.g., sub-classifiers $f_1$, $f_2$, and $f_3$), the object finder 18 may add to partial sum in equation 8 or 8A. This re-evaluation will still be a partial re-evaluation, but will include more terms corresponding to the sub-classifiers that have been evaluated since the last partial evaluation. After each partial evaluation is completed, the object finder 18 may apply a threshold and remove additional candidates (i.e., parts of the image being searched) from further consideration as shown and discussed hereinbelow with reference to FIG. 20. Thus, the cascade evaluation strategy focuses on sub-classifier-by-sub-classifier analysis and builds on earlier computations to generate the final result.

The threshold for the total log-likelihood at each stage may be pre-determined by a process of evaluating the current stages of the classifier on the cross-validation images (block 224 in FIG. 28). Block 224 may set this threshold to match a specified performance metric such as correct detection of 95% of the labeled instances of the object.

Figure 18:
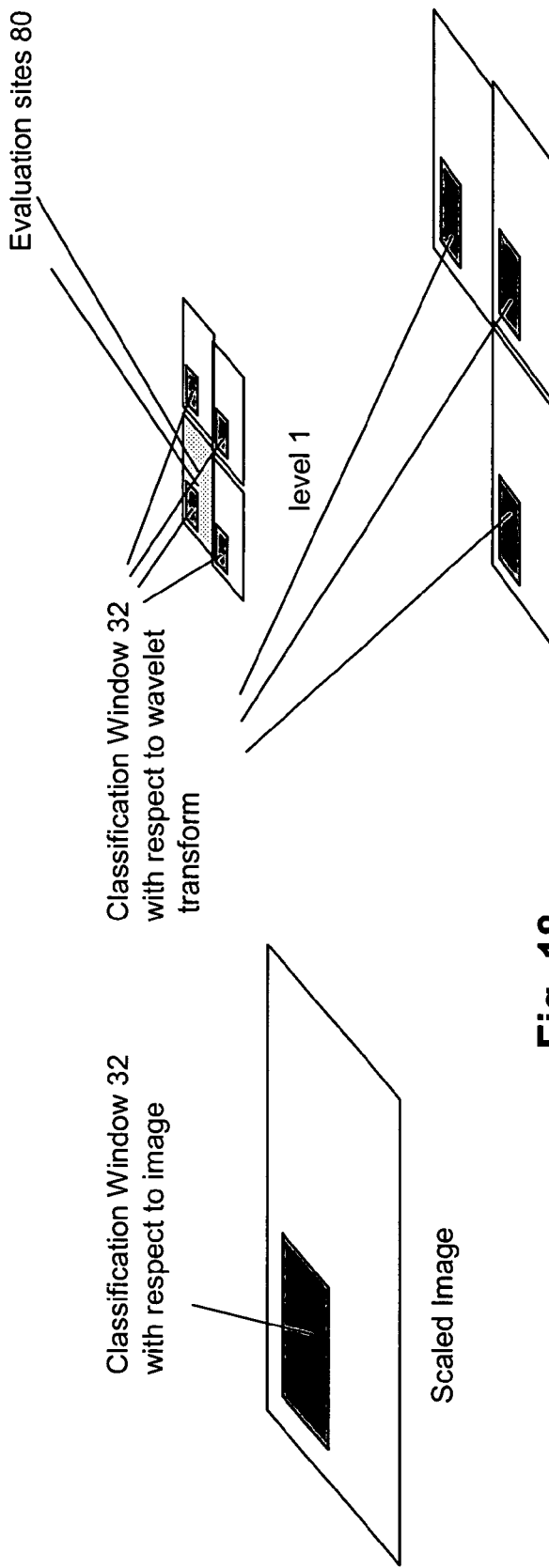
FIGS. 18 and 19 illustrate the positional correspondence between a window sampled directly on the image and the same image window sampled with respect to the wavelet transform of the image according to one embodiment of the present invention.

In this embodiment, the image window 32 does not directly sample the scaled image as implied by FIG. 4A, but rather it samples wavelet coefficients generated from the input image in block 150. In particular, it will select coefficients from one wavelet transform derived from the semi-overcomplete wavelet transform shown in FIG. 17B. Each such wavelet transform can be thought of as a branch through this figure; that is, one such transform contains one of the level 2 phases in combination with the level 1 EE phase. The image window 32 will select the coefficients within this transform that spatially correspond to the position of the image window within the image as shown in FIG. 18. Note that one image window corresponds to a collection of blocks of wavelet coefficients from each wavelet subband. These chosen coefficients are equivalent to first selecting the window in the image and then taking the wavelet transform of the image window.

Evaluation sites are specified by the center of the window with respect to the chosen wavelet transform's top level's LL band. For example, in a 2 level transform, each coefficient in the level 2 LL band corresponds to a center of a potential evaluation site as shown in FIG. 18. The set of all possible evaluation sites for this phase of the wavelet transform corresponds to the set of windows placed at each such wavelet coefficient. It is noted that such image window 32 locations may be partially overlapping.

At block 152, the object finder program 18 may evaluate a single stage, $F_j$, for each member of a set of image window 32 locations to be evaluated. In one embodiment, the object finder 18 can keep, for each of the set of image window 32 locations to be evaluated, a partial calculation of equation (8A) that may be referred to as a total log-likelihood. It is noted that each term of equation (8A) may correspond to the log-likelihood ratio generated by the application of a sub-classifier to a location. The partial calculation of equation (8A), or total log-likelihood, contains terms resulting from sub-classifiers already applied to the location.

According to one embodiment of the present invention, the early stages differ from the later stages in their usage of the partially overcomplete wavelet transform computed in Block 150 in FIG. 16. The early stages evaluate only one wavelet transform (level 2 EE phase in combination with the level 1 EE phase) derived from the partially overcomplete wavelet transform. The later stages evaluate all four wavelet transforms (all phases of level 2 each in combination with the level 1 EE phase). As described hereinabove, each of these combinations corresponds to a wavelet transform, where these transforms are redundant with each other. The difference in these two evaluation strategies corresponds to a difference in the positional resolution for evaluating candidates. The first strategy corresponds to evaluations sites that are spaced by increments of 4 pixels apart in both the horizontal and vertical directions. The $2^{nd}$ strategy corresponds produces evaluation sites spaced 2 pixels apart (within each transform the sites are spaced apart by 4 pixels, but the wavelet transforms themselves are offset from each of the others by a level one wavelet coefficient or equivalently 2 pixels in the scaled image in either or both the horizontal or vertical direction). In one embodiment with four stages, the first two stages use the first strategy and the last two stages use the second strategy. This evaluation strategy could be thought of as a "coarse-to-fine" strategy whereby the early stages evaluate the image at coarse resolution and the later stages evaluate it at a finer resolution. Hereinbelow, the former strategy is referred to as the "coarse evaluation strategy" and the latter strategy is referred to as the "fine evaluation strategy".

Figure 20:
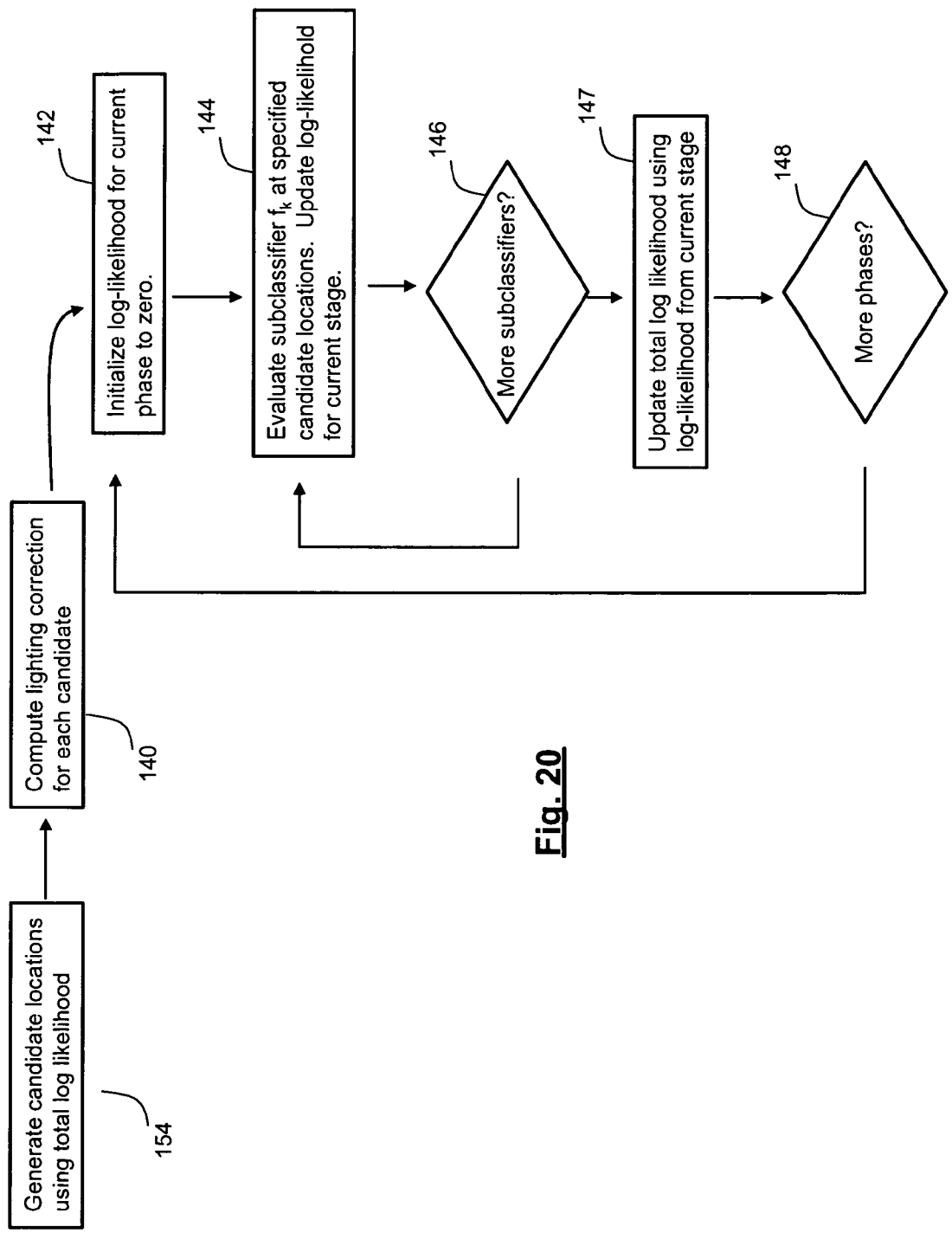
FIGS. 20, 21, 22A and 22B further illustrate the object detection process for one scale of the input image according to one embodiment of the present invention.

One example of a process for evaluating a stage at blocks 152 and 154 is given in FIG. 20. Block 154 determines the set of candidate locations to be evaluated by the process described hereinabove. The coarse evaluation strategy performs this step once whereas the fine evaluation strategy repeats this step for each of the 4 phases it uses from level 2 of the partially overcomplete transform.

Block 140 computes the lighting correction for each of the candidate locations generated in Block 154.

In one embodiment, the log-likelihood may be represented with respect to different resolutions. The ("coarse representation") stores total log-likelihood with respect to sites in the LL band of the top level (e.g. level 2) of the wavelet transform. A ("fine representation") stores log-likelihood with respect to sites in the LL band of a lower level (e.g. level 1) in the wavelet transform. For example, for a two level transform, the coarse representation is with respect to the LL band of level 2 and the fine representation is with respect to the LL band of level 1.

Block 142 initializes the log likelihood for the current phase of the current stage to zero for all candidate object locations.

In one embodiment, early stages using the coarse evaluation strategy use the low-resolution representation throughout the process in FIG. 20. Later stages using the fine evaluation strategy involve both representations. This strategy maintains a final fine resolution updated in block 147 in FIG. 20. However, each phase evaluation in blocks 142, 144, and 146 in FIG. 20 maintains an intermediate representation at coarse representation with respect to the LL band of level 2 of the particular phase currently evaluated. Block 147 combines each intermediate result (within the current phase) with the total log likelihood at fine resolution. This step is necessary since these phases are offset from each other in position.

$F_i$ is the set of sub-classifiers associated with a particular stage, i. $F_i$ can be shown by:

$$F_i = f_1 + \ldots + f_k \quad (16)$$

where each $f_k$ represents a separate sub-classifier. Each stage may have as few as one sub-classifier.

At block 144 in FIG. 20 a first sub-classifier, $f_k$ can be applied to the set of image window locations to be evaluated in the 2D image to be evaluated. It updates the log-likelihood for this phase within the stage. This process repeats for all remaining sub-classifier in the stage. Block 147 updates the total log likelihood by adding the log-likelihood computed in this phase of the current stage as explained above. For the fine evaluation strategy, if there are more phases to be evaluated, blocks 142, 144, 146 are repeated for these phases.

Figure 19:
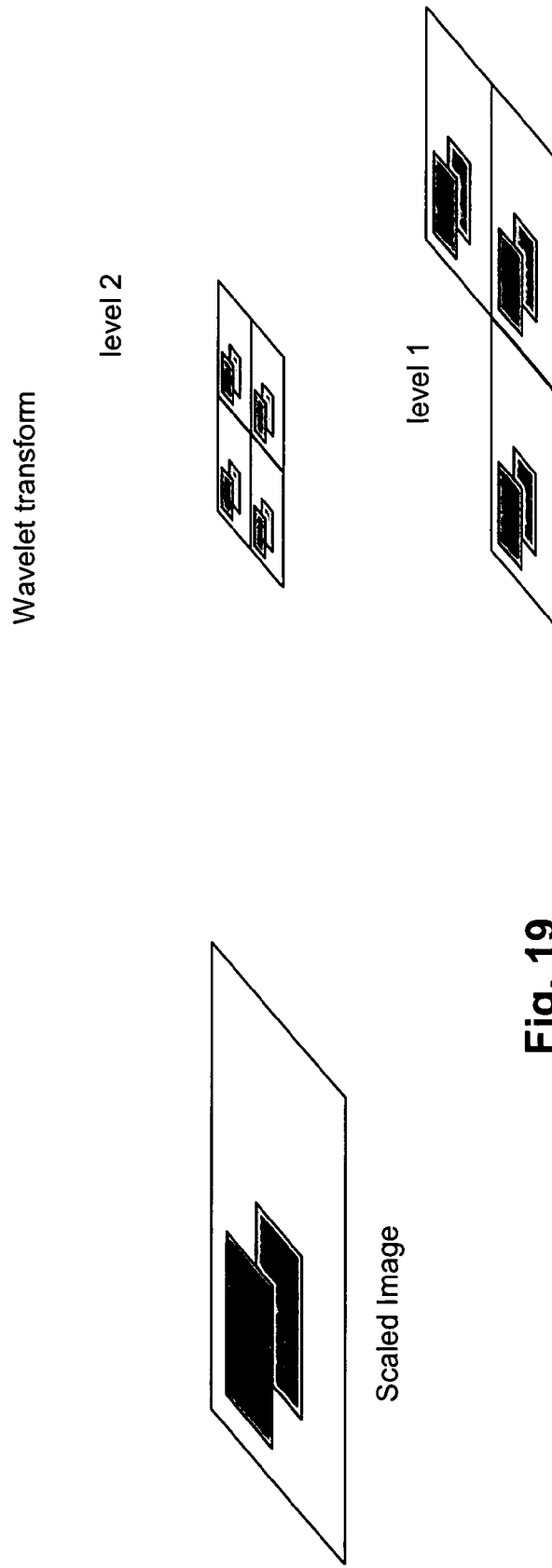
Figure 21:
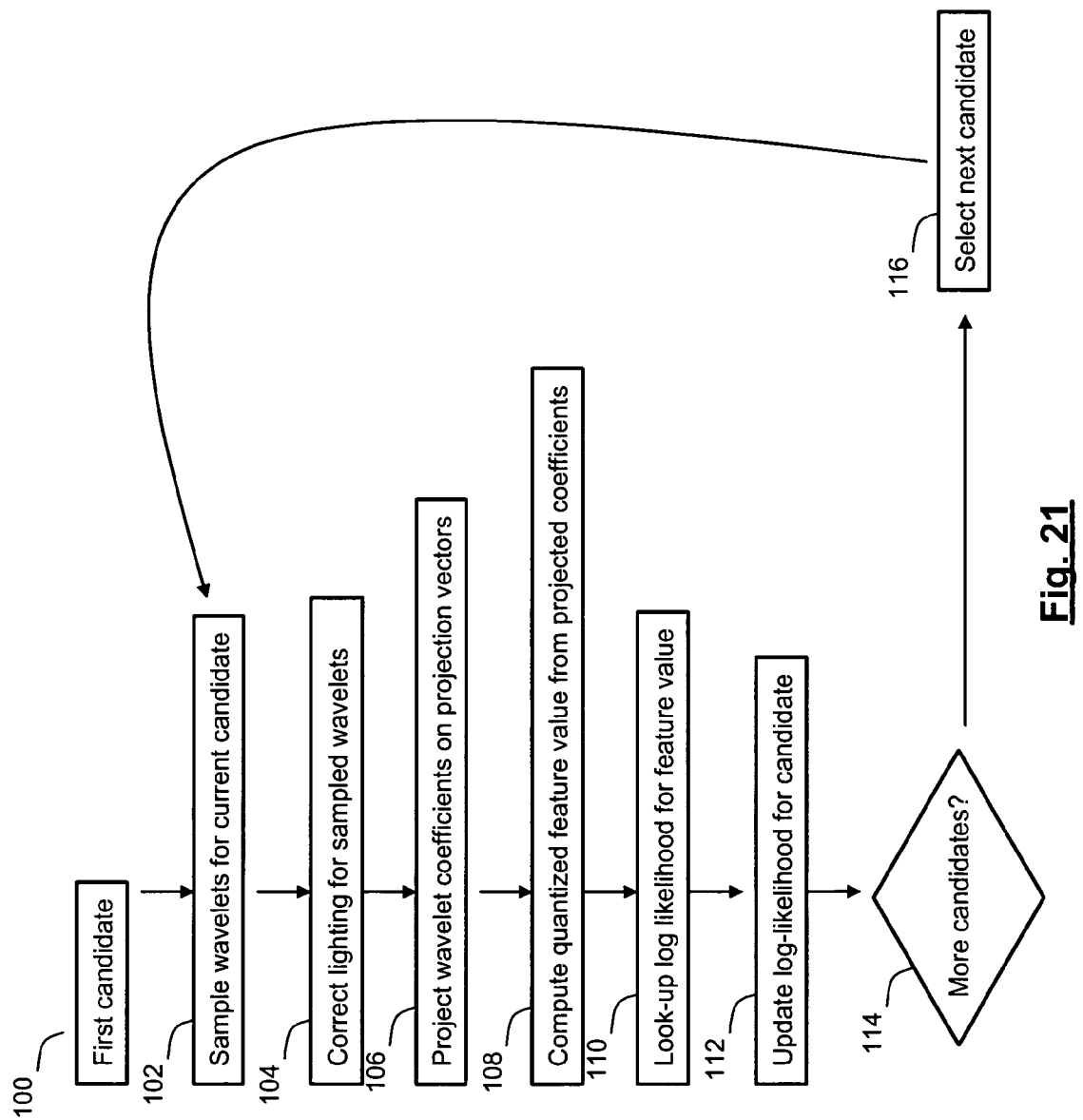

FIG. 21 explains Block 144 from FIG. 20 in more detail evaluating sub-classifier $f_k$ at the specified candidate locations. Block 100 places the image window 32 at a first of the set of image window locations to be evaluated. Block 102 samples the wavelet coefficients used by the sub-classifier $f_k$ where the wavelet coefficient are chosen from the corresponding image window 32 within the selected components of the partially overcomplete wavelet transform of the image (input image or a scaled version of the input image). Block 104 applies lighting correction to the wavelet coefficients, where the lighting correction was computed in Block 140 of FIG. 20. Blocks 106, 108, and 110 comprise the sub-classifier and involve projecting the wavelet coefficients on the linear projection vectors, computing a quantized feature value from projection coefficients, and retrieving the log-likelihood associated with the quantized value. The operations are identical to their counterparts in the training procedure described hereinabove. Block 112 updates the log-likelihood for this candidate within this phase and stage by adding the retrieved value to the corresponding log-likelihood sum for the candidate. The image window 32 can then be shifted to a second location (as shown in FIG. 19) and the log-likelihood ratio for the sub-classifier at the second location can be found by the calculation of Blocks 102 through 112. This process can be repeated for a third and a fourth location and so on until the sub-classifier has been evaluated at all specified locations.

FIGS. 21 and 22 illustrate a conceivable ordering of computation. The actual organization of the aforementioned computations depends on the particular stage. In particular, according to one embodiment of the present invention, each stage can be evaluated in a "candidate-wise" manner or "feature-wise" manner.

Figure 22A:
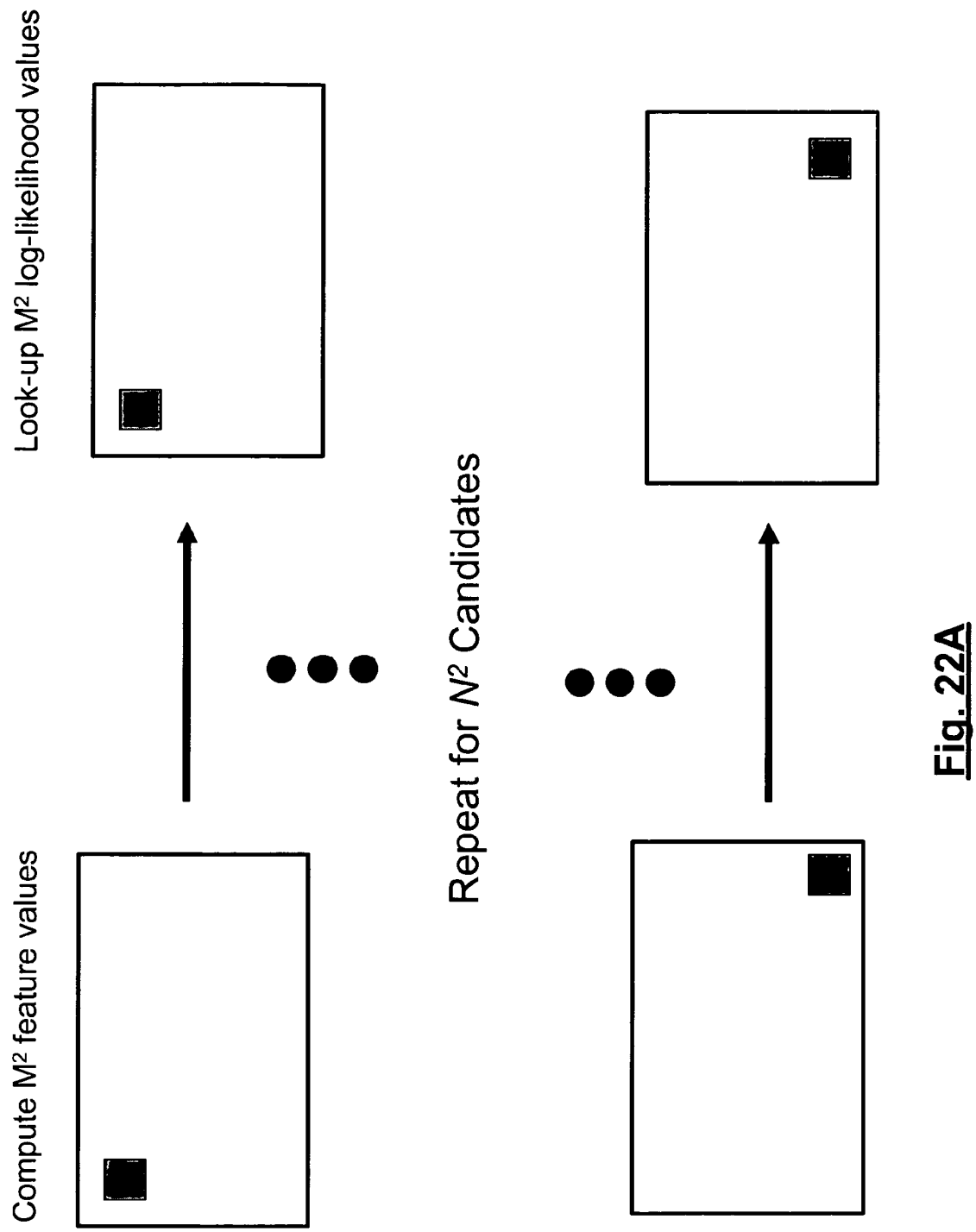

"Candidate-wise" evaluation performs all feature evaluations separately for each candidate. This approach involves a total of $N^2 M^2$ feature evaluations for $M^2$ sub-classifiers and $N^2$ candidates as shown in FIG. 22A.

Figure 22B:
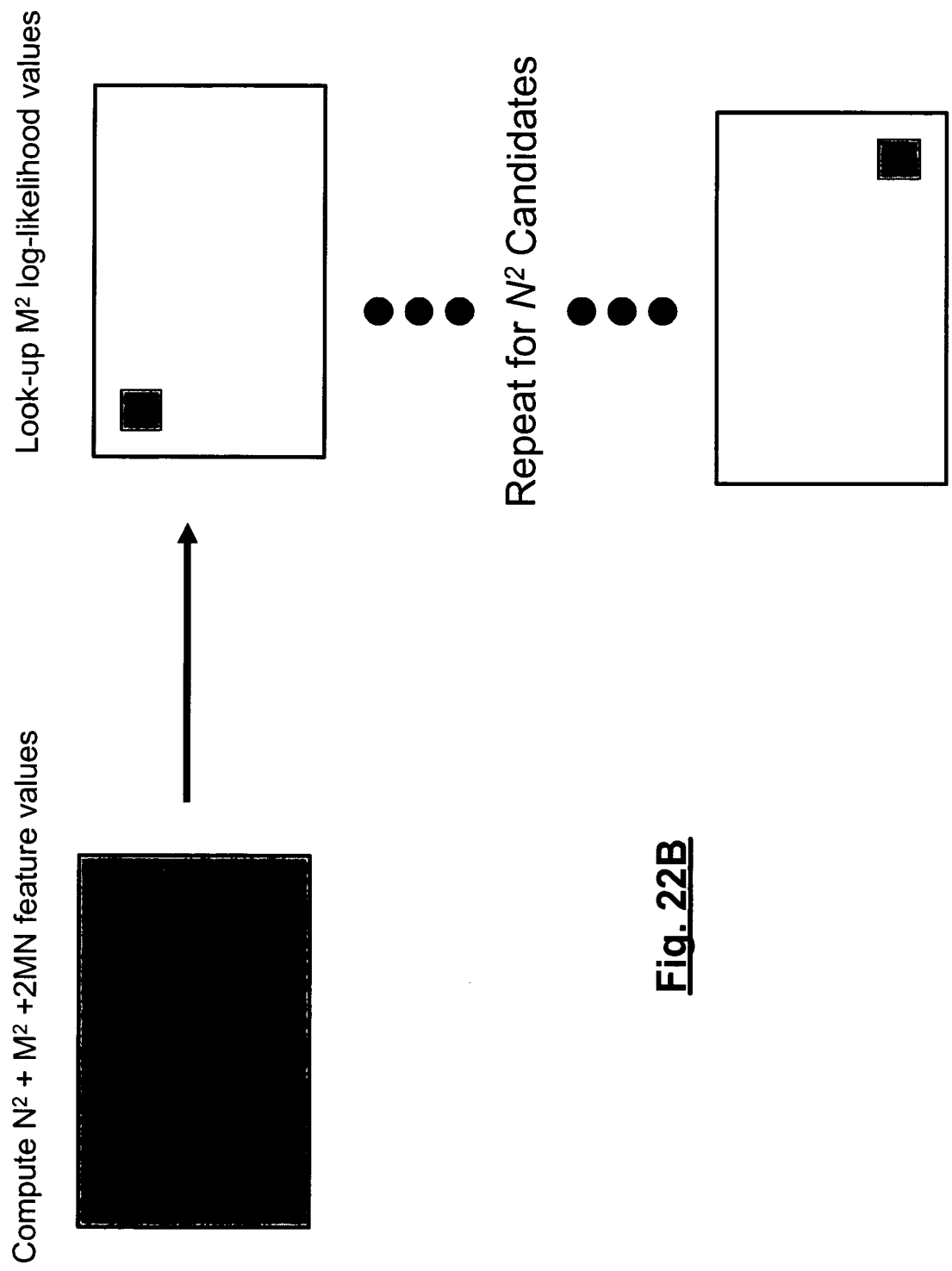

"Feature-wise" evaluation attempts to reduce cost by sharing feature evaluations among overlapping candidates. This strategy performs approximately $N^2 + M^2 + 2MN$ feature evaluations over the entire scaled image (assuming all candidates are to be evaluated). Each candidate then samples the $M^2$ evaluations that overlap its extent and supplies them to the corresponding $M^2$ sub-classifier log-likelihood lookup tables as illustrated in FIG. 22B. Typically, since N is much greater than M, this strategy greatly reduces the amount of computation. The $M^2$ sub-classifiers, however, can differ only in their log-likelihood tables (as a function of position within the candidate), but must all share the same type of feature computation. Whereas, in candidate-wise evaluation, the $M^2$ sub-classifiers can be completely different.

If features are computed in a "feature-wise" manner, then lighting correction must also be applied in feature-wise manner. "feature-wise" correction assigns the correction at each wavelet coefficient as a function of a localized neighborhood about that point as described by "localized lighting correction" hereinabove; that is the correction is independent of the spatial location of the coefficient within the candidate image window 32. Alternatively, candidate-wise correction considers the whole candidate or a specified portion and can be accomplished by "variance normalization" or "brightest point normalization" described hereinabove.

According to one embodiment of the present invention, the early stages use "feature-wise" evaluation for both lighting correction and feature evaluation. The later stages, in which the remaining candidates are sparser, use "candidate-wise" evaluation. One embodiment using four stages uses feature-wise evaluation for the first three stages and candidate-wise evaluation for the forth stages. The first two stages use feature-wise lighting correction using the "localized lighting correction" described hereinabove. The first stage uses 20 sub-classifiers, which share the same feature computation. The second stage uses 24 sub-classifiers that share a feature computation and 42 other sub-classifiers that share another feature computation. The third stage uses candidate-wise evaluation with 19 sub-classifiers, where 5 share one feature computation, another 5 share a different feature computation, another 5 share a third feature computation, another 3 share a feature computation, and the last one that has a unique feature computation. The fourth stage involves 9 sub-classifiers that each has a unique feature computation.

According to one embodiment of the present invention, features are generated in ascending order of complexity. In the early stages features use small subsets of wavelet coefficients, small numbers of linear projections, and simple quantization. (These feature evaluations are designed to be as quick as possible since they have to be applied to many candidates.) In one embodiment, the first two stages use subsets of size 3–8 coefficients and use two linear projections with the "scalar quantization 1-B" scheme described hereinabove. In later stages (in which there are fewer candidates), features use larger subset sizes, more linear projections, and more complicated quantization schemes. In one embodiment, a third stage can contain sub-classifiers that considers between four and twenty input variables, 5 linear projections, and the "vector quantization 2-A" for 4 feature computations and vector quantization 3-A scheme for one feature. A fourth stage may contain sub-classifiers that consider between five and thirty coefficients, 5 linear projections, and the "vector quantization 4-A" scheme for 9 feature computations.

Figure 32:
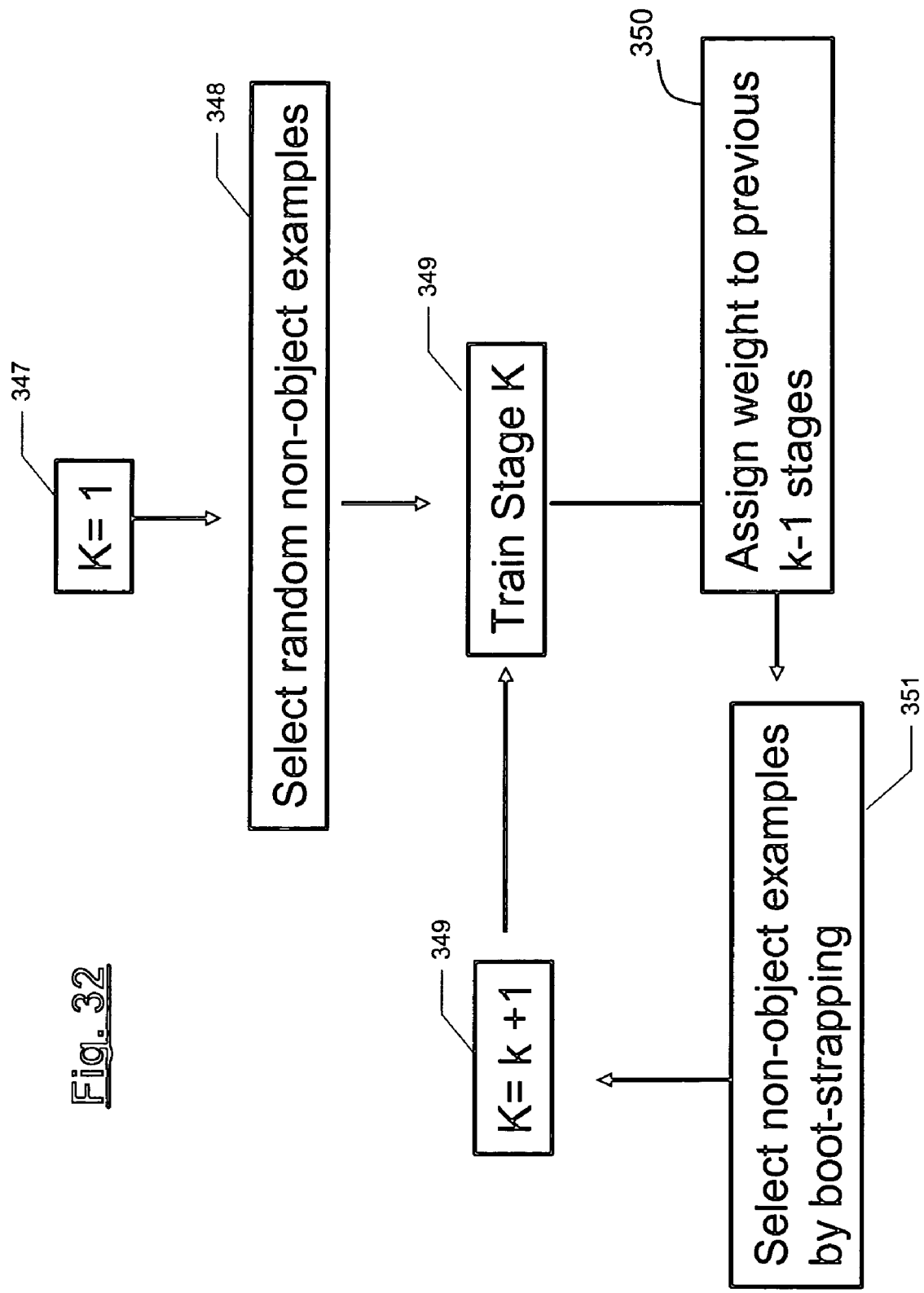
FIG. 32 illustrates the process of training multiple stages of the object detector according to one embodiment of the present invention.

Each stage can be trained sequentially as shown in FIG. 32. In each stage the number of sub-classifiers can be specified by hand based on the desired trade-off between computational cost and accuracy. The stage is then trained by the process illustrated in FIG. 28 as if it were a complete classifier by the process outlined herein above.

The process of FIG. 32 initiates at block 347, where k is set equal to one. At block 348, random non-object examples are selected. At block 349, stage k is trained based on the non-object data. At block 350, to be explained further herein, weights may be assigned to the previous k-1 stages. At block 351, also to be explained further herein, non-object examples may be selected by bootstrapping. Next, at block 352 k is incremented by one, and the process may return to block 349.

In one embodiment the object training images are re-used for each stage.

In one embodiment, each stage uses a different set of training examples for the non-object class. In particular, it is desirable to choose "non-object" examples that are most likely to be mistaken for the object to be detected (e.g., a human face or a car) as discussed in B. D. Ripley, *Pattern Recognition and Neural Networks*, Cambridge University Press, 1996. This concept is similar to the way support vector machines work by selecting samples near the decision boundary as discussed in V. N. Vapnik, *The Nature of Statistical Learning Theory*, Sprinter, 1995. The disclosures of both of these publications are incorporated herein by reference in their entireties.

In one embodiment the non-object training images are acquired by a bootstrapping method designed to determine such samples (i.e., non-object samples that are most likely to be mistaken for the object) as indicated in FIG. 32. By cascading the sub-classifiers, we can use bootstrapping in the following way. The first stage of the classifier is trained by estimating $P(S_n|\omega_2)$ using randomly drawn samples from a set of non-object images. This preliminary classifier is then run over a set of images, for example, 2,500 images, that do not contain the object. Bootstrapping selects the classification windows within this collecting that gives high response (false detections or near false detections) for the non-object training examples. These samples will then be ones that "resemble" the object in the sense of stage 1 of the classifier. These non-object examples in combination with other randomly selected non-object examples are then used to train stage 2 of the classifier. In one embodiment, the bootstrapping samples are combined in equal portion with new randomly selected examples. To then choose the non-object examples for the next stage this process is repeated, this time by evaluating the first two stages in combination over a set of images that do not contain the object. This process can be repeated for each new stage.

In one embodiment illustrated in FIG. 32 each stage can be "weighted" differently. In particular, equation 16 can be modified such that weights, $c_i$, can be specified for each stage:

$$H = c_1 F_1 + \ldots + c_N F_k$$

or equivalently as a cascade of weights:

$$H = F_N + C_{N-1}(F_{N-1} + C_{N-2}(F_{N-2} \ldots + c_1 F_1) \ldots )$$

In one embodiment, in block 350, the weight $C_{k-1}$ in the later equation is chosen by empirically trying a range of values, e.g. (0.1, 0.25, 1.0, 4.0, 10.0) over the set of cross-validation images and choosing the weight that gives the best accuracy as measured with respect to area under the ROC curve.

FIG. 25 depicts various images of humans with the object markers 52 placed on the human faces, human eyes, and human ears detected by the object finder 18 according to an embodiment of the present invention. FIG. 26 illustrates various images of telephones with the object markers 190 placed on the telephones detected by the object finder 18. Similarly, FIG. 27 thus show results of object detection for door-handles Experiments have shown that the cascade search strategy reduces computational time by a factor of several hundreds over an exhaustive full evaluation of every possible object location in position and scale.

V. Combining Detections within and Across View-Based Classifiers

Typically, when the object finder program 18 encounters a face, it does not give one single large response (for the left side of equations 8 and 8A) at one location that is greater than the threshold (i.e., the right side of equations 8 or 8A). It gives a number of large responses at adjacent locations all corresponding to the same face that all exceed the detection threshold. Furthermore, multiple view-based classifiers may detect the same object at the same location. For example, FIG. 6 shows a case where the same face (the female in the foreground of the photograph) is initially detected by two of the view-based classifiers. To resolve that all such multiple "detections" (here, two detections) are caused by the same object, the following approach may be used. First, the detection value (i.e., the left side of equations 8 and 8A) is computed for all viewpoints and at all locations within the image and all its scalings. Then, a list composed of all the locations for which the detection value is greater than the detection threshold is formed. This list is then put in order from the detection of the greatest magnitude (i.e. for which the value of the left side of equation 8 is largest) to that of the smallest magnitude. The first entry in this list is declared a real detection. Then this entry is compared to all others in the list. If another entry within the image is within a predetermined distance (in the preferred embodiment, the distance is half the radius of the object) of the first entry, it is assumed to correspond to the same object and it is discarded. After the first entry is compared to all other entries, this process repeats for the entry in the remaining list that has the largest magnitude (after the first entry and all entries matching to it have been removed); that is, this entry is now declared to be another real detection and is compared to all other entries in the remaining list whereby any entries that are close in distance to it are discarded. This process continues until the list is exhausted.

The foregoing describes a system and method for detecting presence of a 3D object in a 2D image containing a 2D representation of the 3D object. The object finder according to the present invention may improve upon existing techniques for object detection both in accuracy and computational properties. As described herein, a pre-selected number of view-based classifiers may be trained on sample images prior to performing the detection on an unknown image. The object detection program may then operate on the given input image and compute its partially overcomplete wavelet transform for the entire input image. The object detection program may then proceed with sampling of the wavelet coefficients at different image window locations on the input image, and apply each classifier involving linear projection of selected subsets of coefficients, quantization of linear projection coefficients and efficient look-up of pre-computed log-likelihood tables to determine object presence. The object finder's coarse-to-fine object detection strategy coupled with exhaustive object search across different positions and scales may result in an efficient and accurate object detection scheme. The object finder may detect a 3D object over a wide range in angular variation (e.g., 180 degrees) through the combination of a small number of classifiers each specialized to a small range within this range of angular variation.

The object finder according to the present invention may also provide computational advantages over the existing state of the art. In particular, it is observed that although it may take many sub-classifier evaluations to confirm the presence of the object, it can often take only a few evaluations to confirm that an object is not present. It is therefore wasteful to defer a detection decision until all the sub-classifiers have been evaluated. According to one embodiment, the object finder thus discards non-object candidates after as few sub-classifier evaluations as possible. The coarse-to-fine strategy implemented by the object finder, according to one embodiment, involves a sequential evaluation whereby after each sub-classifier evaluation, the object finder makes a decision about whether to conduct further evaluations or to decide that the object is not present. This strategy may be applied to the multi-resolution representation provided by the wavelet transform whereby the sub-classifier evaluations are ordered from low-resolution, computationally quick features to high-resolution computationally intensive features. By doing so, the object finder may efficiently rule out large regions first and thereby it only has to use the more computationally intensive sub-classifiers on a much smaller number of candidates.

The object finder may be trained to detect many different types of objects (e.g., airplanes, cat faces, telephones, etc.) besides human faces and cars discussed hereinabove. Some of the applications where the object finder may be used include: commercial image databases (e.g., stock photography) for automatically labeling and indexing of images; an Internet-based image searching and indexing service; finding biological structures in various types of biological images (e.g., MRI, X-rays, microscope images, etc.); finding objects of military interest (e.g., mines, tanks, etc.) in satellite, radar, or visible imagery; finding objects of interest to scientists (e.g., craters, volcanoes, etc.) in astronomical images; as a tool for automatic description of the image content of an image database; to achieve accurate color balancing on human faces and remove "red-eye" from human faces in a digital photo development; for automatic adjustment of focus, contrast, and centering on human faces during digital photography; to automatically point, focus, and center cameras on human faces during video conferencing; enabling automatic zooming on human faces and also face recognition as part of a security and surveillance system; making human-computer interaction more realistic, especially in interactive computer games; and to perform face detection in real-time or near real-time, in robotic toys to perform face detection in real-time or near real-time and to have the toy behave accordingly.

While several embodiments of the invention have been described, it should be apparent, however, that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention as defined by the appended claims.

What is claimed is:

1. A system for determining a set of sub-classifiers for a detector of an object detection program, comprising:
   a candidate coefficient-subset creation module for creating a plurality of candidate subsets of coefficients that are statistically related through a selection process using object and non-object training examples based on the statistical dependencies within each of the plurality of candidate subsets;
   a training module in communication with the candidate coefficient-subset creation module for training a sub-classifier for each of the plurality of candidate subsets of coefficients; and
   a sub-classifier selection module in communication with the training module for selecting certain of the plurality of sub-classifiers.

2. The system of claim 1, wherein the plurality of candidate subsets of coefficients comprise a plurality of candidate subsets of wavelet coefficients that are statistically related.

3. The system of claim 1, wherein the candidate coefficient-subset creation module is for creating a plurality of candidate subsets of coefficients by:
   selecting a plurality of subsets of statistically related coefficients based on a statistical relationship between groups of two coefficients in the subsets;

selecting a first subset of coefficients from the plurality of subsets of coefficients based on a first criterion;
computing a second criterion based on the first criterion and the first subset; and
selecting a second subset of coefficients from the plurality of subsets of coefficients based on the second criterion.

4. The system of claim 1, wherein the sub-classifier selection module is for selecting certain of the plurality of sub-classifiers by:
performing a first test on the plurality of sub-classifiers;
selecting a first set of sub-classifiers based on the first test;
performing a second test on the first set of sub-classifiers; and
selecting a second set of sub-classifiers from the first set based on the second test.

5. The system of claim 4, wherein the first test is less computationally intensive than the second set.

6. The system of claim 1, wherein the non-object training examples include non-object training examples selected by bootstrapping and non-object training examples selected randomly.

7. A system for determining a set of sub-classifiers for a detector of an object detection program, comprising:
means for creating a plurality of candidate subsets of coefficients that are statistically related through a selection process using object and non-object training examples based on the statistical dependencies within each of the plurality of candidate subsets;
means for training a sub-classifier for each of the plurality of candidate subsets of coefficients; and
means for selecting certain of the plurality of sub-classifiers.

8. The system of claim 7, wherein the plurality of candidate subsets of coefficients includes a plurality of candidate subsets of wavelet coefficients that are statistically related.

9. The system of claim 7, wherein the means for selecting certain of the plurality of candidate subsets of coefficients includes means for:
selecting a plurality of subsets of statistically related coefficients based on a statistical relationship between groups of two coefficients in the subsets;
selecting a first subset of coefficients from the plurality of subsets of coefficients based on a first criterion;
computing a second criterion based on the first criterion and the first subset; and
selecting a second subset of coefficients from the plurality of subsets of coefficients based on the second criterion.

10. The system of claim 7, wherein the means for selecting certain of the plurality of candidate sub-classifiers of coefficients includes means for:
performing a first test on the plurality of sub-classifiers;
selecting a first set of sub-classifiers based on the first test;
performing a second test on the first set of sub-classifiers; and
selecting a second set of sub-classifiers from the first set based on the second test.

11. The system of claim 10, wherein the first test is less computationally intensive than the second test.

12. The system of claim 7, wherein the non-object training examples include non-object training examples selected by bootstrapping and non-object training examples selected randomly.

13. A computer readable medium having stored thereon instructions, which, when executed by a processor, cause the processor to:
create a plurality of candidate subsets of coefficients that are statistically related through a selection process using object and non-object training examples based on the statistical dependencies within each of the plurality of candidate subsets;
train a sub-classifier for a detector of an object detection program for each of the plurality of candidate subsets of coefficients; and
select certain of the plurality of sub-classifiers.

14. The medium of claim 13, wherein the plurality of candidate subsets of coefficients comprise a plurality of candidate subsets of wavelet coefficients that are statistically related.

15. The medium of claim 13, having further stored thereon instructions which when executed by the processor, cause the processor to create a plurality of candidate subsets of coefficients by:
selecting a plurality of subsets of statistically related coefficients based on a statistical relationship between groups of two coefficients in the subsets;
selecting a first subset of coefficients from the plurality of subsets of coefficients based on a first criterion;
computing a second criterion based on the first criterion and the first subset; and
selecting a second subset of coefficients from the plurality of subsets of coefficients based on the second criterion.

16. The medium of claim 13, having further stored thereon instructions which when executed by the processor, cause the processor to select certain of the plurality of sub-classifiers by:
performing a first test on the plurality of sub-classifiers;
selecting a first set of sub-classifiers based on the first test;
performing a second test on the first set of sub-classifiers; and
selecting a second set of sub-classifiers from the first set based on the second test.

17. The medium of claim 16, wherein the first test is less computationally intensive than the second set.

18. The medium of claim 13, having further stored thereon instructions which when executed by the processor cause the processor to select the non-object training examples by bootstrapping and randomly.

19. A method for determining a set of sub-classifiers for a detector of an object detection program, comprising:
creating a plurality of candidate subsets of coefficients that are statistically related through a selection process using object and non-object training examples based on the statistical dependencies within each of the plurality of candidate subsets;
training a sub-classifier for each of the plurality of candidate subsets of coefficients; and
selecting certain of the plurality of sub-classifiers.

20. The method of claim 19, wherein the plurality of candidate subset of coefficients includes a plurality of candidate subsets of wavelet coefficients that are statistically related.

21. The method of claim 19, wherein creating a plurality of candidate subset of coefficients includes:
selecting a plurality of subsets of statistically related coefficients based on a statistical relationship between groups of two coefficients in the subsets;
selecting a first subset of coefficients from the plurality of subsets of coefficients based on a first criterion;
computing a second criterion based on the first criterion and the first subset; and
selecting a second subset of coefficients from the plurality of subsets of coefficients based on the second criterion.

22. The method of claim 19, wherein selecting certain of the plurality of sub-classifiers includes:

performing a first test on the plurality of sub-classifiers;
selecting a first set of sub-classifiers based on the first test;
performing a second test on the first set of sub-classifiers; and
selecting a second set of sub-classifiers from the first set based on the second test.

23. The method of claim 22, wherein the first test is less computationally intensive than the second set.

24. The method of claim 19, wherein training a sub-classifier for each of the plurality of candidate subsets of coefficients includes providing lighting correction after evaluation of an overcomplete wavelet transformation.

25. The method of claim 19, wherein the non-object training examples include non-object training examples selected by bootstrapping and non-object training examples selected randomly.

26. A system for determining a set of sub-classifiers for a detector of an object detection program, comprising:
   a candidate coefficient-subset creation module for creating a plurality of candidate subsets of coefficients;
   a training module in communication with the candidate coefficient-subset creation module for training a sub-classifier for each of the plurality of candidate subsets of coefficients; and
   a sub-classifier selection module in communication with the training module for selecting certain of the plurality of sub-classifiers,
   wherein the candidate coefficient-subset creation module is for creating a plurality of candidate subsets of coefficients by:
      selecting a plurality of subsets of statistically related coefficients based on a statistical relationship between groups of two coefficients in the subsets;
      selecting a first subset of coefficients from the plurality of subsets of coefficients based on a first criterion;
      computing a second criterion based on the first criterion and the first subset; and
      selecting a second subset of coefficients from the plurality of subsets of coefficients based on the second criterion.

27. The system of claim 26, wherein the sub-classifier selection module is for selecting certain of the plurality of sub-classifiers by:
   performing a first test on the plurality of sub-classifiers;
   selecting a first set of sub-classifiers based on the first test;
   performing a second test on the first set of sub-classifiers; and
   selecting a second set of sub-classifiers from the first set based on the second test.

28. The system of claim 27, wherein the first test is less computationally intensive than the second set.

29. The system of claim 27, wherein the training module is for training the set of sub-classifiers based on non-object training examples.

30. The system of claim 29, wherein the non-object training examples include non-object training examples selected by bootstrapping and non-object training examples selected randomly.

31. A system for determining a set of sub-classifiers for a detector of an object detection program, comprising:
   a candidate coefficient-subset creation module for creating a plurality of candidate subsets of coefficients;
   a training module in communication with the candidate coefficient-subset creation module for training a sub-classifier for each of the plurality of candidate subsets of coefficients; and
   a sub-classifier selection module in communication with the training module for selecting certain of the plurality of sub-classifiers,
   wherein the sub-classifier selection module is for selecting certain of the plurality of sub-classifiers by:
      performing a first test on the plurality of sub-classifiers;
      selecting a first set of sub-classifiers based on the first test;
      performing a second test on the first set of sub-classifiers; and
      selecting a second set of sub-classifiers from the first set based on the second test.

32. A system for determining a set of sub-classifiers for a detector of an object detection program, comprising:
   a candidate coefficient-subset creation module for creating a plurality of candidate subsets of coefficients;
   a training module in communication with the candidate coefficient-subset creation module for training a sub-classifier for each of the plurality of candidate subsets of coefficients based on non-object training examples that include non-object training examples selected by bootstrapping and non-object training examples selected randomly; and
   a sub-classifier selection module in communication with the training module for selecting certain of the plurality of sub-classifiers.

33. A system for determining a set of sub-classifiers for a detector of an object detection program, comprising:
   means for creating a plurality of candidate subsets of coefficients;
   means for training a sub-classifier for each of the plurality of candidate subsets of coefficients; and
   means for selecting certain of the plurality of sub-classifiers,
   wherein the means for selecting certain of the plurality of candidate subsets of coefficients includes means for:
      selecting a plurality of subsets of statistically related coefficients based on a statistical relationship between groups of two coefficients in the subsets;
      selecting a first subset of coefficients from the plurality of subsets of coefficients based on a first criterion;
      computing a second criterion based on the first criterion and the first subset; and
      selecting a second subset of coefficients from the plurality of subsets of coefficients based on the second criterion.

34. A system for determining a set of sub-classifiers for a detector of an object detection program, comprising:
   means for creating a plurality of candidate subsets of coefficients;
   means for training a sub-classifier for each of the plurality of candidate subsets of coefficients; and
   means for selecting certain of the plurality of sub-classifiers,
   wherein the means for selecting certain of the plurality of candidate sub-classifiers of coefficients includes means for:
      performing a first test on the plurality of sub-classifiers;
      selecting a first set of sub-classifiers based on the first test;
      performing a second test on the first set of sub-classifiers; and
      selecting a second set of sub-classifiers from the first set based on the second test.

35. A system for determining a set of sub-classifiers for a detector of an object detection program, comprising:

means for creating a plurality of candidate subsets of coefficients;

means for training a sub-classifier for each of the plurality of candidate subsets of coefficients based on non-object training examples, wherein the non-object training examples include non-object training examples selected by bootstrapping and non-object training examples selected randomly; and means for selecting certain of the plurality of sub-classifiers.

36. A computer readable medium having stored thereon instructions, which, when executed by a processor, cause the processor to:

create a plurality of candidate subsets of coefficients by:
selecting a plurality of subsets of statistically related coefficients based on a statistical relationship between groups of two coefficients in the subsets;
selecting a first subset of coefficients from the plurality of subsets of coefficients based on a first criterion;
computing a second criterion based on the first criterion and the first subset; and
selecting a second subset of coefficients from the plurality of subsets of coefficients based on the second criterion;

train a sub-classifier for a detector of an object detection program for each of the plurality of candidate subsets of coefficients; and select certain of the plurality of sub-classifiers.

37. A computer readable medium having stored thereon instructions, which, when executed by a processor, cause the processor to:

create a plurality of candidate subsets of coefficients;
train a sub-classifier for a detector of an object detection program for each of the plurality of candidate subsets of coefficients; and
select certain of the plurality of sub-classifiers by:
performing a first test on the plurality of sub-classifiers;
selecting a first set of sub-classifiers based on the first test;
performing a second test on the first set of sub-classifiers; and
selecting a second set of sub-classifiers from the first set based on the second test.

38. A computer readable medium having stored thereon instructions, which, when executed by a processor, cause the processor to:

create a plurality of candidate subsets of coefficients;
train a sub-classifier for a detector of an object detection program for each of the plurality of candidate subsets of coefficients based on non-object training examples;
select the non-object training examples by bootstrapping and randomly; and
select certain of the plurality of sub-classifiers.

39. A method for determining a set of sub-classifiers for a detector of an object detection program, comprising:

creating a plurality of candidate subsets of coefficients;
training a sub-classifier for each of the plurality of candidate subsets of coefficients; and
selecting certain of the plurality of sub-classifiers,
wherein creating a plurality of candidate subset of coefficients includes:
selecting a plurality of subsets of statistically related coefficients based on a statistical relationship between groups of two coefficients in the subsets;
selecting a first subset of coefficients from the plurality of subsets of coefficients based on a first criterion;
computing a second criterion based on the first criterion and the first subset; and
selecting a second subset of coefficients from the plurality of subsets of coefficients based on the second criterion.

40. The method of claim 39, wherein selecting certain of the plurality of sub-classifiers includes:
performing a first test on the plurality of sub-classifiers;
selecting a first set of sub-classifiers based on the first test;
performing a second test on the first set of sub-classifiers; and
selecting a second set of sub-classifiers from the first set based on the second test.

41. The method of claim 40, wherein the first test is less computationally intensive than the second set.

42. The method of claim 41, wherein training a sub-classifier for each of the plurality of candidate subsets of coefficients includes providing lighting correction after evaluation of an overcomplete wavelet transformation.

43. The method of claim 42, wherein training includes training the set of sub-classifiers based on non-object training examples.

44. The method of claim 43, wherein the non-object training examples include non-object training examples selected by bootstrapping and non-object training examples selected randomly.

45. A method for determining a set of sub-classifiers for a detector of an object detection program, comprising:
creating a plurality of candidate subsets of coefficients;
training a sub-classifier for each of the plurality of candidate subsets of coefficients; and
selecting certain of the plurality of sub-classifiers,
wherein selecting certain of the plurality of sub-classifiers includes:
performing a first test on the plurality of sub-classifiers;
selecting a first set of sub-classifiers based on the first test;
performing a second test on the first set of sub-classifiers; and
selecting a second set of sub-classifiers from the first set based on the second test.

46. A method for determining a set of sub-classifiers for a detector of an object detection program, comprising:
creating a plurality of candidate subsets of coefficients;
training a sub-classifier for each of the plurality of candidate subsets of coefficients, wherein training a sub-classifier for each of the plurality of candidate subsets of coefficients includes providing lighting correction after evaluation of an overcomplete wavelet transformation; and
selecting certain of the plurality of sub-classifiers.

47. A method for determining a set of sub-classifiers for a detector of an object detection program, comprising:
creating a plurality of candidate subsets of coefficients;
training a sub-classifier for each of the plurality of candidate subsets of coefficients based on non-object training examples, wherein the non-object training examples include non-object training examples selected by bootstrapping and non-object training examples selected randomly; and
selecting certain of the plurality of sub-classifiers.

* * * * *

UNITED STATES PATENT AND TRADEMARK OFFICE
CERTIFICATE OF CORRECTION

PATENT NO. : 7,194,114 B2
APPLICATION NO. : 10/266139
DATED : March 20, 2007
INVENTOR(S) : Schneiderman It is certified that error appears in the above-identified patent and that said Letters Patent is hereby corrected as shown below:

COLUMN 6

Line 42, delete "area network) etc." and substitute therefor --area network), etc.--.

COLUMN 7

Line 57, delete "according-to" and substitute therefor --according to--.

COLUMN 10

Line 31, delete "naÏve Bayes" and substitute therefor --naïve Bayes--.

COLUMN 12

Line 46, delete "and (-1.0, -3.0, 3.0, 1,0)" and substitute therefor --(-1.0, -3.0, 3.0, 1.0)--.

COLUMN 15

Line 26, delete "For example, if the there are" and substitute therefor --For example, if there are--.

COLUMN 15

Line 49, delete "coefficient that occur" and substitute therefor --coefficients that occur--.

COLUMN 16

Line 48, delete "The quantized feature value, f can" and substitute therefor --The quantized feature value, f, can--.

COLUMN 20

Line 45, delete "results for each these individual" and substitute therefor --results for each of these individual--.

COLUMN 20

Line 54, delete "Mcandidates of size of" and substitute therefor --$M$ candidates of size of--.

COLUMN 21

Line 57, delete "one would have compute the" and substitute therefor --one would have to compute the--.

COLUMN 23

Line 6, delete "maybe used to" and substitute therefor --may be used to--.

COLUMN 23

Line 67, delete "in position in position and in scale" and substitute therefor --in position and in scale--.

COLUMN 27

Line 3, delete "corresponds to evaluations sites" and substitute therefor --corresponds to evaluation sites--.

COLUMN 29

Line 10, delete "for the forth stages. The first two" and substitute therefor --for the fourth stage. The first two--.

Signed and Sealed this

Sixteenth Day of March, 2010

David J. Kappos
*Director of the United States Patent and Trademark Office*